US009863308B2

(12) United States Patent
Makita

(10) Patent No.: US 9,863,308 B2
(45) Date of Patent: Jan. 9, 2018

(54) LUBRICATION OIL AND INTERNAL-COMBUSTION ENGINE FUEL

(71) Applicant: Hideaki Makita, Hyogo (JP)

(72) Inventor: Hideaki Makita, Hyogo (JP)

( * ) Notice: Subject to any disclaimer, the term of this patent is extended or adjusted under 35 U.S.C. 154(b) by 275 days.

(21) Appl. No.: 14/845,416

(22) Filed: Sep. 4, 2015

(65) Prior Publication Data

US 2016/0169098 A1 Jun. 16, 2016

Related U.S. Application Data

(63) Continuation of application No. 13/505,782, filed as application No. PCT/JP2011/002545 on May 6, 2011, now abandoned.

(30) Foreign Application Priority Data

Nov. 5, 2010 (JP) ................................ 2010-248814

(51) Int. Cl.
*F02B 43/04* (2006.01)
*C10L 10/00* (2006.01)
(Continued)

(52) U.S. Cl.
CPC ................ *F02B 43/04* (2013.01); *C10L 1/08* (2013.01); *C10L 1/2222* (2013.01); *C10L 10/02* (2013.01);
(Continued)

(58) Field of Classification Search
CPC .......... F02B 43/04; F02B 43/00; F02B 43/10; F02B 1/04; F02B 3/06; C10M 133/06;
(Continued)

(56) References Cited

U.S. PATENT DOCUMENTS 2,476,271 A 7/1949 Bartleson
4,177,153 A 12/1979 Lowe
(Continued)

FOREIGN PATENT DOCUMENTS

EP 481910 A1 4/1992
JP S5971395 A 4/1984
(Continued)

OTHER PUBLICATIONS

Kao Chemicals, FARMIN DM 2465 Product Sheet, Revision Jun. 18, 2010 <http://chemical.kao.com/us/products/B0002122_usen.html>.*

(Continued)

*Primary Examiner* — Jacob Amick
(74) *Attorney, Agent, or Firm* — Marshall, Gerstein & Borun LLP

(57) ABSTRACT

The objective is to provide lubrication oil and internal-combustion engine fuel for reducing the fuel consumption and for reducing carbon dioxide and other exhaust gas components. The lubrication oil is injected with lubrication oil impregnating agent composed of dimethylalkyl tertiary amine in the range from 0.01 to 1 volume % and desirably in the range from 0.1 to 0.5 volume %. Petroleum oil fuel is injected with fuel oil impregnating agent composed of dimethylalkyl tertiary amine in the range from 0.5 to 1 volume %. The petroleum oil fuel is light oil, kerosene, gasoline, or Bunker A. Any one or both of these lubrication oil and petroleum oil fuel is/are used for an internal-combustion engine.

17 Claims, 92 Drawing Sheets

(51) Int. Cl.

| | |
|---|---|
| ***C10L 1/08*** | (2006.01) |
| ***C10L 1/222*** | (2006.01) |
| ***C10L 10/08*** | (2006.01) |
| ***C10M 133/06*** | (2006.01) |
| ***F02B 43/00*** | (2006.01) |
| ***C10L 10/02*** | (2006.01) |

(52) U.S. Cl.
CPC .......... *C10L 10/08* (2013.01); *C10M 133/06* (2013.01); *F02B 43/00* (2013.01); *C10G 2400/10* (2013.01); *C10L 2230/22* (2013.01); *C10L 2270/02* (2013.01); *C10L 2270/023* (2013.01); *C10L 2270/026* (2013.01); *C10L 2270/04* (2013.01); *C10M 2215/04* (2013.01); *C10N 2230/12* (2013.01); *C10N 2230/50* (2013.01); *C10N 2230/54* (2013.01); *C10N 2240/02* (2013.01); *C10N 2240/04* (2013.01); *C10N 2240/046* (2013.01); *C10N 2240/08* (2013.01); *C10N 2240/10* (2013.01); *C10N 2240/102* (2013.01); *C10N 2240/104* (2013.01); *C10N 2240/12* (2013.01); *C10N 2240/14* (2013.01); *C10N 2250/10* (2013.01); *Y02T 10/32* (2013.01)

(58) Field of Classification Search
CPC .... C10L 1/08; C10L 1/10; C10L 10/00; C10L 10/02; C10L 10/04; C10L 10/06; C10L 10/08; C10L 10/10; C10L 10/12; C10L 10/14; C10L 10/18
See application file for complete search history.

(56) References Cited

U.S. PATENT DOCUMENTS

| | | | |
|---|---|---|---|
| 4,621,141 | A | 11/1986 | Chibnik |
| 4,795,583 | A | 1/1989 | Papay |
| 5,154,843 | A | 10/1992 | Rizvi et al. |
| 5,194,208 | A | 3/1993 | Monthey et al. |
| 8,716,200 | B2 | 5/2014 | Seemeyer et al. |
| 2008/0176778 | A1 | 7/2008 | Seemeyer et al. |
| 2013/0228144 | A1 | 9/2013 | Makita |

FOREIGN PATENT DOCUMENTS

| | | | |
|---|---|---|---|
| JP | H09-176673 | A | 7/1997 |
| JP | 2002-309273 | A | 10/2002 |
| JP | 2005-146010 | A | 6/2005 |
| JP | 2005-290254 | A | 10/2005 |
| JP | 2007-153946 | A | 6/2007 |
| JP | 2010-195973 | A | 9/2010 |

OTHER PUBLICATIONS

Kao Chemicals, FARMIN DM 2465 Material Safety Data Sheet, Revision Jun. 21, 2010 <http://chemical.kao.com/us/products/B0002122_usen.html>.*

International Preliminary Report on Patentability, PCT/JP2011/002545, dated May 8, 2013 (English translation).

International Search Report and Written Opinion, corresponding International Application No. PCT/JP2011/002545, dated Aug. 9, 2011 (English translation).

Kao Chemicals, FARMIN DM 2465 Material Safety Data Sheet, downloaded from the Internet: <http://chemical.kao.com/us/products/B0002122_usen.html> (revision Jun. 21, 2010).

Kao Chemicals, FARMIN DM 2465 Product Sheet, downloaded from the Internet: <http://chemical.kao.com/us/products/B0002122_usen.html> (revision Jun. 18, 2010).

Nainen Kikan no Junkatsu, 1st edition, 1st print, Kabushiki Kaisha Saiwai Shobo, pp. 323-331 (1987). [Japanese only.].

Sekiyu Seihin Tankazai, reprinted edition, Kabushiki Kaisha Saiwai Shobo, p. 190 (1974). [Japanese only.].

* cited by examiner

[FIG.1]
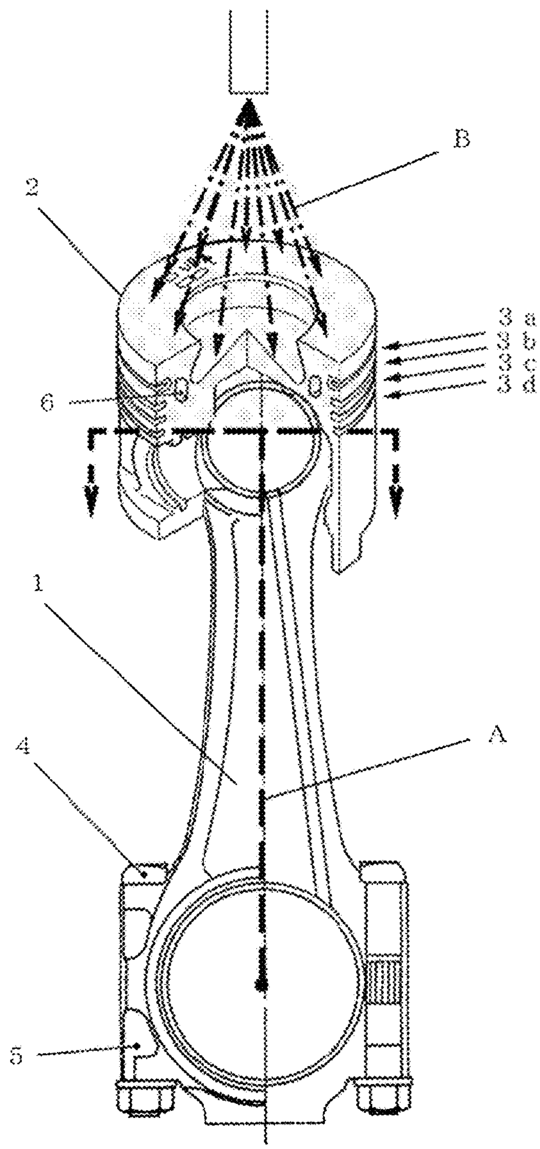

[FIG.2]
Messrs. MAKITA UNSO Kabusikikaisha
List of result
(black smoke test)
Registration number : Hukui-800-Ka-438
Car number : CD450NC-00441
Test day : 2010. 10. 05
Running distance at test day : 411, 992 km
Measurement company : Kabushikikaisha HUSO automobile maintenance
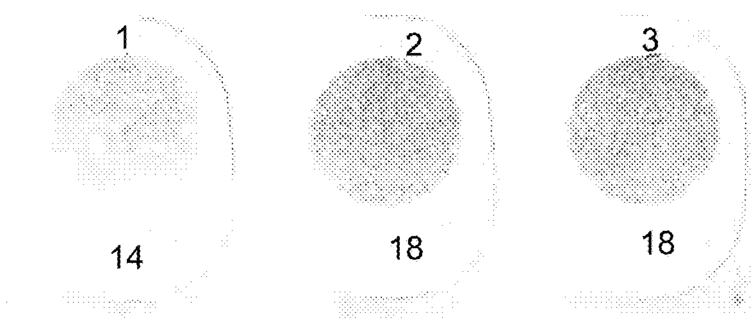
Average: 16%

[FIG. 3]
Messrs. MAKITA UNSO Kabusikikaisha
List of result
(black smoke test)
| | | |
|---|---|---|
| Registration number | : | Hukui-800-Ka-438 |
| Car number | : | CD45ONC-00441 |
| Test day | : | 2010. 07. 24 |
| Running distance at test day | : | 399,433 km |
| Measurement company | : | Kabushikikaisha HUSO automobile maintenance |
first time: 18%
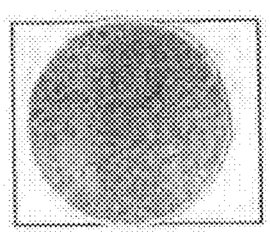
second time: 18%
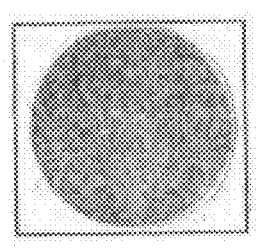
third time: 16%
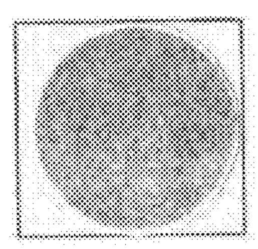
Average: 17.3%

[FIG. 4]
Messrs. MAKITA UNSO Kabusikikaisha
List of result
(black smoke test)
Registration number : Kobe-130-A-8003
Car number : YV2A4DAA41A523773
Test day : 2010. 10. 06
Running distance at test day : 506,248 km
Measurement company : Kabushikikaisha HUSO automobile maintenance
first time: 1% second time: 1% third time: 1%
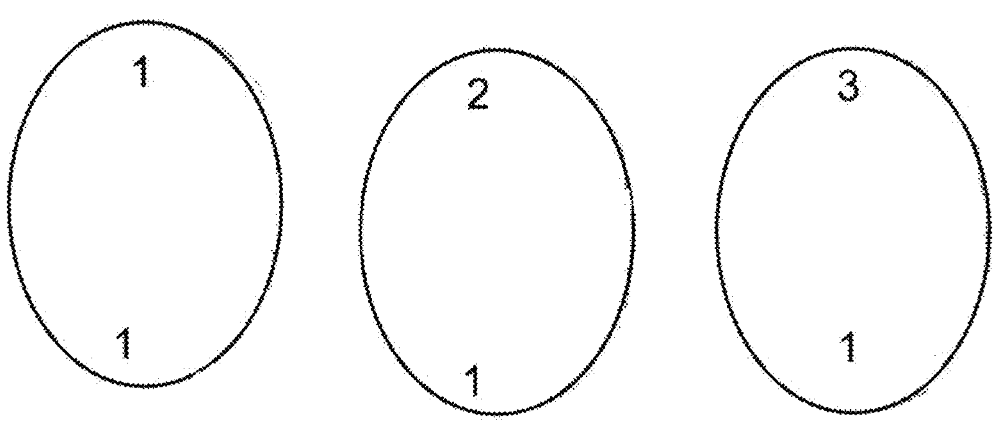
Average: 1%

[FIG.5]
Messrs.MAKITA UNSO Kabusikikaisha
List of result
(black smoke test)
Registration number : Kobe-130-A-8003
Car number : YV2A4CFA92A54
Test day : 2010.08.31
Running distance at test day : 502,888 km
Measurement company : Kabushikikaisha HUSO automobile maintenance
Average:2%
first time: second time: third time:
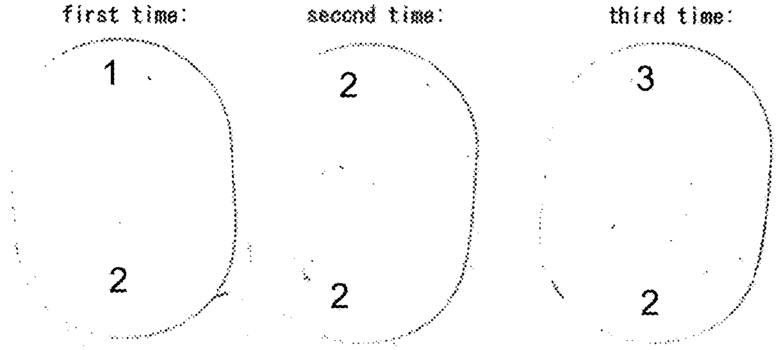
2%

Figure 7:
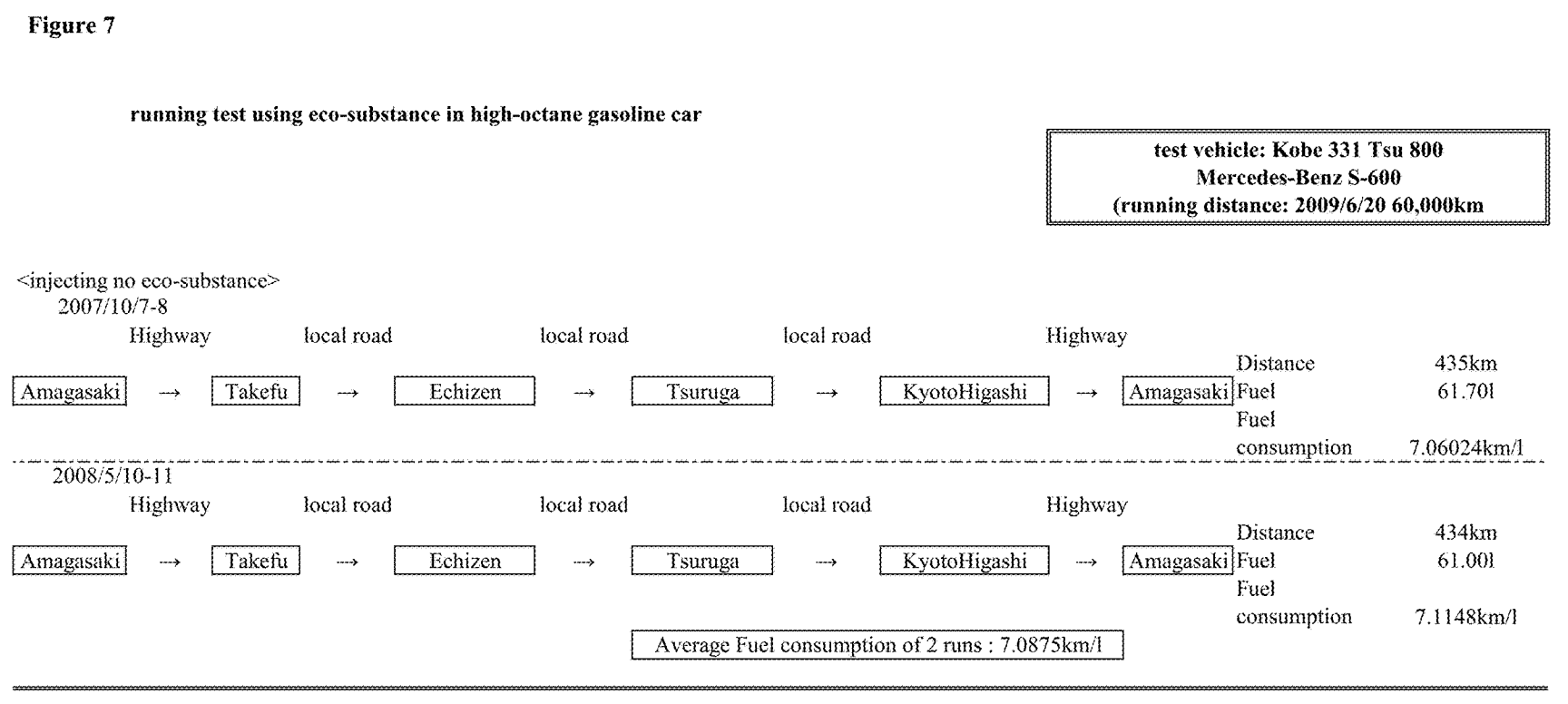

Figure 7 running test using eco-substance in high-octane gasoline car test vehicle: Kobe 331 Tsu 800
Mercedes-Benz S-600
(running distance: 2009/6/20 60,000km

<injecting no eco-substance>

2007/10/7-8

Amagasaki → (Highway) → Takefu → (local road) → Echizen → (local road) → Tsuruga → (local road) → KyotoHigashi → (Highway) → Amagasaki

| | |
|---|---|
| Distance | 435km |
| Fuel | 61.70l |
| Fuel consumption | 7.06024km/l |

2008/5/10-11

Amagasaki → (Highway) → Takefu → (local road) → Echizen → (local road) → Tsuruga → (local road) → KyotoHigashi → (Highway) → Amagasaki

| | |
|---|---|
| Distance | 434km |
| Fuel | 61.00l |
| Fuel consumption | 7.1148km/l |

Average Fuel consumption of 2 runs : 7.0875km/l

Figure 7 cont.

<injecting 0.99～1.0 volume% eco-substance>

2009/6/20-21

Amagasaki →(Highway) Takefu →(local road) Echizen →(local road) Tsuruga →(local road) KyotoHigashi →(Highway) Amagasaki

| | |
|---|---|
| Distance | 432km |
| Fuel | 49.441 |
| Fuel consumption | 8.7379km/l |

2009/7/4-5

7km Amagasaki →(Highway 204km) 211km Takefu →(local road 25km) 236km Echizen →(local road 40km) 276km Tsuruga →(local road 93km) 369km KyotoHigashi →(Highway 51km) 420km Amagasaki →(3km) 423km Garage

| | |
|---|---|
| Distance | 423km |
| Fuel | 46.0911 |
| Fuel consumption | 9.1775km/l |

| |
|---|
| Average Fuel consumption of 2 runs : 8.9577km/l |
| Reduction rate from normal (%) : -21% |

<injecting no eco-substance>

7/12/2009

Takarazuka →(Highway 80km) Taishi → Kamigori → Taishinishi →(Highway 88km) Tkarazuka (*) traffic jam (0km)

| | |
|---|---|
| Distance | 245km |
| Fuel | 31.43 |
| Fuel consumption | 7.7950km/l |

<injecting 0.99～1.0 volume% eco-substance>

7/20/2009

Takarazuka →(Highway 80km) Taishi → Kamigori → Taishinishi →(Highway 88km) Tkarazuka (*) traffic jam (20km

| | |
|---|---|
| Distance | 245km |
| Fuel | 28.451 |
| Fuel consumption | 8.6100km/l |

| |
|---|
| Reduction rate from normal (%) : -9.5% |
| Average of Running test : -15.25% |

Figure 8 running test using eco-substance in regular gasoline car test vehicle : BMW 1600
(running distance 82,000km)

<injecting no eco-substance>
9/19/2009

Departure → (local road 33.5km) → Suma → (Highway 22km) → Nishinomiya → (local road 12.4km) → Amagasaki Distance 67.9km
Fuel 5.69l
Fuel consumption 11.933km/l <injecting 0.99~1.0 volume% eco-substance>
9/21/2010

Departure → (local road 33.5km) → Suma → (Highway 22km) → Nishinomiya → (local road 12.4km) → Amagasaki Distance 67.9km
Fuel 4.79l
Fuel consumption 14.175km/l
Reduction rate from normal (%) : -16%

<injecting no eco-substance>
9/19/2009

Departure → (local road 12.87km) → Takarazuka → (local road 9.49km) → Arima → (local road 19.79km) → Amagasaki Distance 42.15km
Fuel 5.23l
Fuel consumption 8.06km/l <injecting 0.99~1.0 volume% eco-substance>
9/21/2010

Departure → (local road 12.87km) → Takarazuka → (local road 9.49km) → Arima → (local road 19.79km) → Amagasaki Distance 42.15km
Fuel 4.73l
Fuel consumption 8.911km/l
Reduction rate from normal (%) : -10%

Figure 8 cont.

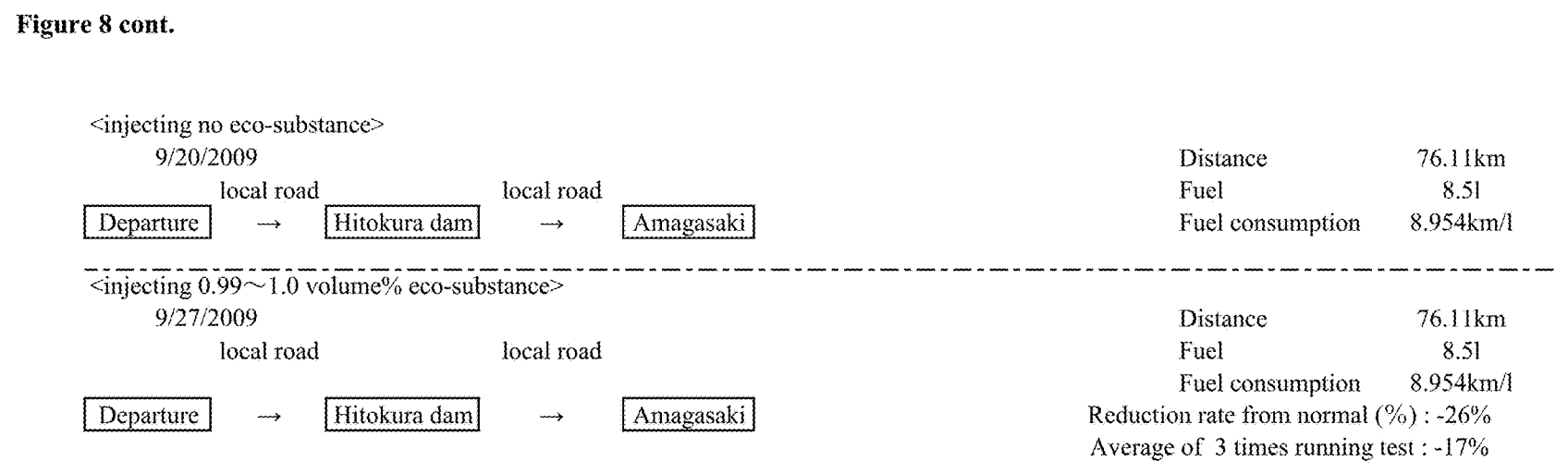

<injecting no eco-substance>

9/20/2009

Departure —local road→ Hitokura dam —local road→ Amagasaki

| | |
|---|---|
| Distance | 76.11km |
| Fuel | 8.5l |
| Fuel consumption | 8.954km/l |

---

<injecting 0.99～1.0 volume% eco-substance>

9/27/2009

Departure —local road→ Hitokura dam —local road→ Amagasaki

| | |
|---|---|
| Distance | 76.11km |
| Fuel | 8.5l |
| Fuel consumption | 8.954km/l |

Reduction rate from normal (%) : -26%

Average of 3 times running test : -17%

Figure 9

[Kerosene] running test using 0.99～1.00 % eco-substance in HINO 4t car

(same time period, same condithions)

test vehicle: Kobe-100-Sa-7758
HINO U-FD3HKL running distance: 510,000km
displacement: 7410cc engine: HO7D
gross weight: 7,945kg
loading capacity: 2,250kg (loading 50%)

<injecting no eco-substance>
10/10/2009

| | local road 36.6km | | local road 36.6km | | Highway 40.2km | | Highway 44.6km | | local road 7km | | | |
|---|---|---|---|---|---|---|---|---|---|---|---|---|
| Departure | → | Suma | → | Amagasaki | → | Izumisano | → | Suehiro | → | Amagasaki | Distance<br>Fuel<br>Fuel consumption | 165km<br>25.34l<br>6.511km/l |

<injecting 0.99～1.0 volume% eco-substan
10/11/2010

| | local road 36.6km | | local road 36.6km | | Highway 40.2km | | Highway 44.6km | | local road 7km | | | |
|---|---|---|---|---|---|---|---|---|---|---|---|---|
| Departure | → | Suma | → | Amagasaki | → | Izumisano | → | Suehiro | → | Amagasaki | Distance<br>Fuel<br>Fuel consumption | 165km<br>24.02l<br>6.869km/l |

Reduction rate from normal (%) : -5%

Figure 9 cont.

<injecting no eco-substance>

10/10/2009 local road — elevation 650 m — local road

Departure → Arima → Amagasaki

| | |
|---|---|
| Distance | 46km |
| Fuel | 11.03l |
| Fuel consumption | 4.18km/l |

---

<injecting 0.99～1.0 volume% eco-substance>

10/11/2010 local road — elevation 650 m — local road

Departure → Arima → Amagasaki

| | |
|---|---|
| Distance | 46km |
| Fuel | 9.8l |
| Fuel consumption | 4.694km/l |

Reduction rate from normal (%) : -11%

Average of 3 times running test : -8%

Figure 10

[clean fuel oil A] running test using 0.99~1.00 % eco-substance in HINO 4t car

(same time period, same condithions)

test vehicle : Kobe-100-Sa-7758
HINO U-FD3HKL running distance : 510,000km
displacement: 7410cc engine: HO7D
gross weight: 7,945kg
loading capacity: 2,250kg (loading 50%)

<injecting no eco-substance>
10/24/2009

Departure → (local road) Suma → (local road) Amagasaki

Distance 69.8km
Fuel 10.8l
Fuel consumption 6.463km/l

<injecting 0.99~1.0 volume% eco-substance>
10/25/2009

Departure → (local road) Suma → (local road) Amagasaki

Distance 69.8km
Fuel 10l
Fuel consumption 6.98km/l
Reduction rate from normal (%) : -7%

<injecting no eco-substance>
10/24/2009

Departure → (local road) Arima (elevation 650 m) → (local road) Amagasaki

Distance 45km
Fuel 8.8l
Fuel consumption 5.114km/l

<injecting 0.99~1.0 volume% eco-substance>
10/25/2009

Departure → (local road) Arima (elevation 650 m) → (local road) Amagasaki

Distance 44.8km
Fuel 8.0l
Fuel consumption 5.6km/l
Reduction rate from normal (%) : -9%

[FIG 11]
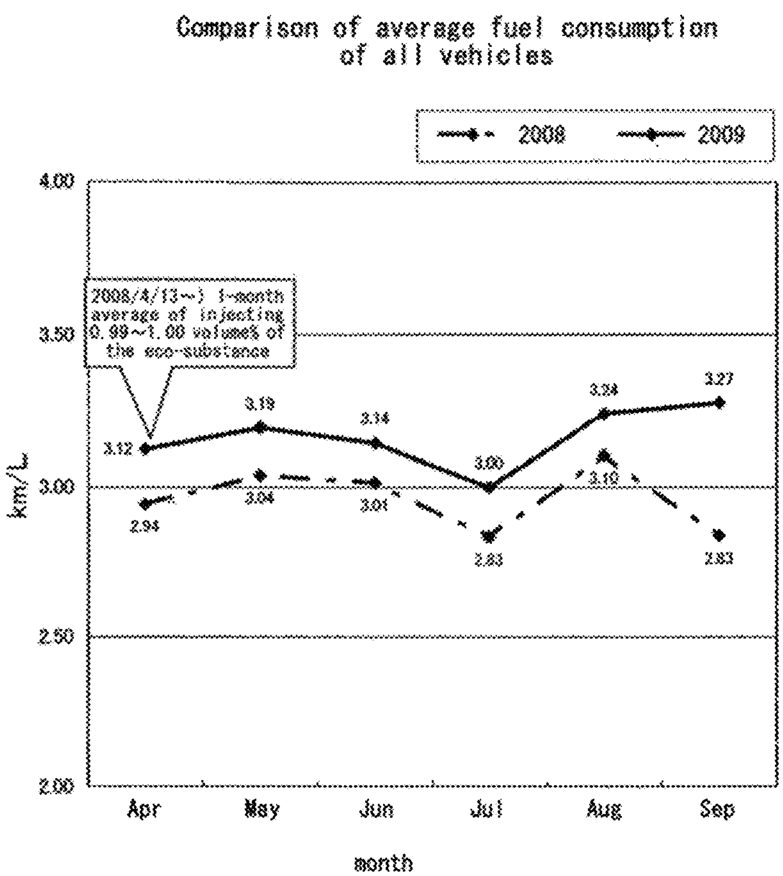

[FIG.12]
H22.9.16
DM
NORMAL

[FIG.13]
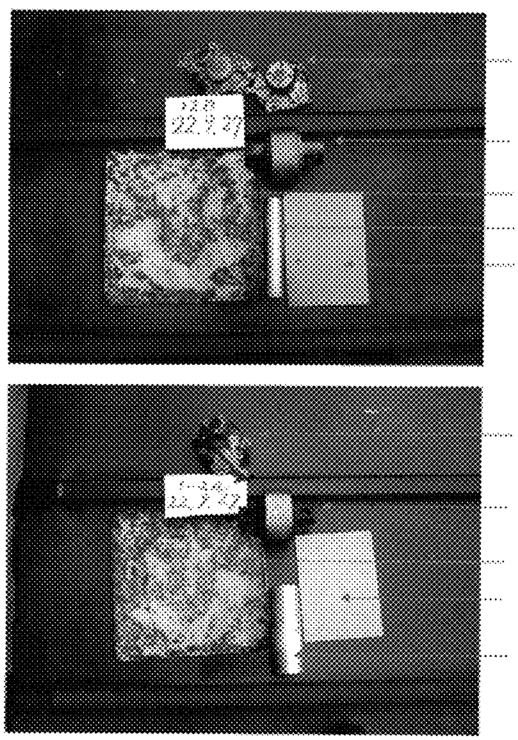

[FIG.14]
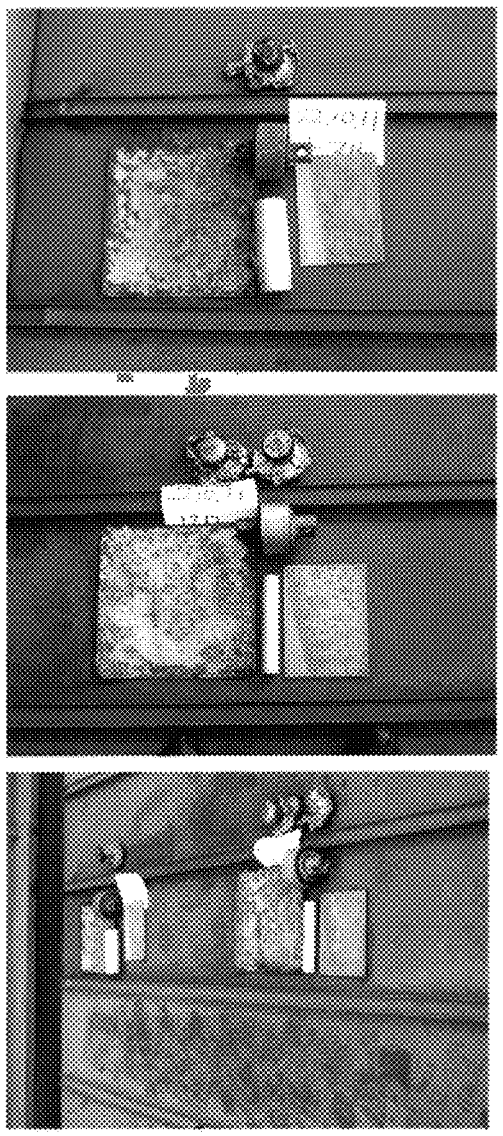
H22.10.11
NORMAL
DM

[FIG.15]
H22.10.18
DM
NORMAL

[FIG. 16]
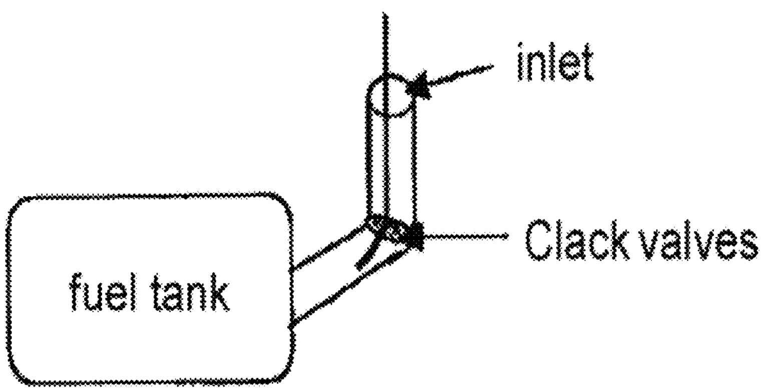

Figure 17
[Table 1]

The comparison in the fuel consumption <New eco-friendly lubrication oil (including 0.1 volume % of eco-substance)>

February~March

| February~March | | <Normal> 2009/4/13 - 2010/2 | | | | | | | | | |
|---|---|---|---|---|---|---|---|---|---|---|---|
| vehicle information | | to | | Load (kg) | from | | Load (kg) | Dates | Running distance (km) | fuel consumption amount (l) | fuel consumption (km/l) |
| No. | Kobe-88-Ka-3714 | NICCA CHEMICAL | Chiba | 9,020 | CHIBA SHIBOU~KISEI KANKYOU | Chiba | 11,040 | 2010/1/27-29 | 1,422 | 490 | 2.90 |
| Type | ISUZU P-CXM19P rev | | | | | | | | | | |
| Engine | 10PC1 Registration 1984 | SK | Kawaguchi | 10,070 | TOKUOKA | Tokyo | 10,760 | 2009/12/17-21 | 1,171 | 443 | 2.64 |
| Total weight | 19,950Kg | | | | | | | | | | |
| No. | Kobe-88-Ka-4112 | TATEYAMA~KANEKA | Toyama | 10,100 | - | - | - | 2010/1/5-7 | 934 | 310 | 3.01 |
| Type | ISUZU P-CXM19P rev | | | | | | | | | | |
| Engine | 10PC1 Registration 1985 | | | | | | | | | | |
| Total weight | 19,885Kg | YONESHOU | Ishikawa | 10,770 | - | - | - | 2009/12/28-30 | 705 | 219 | 3.22 |
| No. | Fukui-800-Ka-357 | SK | Kawaguchi | 6,230 | SHIZUOKA AYUKA | Shizuoka | 10,600 | 2009/9/4-9 | 1,390 | 427 | 3.26 |
| Type | NISSAN P-CD45NC rev | | | | | | | | | | |
| Engine | PE6 Registration 1989 | | | | | | | | | | |
| Total weight | 19,870Kg | | | | | | | | | | |
| No. | Fukui-800-Ka-428 | YONESHOU | Ishikawa | 10,500 | - | --- | --- | 2010/2/6-8 | 704 | 235 | 3.00 |
| Type | MITSUBISHI P-FU418N rev | YONESHOU | Ishikawa | 10,070 | - | --- | --- | 2009/2/9-10 | 666 | 190 | 3.51 |
| Engine | 6D22 Registration 1995 | | | | | | | Ave | 685 | 213 | 3.22 |
| Total weight | 20,640kg | | | | | | | | | | |

conditions
- loadage : + ~500 kg
- Tank cleaning
- Driver
- Utilization of the highway : 5~10%
- using the power of loading and unloading
- direct delivery from fuelmakers

Figure 17 cont.
[Table 1 - continuation]

| <New eco-friendly lubrication oil (including 0.1 volume % of eco-substance)> 2010/2 ~ 2010/3 | | | | | | | | | | | | |
|---|---|---|---|---|---|---|---|---|---|---|---|---|
| to | | | from | | | Dates | Running distance (km) | fuel consumption amounts (l) | fuel consumption (km/l) | Reduction rate from normal (%) | Notes |
| | | | | | Load (kg) | | | | | | |
| NICCA CHEMICAL | Chiba | 9,000 | CHIBA SHISOU~ [illegible] | Chiba | 11160 | 2010/2/18-20 | 1,303 | 432 | 3.02 | -4% | |
| | | | | | | | | | | | |
| SK | Kawaguch | ★8730 | TOKUOKA | Tokyo | 10,430 | 2010/3/19-24 | 1,070 | 373 | 2.87 | -8% | Comparison data is insufficient. |
| | | | | | | | | | | | |
| | | | | | | | | | | | |
| | | | | | | | | | | | |
| TATEYAMA~ KANEKA | Toyama | 10,170 | - | | | 2010/2/9-10 | 1,031 | 317 | 3.25 | -7% | |
| TATEYAMA~ KANEKA | Toyama | 10,210 | - | | | 2010/3/24-25 | 1,014 | 320 | 3.17 | -5% | |
| | | | | | | Ave | 1,023 | 319 | 3.21 | -6% | |
| YONESHOU | Ishikawa | 10,670 | - | - | - | 2010/3/26-28 | 676 | 200 | 3.38 | -5% | |
| | | | | | | | | | | | |
| | | | | | | | | | | | |
| SK | Kawaguchi | ★5370 | SHIZUOKA AYUKA | Shizuoka | 10,800 | 2010/2/2-5 | 1,260 | 353 | 3.57 | -9% | |
| | | | | | | | | | | | |
| | | | | | | | | | | | |
| | | | | | | | | | | | |
| | | | | | | | | | | | |
| YONESHOU | Ishikawa | 10,710 | - | - | — | 2010/3/6-10 | 672 | 200 | 3.36 | -4% | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | Average of all vehicles | | | | -6% | |

Figure 18
[Table 2]

comparison in the fuel consumption <New eco-friendly lubrication oil (including 0.1 volume % of eco-substance)>

March ~ July

| March ~ July | | <Normal> ~ 2010/4/1 | | | | | | | | | |
|---|---|---|---|---|---|---|---|---|---|---|---|
| The vehicle information | | to | | | from | | | Dates | Running distance (km) | fuel consumption amount (l) | fuel consumption (km/l) |
| | | | | Load (kg) | | | Load (kg) | | | | |
| No. | Kobe-88-Ka-4112 | SK | Saitama | 10,000 | TOUSHIN | Nagano | 10,210 | 2008/10/17-21 | 1,219 | 432 | 2.62 |
| Type | ISUZU P-CXM19P rev | | | | | | | | | | |
| Engine | 10PC1 Registration 1985 | | | | | | | | | | |
| Total weight | 19,885kg | | | | | | | | ~ | | |
| | | | | | | | | | | | |
| | | | | | | | | | | | |
| No. | Kobe-88-Ka-4112 | TAMEKYUSHU | Iizuka | 9,900 | empty | ~ | ~ | 2008/9/23-24 | 1,250 | 370 | 3.38 |
| Type | MITSUBISHI P-FU415N rev | TAMEKYUSHU | Iizuka | 9,900 | empty | ~ | ~ | 2008/11/20-21 | 1,320 | 360 | 3.67 |
| Engine | 8DC9 Registration 1986 | | | | | | | Ave | 1,285 | 365 | 3.52 |
| Total weight | 19715kg | | | | | | | | | | |
| | | | | | | | | | | | |
| | | | | | | | | | | | |
| | | | | | | | | | | | |
| | | | | | | | | | | | |
| No. | Fukui-800-Ka-357 | KOGUNIS | Kitatone | 7,460 | MARUOU | Sendai | 10,270 | 2009/3/26-30 | 1,890 | 546 | 3.46 |
| Type | NISSAN P-CD45NC rev | | | | | | | | ~ | | |
| Engine | PE6 Registration 1989 | | | | | | | | | | |
| Total weight | 19,870kg | | | | | | | | | | |
| | | | | | | | | | | | |

<u>conditions</u>
- ·loadage : + ~ 500kg
- ·Tank cleaning
- ·Driver
- ·Utilization of the highway : 5~10%
- ·using the power of loading and unloading
- ·direct delivery from fuelmakers

Figure 18 cont.
[Table 2 - continuation]

| <New eco-friendly lubrication oil (including 0.1 volume % of eco-substance)> 2010/4/1 ~ | | | | | | | | Reduction rate from normal (%) |
|---|---|---|---|---|---|---|---|---|
| to | | from | | Dates | Running distance(km) | fuel consumption amount (l) | fuel consumption (km/l) | |
| | | | Load (kg) | | | | | |
| SK | 9,450 | TOUSHIN | 10250 | 2010/6/17-19 | 1,188 | 345 | 3.44 | −18% |
| | | | | | | | | |
| | | | | | | | | |
| | | | | | | | | |
| | | | | | | | | |
| | | | | | | | | −18% |
| TAMEKYUSHU | 9,900 | empty | | 2010/4/19-20 | 1,232 | 335 | 3.68 | −4% |
| TAMEKYUSHU | 9,900 | empty | | 2010/4/28-29 | 1,235 | 343 | 3.60 | −2% |
| TAMEKYUSHU | 9,900 | empty | | 2010/5/6-7 | 1,218 | 337 | 3.61 | −2% |
| TAMEKYUSHU | 9,900 | empty | | 2010/24-25 | 1,213 | 332 | 3.65 | −4% |
| TAMEKYUSHU | 9,900 | empty | | 2010/5/31-6/1 | 1,220 | 325 | 3.75 | −6% |
| TAMEKYUSHU | 9,900 | empty | | 2010/6/28-29 | 1,221 | 340 | 3.59 | −2% |
| | | | | Ave | 1,223 | 335 | 3.65 | −4% |
| | | | | | | | | −4% |
| KOGUNIS | 8,310 | MARUOU | 10,570 | From APR 22 to 28 | 1,930 | 509 | 3.79 | −9% |
| | | | | | | | | |
| | | | | | | | | |
| | | | | | | | | |
| | | | | | | | | −9% |
| | | | | Average of all vehicles | | | | −10% |

Figure 19
[Table 3]

running test using eco-substance in regular gasoline car test vehicle : BMW 1600
(running distance 82,000km)

<normal oil>

| Route | | | | | | | Date | |
|---|---|---|---|---|---|---|---|---|
| | local road | | Highway | | local road | | 9/19/2009 | |
| Departure | 33.5km → | Suma | 22km → | Nishinomiya | 12.4km → | Amagasaki | Distance | 67.9km |
| | | | | | | | Fuel | 5.69l |
| | | | | | | | Fuel consumption | 11.933km/l |

<new eco-friendly lubrication oil (0.1%)>

| Route | | | | | | | Date | |
|---|---|---|---|---|---|---|---|---|
| | local road | | Highway | | local road | | 3/13/2010 | |
| Departure | 33.5km → | Suma | 22km → | Nishinomiya | 12.4km → | Amagasaki | Distance | 67.9km |
| | | | | | | | Fuel | 5.69l |
| | | | | | | | Fuel consumption | 16.591km/l |
| | | | | | | | Reduction rate from normal (%) | -29.00% |

<normal oil>

| Route | | | | | | | Date | |
|---|---|---|---|---|---|---|---|---|
| | local road | | local road | | local road | | 9/19/2009 | |
| Departure | 12.87km → | Takarazuka | 9.49km → | Arima | 19.79km → | Amagasaki | Distance | 42.15km |
| | | | | | | | Fuel | 5.23l |
| | | | | | | | Fuel consumption | 8.06km/l |

<new eco-friendly lubrication oil (0.1%)>

| Route | | | | | | | Date | |
|---|---|---|---|---|---|---|---|---|
| | local road | | local road | | local road | | 3/13/2010 | |
| Departure | 12.87km → | Suma | 9.49km → | Nishinomiya | 19.79km → | Amagasaki | Distance | 42.15km |
| | | | | | | | Fuel | 4.04l |
| | | | | | | | Fuel consumption | 10.433km/l |
| | | | | | | | Reduction rate from normal (%) | -23.00% |

<normal oil>

| Route | | | | | Date | |
|---|---|---|---|---|---|---|
| | local road | | local road | | 9/20/2009 | |
| Departure | → | Hiokura dam | → | Amagasaki | Distance | 76.11km |
| | | | | | Fuel | 8.5l |
| | | | | | Fuel consumption | 8.95km/l |

<new eco-friendly lubrication oil (0.1%)>

| Route | | | | | Date | |
|---|---|---|---|---|---|---|
| | local road | | local road | | 3/13/2010 | |
| Departure | → | Hiokura dam | → | Amagasaki | Distance | 76.11km |
| | | | | | Fuel | 5.66l |
| | | | | | Fuel consumption | 13.447km/l |
| | | | | | Reduction rate from normal (%) | -33.00% |

Figure 19 cont.
[Table 3 - continuation]

| | | | | | | |
|---|---|---|---|---|---|---|
| Total of 3 runs | <normal oil> | | <new eco-friendly lubrication oil (0.1%)> | | | |
| | 2009/9/19,20 | | 9/13/2010 | | 9/20/2010 | |
| | Distance | 67.9km | Distance | 186.16km | Distance | 186.16km |
| | Fuel | 5.69l | Fuel | 13.72l | Fuel | 13.07l |
| | Fuel consumption | 16.591km/l | Fuel consumptio | 13.569km/l | Fuel consumptio | 14.243km/l |
| | | | Reduction rate from normal (%) | ~29% | Reduction rate from normal (%) | ~33% |

*2010/9/20
3 runs are same rute.
Departure Suma - Arima - Hitokura dam

Figure 20
[Table 4]

running test using eco-substance in high-octane gasoline car

<normal oil>

2007/10/7-8

| | | | | | | | | |
|---|---|---|---|---|---|---|---|---|
| | Highway | | local road | | local road | | local road | |
| Amagasaki | → | Takefu | → | Echizen | → | Tsuruga | → | |

2008/5/10-11

| | | | | | | | | |
|---|---|---|---|---|---|---|---|---|
| | | | local road | | Highway | | local road | |
| Amagasaki | → | Takefu | → | Echizen | → | Tsuruga | → | |

<new eco-friendly lubrication oil (0.1%)>

3/27/2010

| | | | | | | | | |
|---|---|---|---|---|---|---|---|---|
| | Highway | | local road | | local road | | local road | |
| Amagasaki | → | Takefu | → | Echizen | → | Tsuruga | → | |

2-Apr-10

| | | | | | | | | |
|---|---|---|---|---|---|---|---|---|
| | | | local road | | Highway | | local road | |
| Amagasaki | → | Takefu | → | Echizen | → | Tsuruga | → | |

Figure 20 cont.
[Table 4 - continuation]

test vehicle : Kobe 331 Tsu 800
Mercedes-Benz S-600
(running distance : 2009/6/20 60,000km)

Highway

| | | | | |
|---|---|---|---|---|
| KyotoHigashi | → | Amagasaki | Distance | 435km |
| | | | Fuel | 61.70l |
| | | | Fuel consumptior | 7.06024km/l |
| KyotoHigashi | → | Amagasaki | Distance | 434km |
| | | | Fuel | 61.00l |
| | | | Fuel consumptior | 7.1148km/l |
| | | | Average Fuel consumption of 2 runs | 7.0875km/l |

Highway

| | | | | |
|---|---|---|---|---|
| KyotoHigashi | → | Amagasaki | Distance | 420km |
| | | | Fuel | 43.04l |
| | | | Fuel consumptior | 9.7584km/l |
| KyotoHigashi | → | Amagasaki | Distance | 423km |
| | | | Fuel | 43.94l |
| | | | Fuel consumptior | 9.6268km/l |
| | | | Average Fuel consumption of 2 runs | 9.6929km/l |

| | |
|---|---|
| Reduction rate from normal (%) | -27% |

Figure 21
[Table 6]

comparison in the fuel consumption <New eco-friendly lubrication oil (including 0.3 volume % of eco-substance)> April ~ July

| April ~ July | | | <Normal> ~ 2010/4/20 | | | | | | | | | |
|---|---|---|---|---|---|---|---|---|---|---|---|---|
| vehicle information | | | to | | | from | | | Dates | Running distance(km) | fuel consumption amount (l) | fuel consumption (km/l) |
| | | | | | Load (kg) | | | Load (kg) | | | | |
| No. | Kobe-88-Ka-3887 | | KOGUNIS | Kitatone | 8,320 | NIIGATA CHEMICAL | Niigata | 11,480 | 2008/4/22-25 | 1,405 | 503 | 2.79 |
| Type | ISUZU P-CXM19P rev | | | | | | | | | | | |
| Engine | 10PC1 | Registration 1984 | | | | | | | | | | |
| Total weight | 19,975kg | | | | | | | | | … | | |
| | | | | | | | | | | | | |
| | | | | | | | | | | | | |
| No. | Kobe-88-Ka-3900 | | SK | Kawaguchi | 5,560 | TOUSHIN | Nagano | 10,520 | 2008/9/24-28 | 1,353 | 478 | 2.83 |
| Type | ISUZU P-CXM19P rev | | SK | Kawaguchi | 5,350 | TOUSHIN | Nagano | 9940 | 2008/7/29-31 | 1,353 | 461 | 2.93 |
| Engine | 10PC1 | Registration 1984 | | | | | | | Ave | 1,353 | 470 | 2.88 |
| Total weight | 19,835kg | | | | | | | | | | | |
| | | | | | | | | | | | | |
| | | | | | | | | | | | | |

conditions
- ·loadage : + ~ 500kg
- ·Tank cleaning
- ·Driver
- ·Utilization of the highway : 5 ~ 10%
- ·using the power of loading and unloading
- ·direct delivery from fuelmakers

Figure 21 cont.

[Table 6 - continuation]

| <New eco-friendly lubrication oil (including 0.1 volume % of eco-substance)> 2010/4/20 ~ | | | | | | | | |
|---|---|---|---|---|---|---|---|---|
| to | | from | | Dates | Running distance(km) | fuel consumption amount (l) | fuel consumption (km/l) | Reduction rate from normal (%) |
| | | | Load (kg) | | | | | |
| KOGUNIS | 7,530 | NIIGATA CHEMICAL | 11850 | 2010/4/23-27 | 1,405 | 448 | 3.14 | −11% |
| | | | | | | | | |
| | | | | | | | | |
| | | | | | | | | |
| | | | | | | | | |
| | | | | | | | | −11% |
| SK | 8,720 | TOUSHIN | 10050 | 2010/4/26-28 | 1,326 | 416 | 3.21 | −10% |
| | | | | | | | | |
| | | | | | | | | |
| | | | | | | | | |
| | | | | | | | | |
| | | | | | | | | −10% |
| | | | | Average of all vehicles | | | | −10% |

Figure 22
[Table 7]

comparison in the fuel consumption <New eco-friendly lubrication oil (including 0.3 volume % of eco-substance)> April~August

| April~August | | <Normal> ~ 2010/4/20 | | | | | | | | | |
|---|---|---|---|---|---|---|---|---|---|---|---|
| vehicle information | | to | | | from | | | Dates | Running distance(km) | fuel consumption amounts(l) | fuel consumption (km/l) |
| | | | | Load (kg) | | | Load (kg) | | | | |
| No. | Kobe-88-Ka-3714 | KOGUNIS | Kitatone | 8,200 | [illegible] | Niigata | 10,100 | 2008/5/23-26 | 1,575 | 555 | 2.84 |
| Type | ISUZU P-CXM19P rev | | | | | | | | | | |
| Engine | 10PC1 Registration 1984 | | | | | | | | | | |
| Total weight | 19,950kg | | | | | | | | | | |
| | | | | | | | | | | | |
| | | | | | | | | | | | |
| No. | Kobe-88-Ka-3887 | KOGUNIS | Kitatone | 8,320 | [illegible] | Niigata | 11,480 | 2008/4/22-25 | 1,405 | 503 | 2.79 |
| Type | ISUZU P-CXM19P rev | | | | | | | | | | |
| Engine | 10PC1 Registration 1984 | | | | | | | | | | |
| Total weight | 19,975kg | | | | | | | | | | |
| | | | | | | | | | | | |
| | | | | | | | | | | | |
| No. | Kobe-88-Ka-3900 | SK | Kawaguchi | 5,560 | TOUSHIN | Nagano | 10,520 | 2008/9/24-26 | 1,353 | 478 | 2.83 |
| Type | ISUZU P-CXM19P rev | SK | Kawaguchi | 5,250 | TOUSHIN | Nagano | 9,940 | 2008/7/29-31 | 1,353 | 461 | 2.93 |
| Engine | 10PC1 Registration 1984 | | | | | | | Ave | 1,353 | 470 | 2.88 |
| Total weight | 19,835kg | | | | | | | | | | |
| | | | | | | | | | | | |
| | | | | | | | | | | | |

conditions
- ·loadage : + -500kg
- ·Tank cleaning
- ·Driver
- ·Utilization of the highway : 5~10%
- ·using the power of loading and unloading
- ·direct delivery from fuelmakers

Figure 22 cont.
[Table 7 - continuation]

| <New eco-friendly lubrication oil (including 0.1 volume % of eco-substance)> 2010/4/20 ~ | | | | | | | | |
|---|---|---|---|---|---|---|---|---|
| to | | from | | Dates | Running distance(km) | fuel consumption amount(l) | fuel consumption (km/l) | Reduction rate from normal (%) |
| | | | Load (kg) | | | | | |
| KOGUNIS | 7,510 | [illegible] | 10270 | 2010/8/6~11 | 1,576 | 538 | 2.93 | -3% |
| | | | | | | | | |
| | | | | | | | | |
| | | | | | | | | |
| | | | | | | | | |
| | | | | | | | Ave | -3% |
| KOGUNIS | 7,530 | NIIGATA CHEMICAL | 11850 | 2010/4/23~27 | 1,405 | 448 | 3.14 | -11% |
| | | | | | | | | |
| | | | | | | | | |
| | | | | | | | | |
| | | | | | | | | |
| | | | | | | | Ave | -11% |
| SK | 8,720 | TOUSHIN | 10,050 | 2010/4/26~28 | 1,336 | 416 | 3.21 | -10% |
| | | | | | | | | |
| | | | | | | | | |
| | | | | | | | | |
| | | | | | | | | |
| | | | | | | | Ave | -10% |
| | | | | Average of all vehicles | | | | -8% |

Figure 23
[Table 8]

Transport running test (vehicle No.353)

Destination : YASHIROIGA (Iga-shi, Mie) - NICHIHAKU (Amagasaki-shi)
Condition : same driver, same load using normal oil

| month | service frequency | running distance per a | total transport tonnage (t) | transport tonnage | average fuel per one service | running distance (km) | fuel (l) | fuel consumption |
|---|---|---|---|---|---|---|---|---|
| Jan | 14 | 272 | 105.920 | 7.566 | 74.14 | 3,812 | 1,038 | 3.67 |
| Feb | 16 | 253 | 120.080 | 7.505 | 60.25 | 4,048 | 964 | 4.20 |
| Mar | 16 | 251 | 120.480 | 7.53 | 67.38 | 4,019 | 1,078 | 3.73 |
| Apr | 16 | 252 | 120.340 | 7.521 | 75.88 | 4,028 | 1,214 | 3.32 |
| May | 14 | 249 | 104.370 | 7.455 | 73.29 | 3,492 | 1,026 | 3.40 |
| Jun | 18 | 252 | 135.400 | 7.522 | 57.56 | 4,531 | 1,036 | 4.37 |
| Jul | 26 | 260 | 203.000 | 7.808 | 67.27 | 6,761 | 1,749 | 3.87 |
| total | 120 | 1789 | 909.590 | 52.907 | 475.77 | 30,691 | 8,105 | 26.56 |
| average | 17 | 256 | 129.941 | 7.58 | 67.54 | 4384 | 1,158 | 3.79 |

ısing new eco-friendly lubrication o 2010/8/18-

| month | service frequency | running distance per a | total transport tonnage (t) | transport tonnage | average fuel per one service | running distance (km) | fuel (l) | fuel consumption | Reduction rate from normal |
|---|---|---|---|---|---|---|---|---|---|
| 9/9-15 | 6 | 250 | 45.060 | 7.51 | 62.5 | 1,502 | 375 | 4.01 | -5.50% |
| 9/16-22 | 6 | 253 | 44.980 | 7.497 | 67 | 1,516 | 402 | 3.77 | 0.40% |
| 9/23-29 | 6 | 251 | 44.820 | 7.47 | 65 | 1,504 | 390 | 3.86 | -1.80% |
| 9/30-10/6 | 6 | 249 | 45.350 | 7.558 | 63.83 | 1,491 | 383 | 3.89 | -2.70% |
| 10/7-13 | 6 | 248 | 45.390 | 7.565 | 62.5 | 1,490 | 375 | 3.97 | -4.70% |
| 10/14-18 | 4 | 248 | 29.980 | 7.495 | 62.75 | 992 | 251 | 3.95 | -4.20% |
| total | 34 | 1499 | 255.580 | 45.095 | 383.58 | 8,495 | 2,176 | 23.45 | |
| average | 5.7 | 250 | 42.597 | 7.516 | 63.93 | 1416 | 363 | 3.91 | -3.00% |

| Reduction rate from normal (%) |
|---|
| -5.20% |

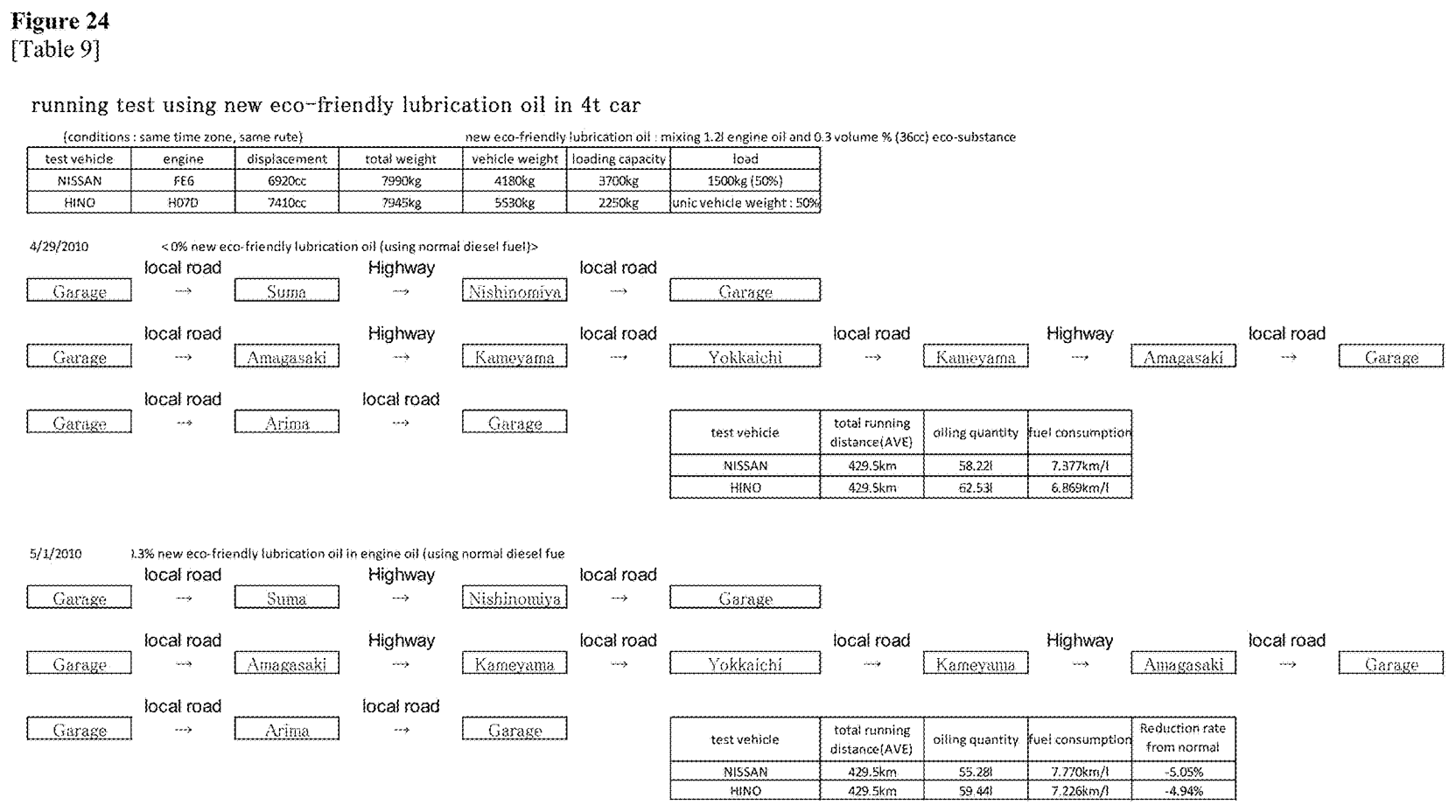

Figure 24
[Table 9]

running test using new eco-friendly lubrication oil in 4t car (conditions : same time zone, same rute) new eco-friendly lubrication oil : mixing 1.2l engine oil and 0.3 volume % (36cc) eco-substance

| test vehicle | engine | displacement | total weight | vehicle weight | loading capacity | load |
|---|---|---|---|---|---|---|
| NISSAN | FE6 | 6920cc | 7990kg | 4180kg | 3700kg | 1500kg (50%) |
| HINO | H07D | 7410cc | 7945kg | 5530kg | 2250kg | unic vehicle weight : 50% |

4/29/2010 <0% new eco-friendly lubrication oil (using normal diesel fuel)>

Garage → (local road) Suma → (Highway) Nishinomiya → (local road) Garage

Garage → (local road) Amagasaki → (Highway) Kameyama → (local road) Yokkaichi → (local road) Kameyama → (Highway) Amagasaki → (local road) Garage Garage → (local road) Arima → (local road) Garage

| test vehicle | total running distance(AVE) | oiling quantity | fuel consumption |
|---|---|---|---|
| NISSAN | 429.5km | 58.22l | 7.377km/l |
| HINO | 429.5km | 62.53l | 6.869km/l |

5/1/2010 ).3% new eco-friendly lubrication oil in engine oil (using normal diesel fue Garage → (local road) Suma → (Highway) Nishinomiya → (local road) Garage Garage → (local road) Amagasaki → (Highway) Kameyama → (local road) Yokkaichi → (local road) Kameyama → (Highway) Amagasaki → (local road) Garage Garage → (local road) Arima → (local road) Garage

| test vehicle | total running distance(AVE) | oiling quantity | fuel consumption | Reduction rate from normal |
|---|---|---|---|---|
| NISSAN | 429.5km | 55.28l | 7.770km/l | -5.05% |
| HINO | 429.5km | 59.44l | 7.226km/l | -4.94% |

Figure 25
[Table 10]

running test using new eco-friendly lubrication oil test vehicle : NISSAN SAFARI
conditions : load +-30kg, same vehicle, same driver, fuel tolerance 100cc

| | Normal oil | | | new eco-friendly lubrication oil (including 0.3 volume % of eco-substance) | | | | | |
|---|---|---|---|---|---|---|---|---|---|
| month | Jan | Feb | Mar | Apr | May | Jun | Jul | Aug | Sep |
| working days | 18days | 24days | 25days | 21days | 22days | 25days | 23days | 23days | 24days |
| running distance per month | 101734km | 102090km | 102445km | 102778km | 103205km | 103744km | 104413km | 104946km | 105455km |
| main destination & running distance | Nishinomiya 12km<br>Ishimichi 48km<br>Hitokura 61km<br>Nada 36km | Hitokura dam 61km<br>Hitokura dam 61km<br>Nada 36km | Nishinomiya 12km<br>Ishimichi 48km<br>Nada 36km | Osaka 50km<br>Hitokura dam 61km<br>Hitokura dam 61km<br>Nada 36km | Sakai 70km<br>Hitokura dam 61km<br>Sakai 35km<br>Nada 36km | Sanda 88km<br>Suma 80km<br>Nada 36km | Sanda 93km<br>Nada 36km | Hitokura dam 61km<br>Ishimichi 48km<br>Nada 36km<br>Hitokura dam 61km | Hitokura dam 61km<br>Nishinomiya 12km<br>Izumi-shi 120km<br>Nada 36km<br>Kobe 61km<br>Morinomiya 40km<br>Izumisano 90km<br>KobeMaya 42km |
| total running distance | 157km | 158km | 96km | 208km | 202km | 204km | 129km | 206km | 461km |
| comuting (2km), less than 10km per | 199km | 197km | 237km | 219km | 337km | 465km | 404km | 303km | 351km |
| running distance | 356km | 355km | 333km | 427km | 539km | 669km | 533km | 509km | 812km |
| amount used fuel | 67.8l | 64.23l | 61.92l | 66.54l | 83.14l | 93.28l | 78.18l | 74.24l | 108.35l |
| fuel consumption | 5.251km/l | 5.527km/l | 5.378km/l | 6.417km/l | 6.483km/l | 7.172km/l | 6.818km/l | 6.856km/l | 7.494km/l |
| average of fuel consumption (normal oil, 3months) | | | 5.385 | | | | | | |
| Reduction rate from normal (%) | | | | -16% | -17% | -25% | -21% | -21% | -28% |
| | | | | average of fuel consumption (new eco-friendly lubrication oil, 5months) | | 6.873 | Reduction rate from normal (%) | -22% | |

Figure 26
[Table 11]

running test using the eco-substance in regular gasoline car test vehicle : BMW 1600
(running distance 82,000km)

<normal oil>

| | local road | | Highway | | local road | | | |
|---|---|---|---|---|---|---|---|---|
| | 33.5km | | 22km | | 12.4km | | 9/19/2009 | |
| Departure | → | Suma | → | Nishinomiya | → | Amagasaki | Distance | 67.9km |
| | | | | | | | Fuel | 5.69l |
| | | | | | | | Fuel consumptic | 11.933km/l |

<new eco-friendly lubrication oil (0.3%)

| | local road | | Highway | | local road | | 8/11/2010 | 8/21/2010 |
|---|---|---|---|---|---|---|---|---|
| | 33.5km | | 22km | | 12.4km | | * traffic jam 40minutes | * traffic jam 0minutes |
| Departure | → | Suma | → | Nishinomiya | → | Amagasaki | * using air conditioner | * using air conditioner |

<normal oil>

| | local road | | local road | | local road | | | |
|---|---|---|---|---|---|---|---|---|
| | 12.87km | | 9.49km | | 19.79km | | 9/19/2009 | |
| Departure | → | Takarazuka | → | Arima | → | Amagasaki | Distance | 42.15km |
| | | | | | | | Fuel | 5.23l |
| | | | | | | | Fuel consumptic | 8.06km/l |

<new eco-friendly lubrication oil (0.3%)

| | local road | | local road | | local road | | 8/11/2010 | 8/21/2010 |
|---|---|---|---|---|---|---|---|---|
| | 12.87km | | 9.49km | | 19.79km | | * traffic jam 40minutes | * traffic jam 0minutes |
| Departure | → | Suma | → | Nishinomiya | → | Amagasaki | * using air conditioner | * using air conditioner |

<normal oil>

| | local road | | local road | | 9/20/2009 | |
|---|---|---|---|---|---|---|
| | | | | | Distance | 76.11km |
| Departure | → | Hitokura dam | → | Amagasaki | Fuel | 8.5l |
| | | | | | Fuel consumptic | 8.95km/l |

<new eco-friendly lubrication oil (0.1%)>

| | local road | | local road | | 8/11/2010 | 8/21/2010 |
|---|---|---|---|---|---|---|
| | | | | | * traffic jam 40minutes | * traffic jam 0minutes |
| Departure | → | Hitokura dam | → | Amagasaki | * using air conditioner | * using air conditioner |

<normal oil>

| 2009/9/19,20 | |
|---|---|
| Distance | 186.16km |
| Fuel | 19.42l |
| Fuel consumption | 9.586km/l |

<new eco-friendly lubrication oil (0.1%)>

| 8/11/2010 | | 8/21/2010 | |
|---|---|---|---|
| Distance | 186.16km | Distance | 186.16km |
| Fuel | 17.45l | Fuel | 14.95l |
| Fuel consumpti | 10.668km/l | Fuel consumpti | 12.452km/l |
| Reduction rate from normal (%) | -10% | Reduction rate from normal (%) | -23% |

Figure 27
[Table 12]

running test using the eco-substance in high-octane gasoline car test vehicle : Kobe 331 Tsu 800
Mercedes-Benz S-600
(running distance : 2009/6/20 60,000km)

<normal oil>

2007/10/7-8

Amagasaki → (Highway) → Takefu → (local road) → Echizen → (local road) → Tsuruga → (local road) → KyotoHigashi → (Highway) → Amagasaki

| | |
|---|---|
| Distance | 435km |
| Fuel | 61.70l |
| Fuel consumpti | 7.06024km/l |

2008/5/10-11

Amagasaki → Takefu → (local road) → Echizen → (Highway) → Tsuruga → (local road) → KyotoHigashi → Amagasaki

| | |
|---|---|
| Distance | 434km |
| Fuel | 61.00l |
| Fuel consumpti | 7.1148km/l |
| Average fuel consumption of 2 runs | 7.0875km/l |

<new eco-friendly lubrication oil (0.3 volume% eco-substanc

2010/5/8-9

Amagasaki → (Highway) → Takefu → (local road) → Echizen → (local road) → Tsuruga → (local road) → KyotoHigashi → (Highway) → Amagasaki

| | |
|---|---|
| Distance | 420km |
| Fuel | 43.76l |
| Fuel consumpti | 9.5978km/l |

2010/5/22-23

Amagasaki → Takefu → (local road) → Echizen → (Highway) → Tsuruga → (local road) → KyotoHigashi → Amagasaki

| | |
|---|---|
| Distance | 420km |
| Fuel | 43.21l |
| Fuel consumpti | 9.7200km/l |
| Average fuel consumption of 2 runs | 9.6589km/l |

| | |
|---|---|
| Reduction rate from normal (%) | -26.6% |

Figure 28
[Table 13]

running test usingthe eco-substance in high-octane gasoline car test vehicle : Kobe 331 Tsu 800
Mercedes-Benz S-600
(running distance : 2009/6/20 60,000km)

<normal oil>
2007/10/7-8

| | | | | | | | | | | |
|---|---|---|---|---|---|---|---|---|---|---|
| | Highway | | local road | | local road | | local road | | Highway | |
| Amagasaki | → | Takefu | → | Echizen | → | Tsuruga | → | KyotoHigashi | → | Amagasaki |

Distance 435km
Fuel 61.70l
Fuel consumpti 7.06024km/l

2008/5/10-11

| | | | | | | | | | | |
|---|---|---|---|---|---|---|---|---|---|---|
| | | | local road | | Highway | | local road | | | |
| Amagasaki | → | Takefu | → | Echizen | → | Tsuruga | → | KyotoHigashi | → | Amagasaki |

Distance 434km
Fuel 61.00l
Fuel consumpti 7.1148km/l

| Average Fuel consumption of 2 runs | 7.0875km/l |
|---|---|

<new eco-friendly lubrication oil (0.5 volume% eco-substanc
10/17/2010

| | | | | | | | | | | |
|---|---|---|---|---|---|---|---|---|---|---|
| | Highway | | local road | | local road | | local road | | Highway | |
| Amagasaki | → | Takefu | → | Echizen | → | Tsuruga | → | KyotoHigashi | → | Amagasaki |

Distance 431km
Fuel 45.14l
Fuel consumpti 9.548km/l

| Reduction rate from normal (%) | -25.8% |
|---|---|

Figure 29
[Table 14]

running test using new eco-friendly lubrication oil in regular gasoline car test vehicle : BMW 1600 test-day : 2010/10/11 weather : fine

| | | | | | | | |
|---|---|---|---|---|---|---|---|
| Departure | → | Suma | → | Nishinomiya | → | Amagasaki | 68.87km |
| Departure | → | Hitokura dam | → | Amagasaki | | | 63.23km |
| Departure | → | Takarazuka | → | Arima | → | Amagasaki | 48.11km |

total : 180.21km

10/11/2010

| | |
|---|---|
| Distance | 180.21km |
| Fuel | 11.63l |
| Fuel consumptior | 15.495km/l |

---

| | | | | | | |
|---|---|---|---|---|---|---|
| Departure | → | Suma | → | Nishinomiya | → | Amagasaki |
| Departure | → | Hitokura dam | → | Amagasaki | | |
| Departure | → | Takarazuka | → | Arima | → | Amagasaki |

<normal oil>
2009/9/19,21

| | |
|---|---|
| Distance | 186.16km |
| Fuel | 19.42l |
| Fuel consumptior | 9.586km/l |

| | |
|---|---|
| Reduction rate from normal (%) | -10% |

Figure 30
[Table 17]

resarch table of car condition

| car No. 8002 | driver | YAHARI | | | | | | notes | |
|---|---|---|---|---|---|---|---|---|---|
| engine | feeling | horsepower | feeling | fuel | feeling | smoke | feeling | 9/16/2010 | |
| good | | good | | little | | little | | tractor / gross weight / 40t | |
| unknown | * | unchanged | * | unchanged | * | unchanged | * | | |
| bad | | bad | | much | | much | | sign:MAKITA | sign:YAHARI |

resarch table of car condition

| car No. 3867 | driver | TSUGAWA | | | | | | notes | |
|---|---|---|---|---|---|---|---|---|---|
| engine | feeling | horsepower | feeling | fuel | feeling | smoke | feeling | 9/16/2010 | |
| good | * | good | * | little | * | little | | large-sized-car / 20t | |
| unknown | | unchanged | | unchanged | | unchanged | * | | |
| bad | | bad | | much | | much | | sign:MAKITA | sign:TSUGAWA |

resarch table of car condition

| car No. 3714 | driver | SEKIGUCHI | | | | | | notes | |
|---|---|---|---|---|---|---|---|---|---|
| engine | feeling | horsepower | feeling | fuel | feeling | smoke | feeling | 9/17/2010 | |
| good | | good | | little | * | little | | large-sized-car / 20t | |
| unknown | * | unchanged | | unchanged | | unchanged | * | | |
| bad | | bad | * | much | | much | | sign:MAKITA | sign:SEKIGUCHI |

resarch table of car condition

| car No. 3800 | driver | INOUE | | | | | | notes | |
|---|---|---|---|---|---|---|---|---|---|
| engine | feeling | horsepower | feeling | fuel | feeling | smoke | feeling | 9/16/2010 | |
| good | * | good | | little | * | little | * | large-sized-car / 20t | |
| unknown | | unchanged | * | unchanged | | unchanged | | engine is smooth | |
| bad | | bad | | much | | much | | sign:MAKITA | sign:INOUE |

resarch table of car condition

| car No. 4914 | driver | TUKANO | | | | | | notes | |
|---|---|---|---|---|---|---|---|---|---|
| engine | feeling | horsepower | feeling | fuel | feeling | smoke | feeling | 9/16/2010 | |
| good | * | good | * | little | * | little | | large-sized-car / 20t | |
| unknown | | unchanged | | unchanged | | unchanged | * | | |
| bad | | bad | | much | | much | | sign:MAKITA | sign:TUKANO |

Figure 30 cont.
[Table 17 - continuation]

research table of car condition

| car No. 6001 | driver | SUGA | | | | | | notes | |
|---|---|---|---|---|---|---|---|---|---|
| engine | feeling | horsepower | feeling | fuel | feeling | smoke | feeling | 9/16/2010 | |
| good | | good | * | little | | little | * | large-sized-car / 20t | |
| unknown | * | unchanged | | unchanged | * | unchanged | | | |
| bad | | bad | | much | | much | | sign:MAKITA | sign:SUGA |

research table of car condition

| car No. 357 | driver | TAKEDA | | | | | | notes | |
|---|---|---|---|---|---|---|---|---|---|
| engine | feeling | horsepower | feeling | fuel | feeling | smoke | feeling | 9/17/2010 | |
| good | * | good | | little | * | little | | large-sized-car / 20t | |
| unknown | | unchanged | * | unchanged | | unchanged | * | oil consumption amount decreas | |
| bad | | bad | | much | | much | | sign:MAKITA | sign:TAKEDA |

research table of car condition

| car No. 353 | driver | Shin YAMADA | | | | | | notes | |
|---|---|---|---|---|---|---|---|---|---|
| engine | feeling | horsepower | feeling | fuel | feeling | smoke | feeling | 9/21/2010 | |
| good | | good | | little | | little | | large-sized-car / 20t | |
| unknown | * | unchanged | | unchanged | * | unchanged | * | smoke amount decrease | |
| bad | | bad | * | much | | much | | sign:MAKITA | sign:YAMADA |

Figure 31
[Table 18]

resarch table of car condition

| car No. 348 | driver | ARATANI | | | | | | notes |
|---|---|---|---|---|---|---|---|---|
| engine | feeling | horsepower | feeling | fuel | feeling | smoke | feeling | 10/13/2010 |
| good | * | good | | little | | little | | I feel that |
| unknown | | unchanged | * | unchanged | * | unchanged | * | the condition of engine is good |
| bad | | bad | | much | | much | | sign:ARATANI |

resarch table of car condition

| car No. 428 | driver | Tadashi YAMADA | | | | | | notes |
|---|---|---|---|---|---|---|---|---|
| engine | feeling | horsepower | feeling | fuel | feeling | smoke | feeling | 10/1/2010 |
| good | * | good | * | little | * | little | | |
| unknown | | unchanged | | unchanged | | unchanged | * | |
| bad | | bad | | much | | much | | sign:YAMADA |

resarch table of car condition

| car No. 4112 | driver | HARUNA | | | | | | notes |
|---|---|---|---|---|---|---|---|---|
| engine | feeling | horsepower | feeling | fuel | feeling | smoke | feeling | 9/30/2010 |
| good | * | good | | little | * | little | * | |
| unknown | | unchanged | * | unchanged | | unchanged | | |
| bad | | bad | | much | | much | | sign:HARUNA |

resarch table of car condition

| car No. 4397 | driver | YAMAGUCHI | | | | | | notes |
|---|---|---|---|---|---|---|---|---|
| engine | feeling | horsepower | feeling | fuel | feeling | smoke | feeling | 9/30/2010 |
| good | * | good | | little | * | little | * | I feel unchanged |
| unknown | | unchanged | * | unchanged | | unchanged | | |
| bad | | bad | | much | | much | | sign:YAMAGUCHI |

Figure 32

[Table 19]

resarch table of car condition

| car No. 8003 | driver | GOTOU | | | | | | notes |
|---|---|---|---|---|---|---|---|---|
| engine | feeling | horsepower | feeling | fuel | feeling | smoke | feeling | 10/1/2010 |
| good | | good | * | little | | little | | I feel that |
| unknown | * | unchanged | | unchanged | * | unchanged | * | engine is good in uphill |
| bad | | bad | | much | | much | | sign:GOTOU |

resarch table of car condition

| car No. 427 | driver | UMEDA | | | | | | notes |
|---|---|---|---|---|---|---|---|---|
| engine | feeling | horsepower | feeling | fuel | feeling | smoke | feeling | 10/7/2010 |
| good | * | good | | little | | little | * | |
| unknown | | unchanged | * | unchanged | * | unchanged | | |
| bad | | bad | | much | | much | | sign:UMEDA |

resarch table of car condition

| car No. 358 | driver | MIYAZU | | | | | | notes |
|---|---|---|---|---|---|---|---|---|
| engine | feeling | horsepower | feeling | fuel | feeling | smoke | feeling | 10/1/2010 |
| good | | good | * | little | * | little | | I feel that |
| unknown | * | unchanged | | unchanged | | unchanged | * | horsepower is slightly stronger |
| bad | | bad | | much | | much | | sign:MIYAZU |

resarch table of car condition

| car No. 438 | driver | MUKAI | | | | | | notes |
|---|---|---|---|---|---|---|---|---|
| engine | feeling | horsepower | feeling | fuel | feeling | smoke | feeling | 10/1/2010 |
| good | | good | | little | | little | | It is quiet during |
| unknown | * | unchanged | * | unchanged | * | unchanged | * | rotation of the engine is raised |
| bad | | bad | | much | | much | | sign:MUKAI |

Figure 33
[Table 38]

| | |
|---|---|
| No. | Kobe-88-Ka-4397 |
| Type | MITSUBISHI P-FU419N |
| Engine | 8DC9 / Registration 1998 |
| Total weight | 18719kg |

destination data　loading point : Kobe-shi, Hyogo　The comparison in the fuel amounts & the fuel consumption
unloading point : Iizuka-shi, Fukuoka　From 13 April to 31 October

| <Normal> ~ 2009/4/13 | | | | | | | | | | | |
|---|---|---|---|---|---|---|---|---|---|---|---|
| to | | | from | | | Dates | Running distance(km) | fuel consumption amounts (l) | fuel consumption (km/l) | to | |
| | | Load (kg) | | | Load (kg) | | | | | | |
| TAIHEIKYUSHU | Iizuka | 9,900 | empty | ... | ... | 2008/9/23~24 | 1,250 | 370 | 3.38 | TAIHEIKYUSHU | Iizuka |
| TAIHEIKYUSHU | Iizuka | 9,900 | empty | ... | ... | 2008/11/20~21 | 1,320 | 360 | 3.67 | TAIHEIKYUSHU | Iizuka |
| | | | | | | | | | | TAIHEIKYUSHU | Iizuka |
| | | | | | | Ave | 1285 | 365 | 3.52 | TAIHEIKYUSHU | Iizuka |
| | | | | | | | | | | TAIHEIKYUSHU | Iizuka |
| | | | | | | | | | | TAIHEIKYUSHU | Iizuka |
| | | | | | | | | | | TAIHEIKYUSHU | Iizuka |
| | | | | | | | | | | TAIHEIKYUSHU | Iizuka |
| | | | | | | | | | | | |
| | | | | | | | | | | | |

conditions　・loadage : +-500kg　・Tank cleaning　・Driver
・Utilization of the highway : 5~10%　・using the power of loading and unloading　・direct delivery from fuelmakers

Figure 33 cont.
[Table 38 - continuation]

| <injecting 0.99~1 volume % of eco-substance)> 2009/4/13 ~ | | | | | | | | | | |
|---|---|---|---|---|---|---|---|---|---|---|
| | from | | | Dates | Running distance(km) | fuel consumption amount(l) | fuel consumption (km/l) | Reduction rate from normal (%) | Notes | average of reduction rate from normal (%) |
| | | | Load (kg) | | | | | | | |
| 9,900 | empty | ~ | ~ | 2009/5/15~18 | 1,218 | 340 | 3.58 | ~2% | | -5% |
| 9,900 | empty | ~ | ~ | 2009/5/15~18 | 1,351 | 340 | 3.97 | ~11% | | |
| 9,900 | empty | ~ | ~ | 2009/6/8~9 | 1,224 | 330 | 3.71 | ~5% | | |
| 9,900 | empty | ~ | ~ | 2009/7/28~29 | 1,223 | 335 | 3.65 | ~2% | | |
| 9,900 | empty | ~ | ~ | 2009/8/24~25 | 1,316 | 345 | 3.81 | ~8% | | |
| 9,900 | empty | ~ | ~ | 2009/10/14~15 | 1,225 | 335 | 3.66 | ~4% | | |
| 9,900 | empty | ~ | ~ | 2009/10/22~23 | 1,222 | 330 | 3.70 | ~5% | | |
| 9,900 | empty | ~ | ~ | 2009/10/26/27 | 1,214 | 330 | 3.68 | ~4% | | |
| | | | | Ave | 1,249 | 336 | 3.72 | ~5% | | |
| | | | | | | | | | | |

Figure 34
[Table 39]

destination data

| | | |
|---|---|---|
| to | loading point : | Amagasaki-shi, Hyogo |
| | unloading point : | Kawaguchi-shi, Saitama |
| from | loading point : | Ueda-shi, Nagano |
| | unloading point : | Amagasaki-shi, Hyogo |

| <Normal> ~ 2009/4/13 | | | | | | | | | | | |
|---|---|---|---|---|---|---|---|---|---|---|---|
| to | | | from | | | Dates | Running distance(km) | fuel consumption amounts (l) | fuel consumption (km/l) | to | |
| | | Load (kg) | | | Load (kg) | | | | | | |
| SK | Kawaguchi | 10,100 | TOUSHIN | Nagano | 10,200 | 2008/ 10/7~21 | 1,219 | 432 | 2.82 | SK | Kawaguchi |
| | | | | | | | | | | SK | Kawaguchi |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |

・loadage : + — 500kg
・Utilization of the highway : 5~10%
・Tank cleaning ・Driver
・using the power of loading and unloading ・direct delivery from fuelmakers

Figure 34 cont.
[Table 39 - continuation]

comparison in the fuel amounts & the fuel consumption

From 13 April to 31 October

| | | | |
|---|---|---|---|
| No. | Kobe-88-Ka-4112 | | |
| Type | ISUZU P-CXM19P rev | | |
| Engine | 10PC1 | Registration | 1985 |
| Total weight | 19,885kg | | |

<injecting 0.99~1 volume % of eco-substance>
2009/4/13 ~

| | from | | Load (kg) | Dates | Running distance(km) | fuel consumption amounts(l) | fuel consumption (km/l) | Reduction rate from normal (%) | Notes | average of reduction rate from normal (%) |
|---|---|---|---|---|---|---|---|---|---|---|
| 10,100 | TOUSHIN | Nagano | 10,300 | 2009/ 5/14~18 | 11,213 | 415 | 2.92 | -3% | | -12% |
| 10,100 | TOUSHIN | Nagano | 10,300 | 2009/ 10/27~29 | 1,207 | 405 | 2.98 | -5% | | |
| | | | | Ave | 1,210 | 410 | 2.95 | -4% | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |

Figure 35
[Table 40]

destination data to loading point : Amagasaki-shi, Hyogo
unloading point : Kawaguchi-shi, Saitama from loading point : Ueda-shi, Nagano
unloading point : Amagasaki-shi, Hyogo

| <Normal> ~ 2009/4/13 | | | | | | | | | | | |
|---|---|---|---|---|---|---|---|---|---|---|---|
| to | | | from | | | Dates | Running distance(km) | fuel consumption amount(ℓ) | fuel consumption (km/ℓ) | to | |
| | | Load (kg) | | | Load (kg) | | | | | | |
| SK | Kawaguchi | 6,300 | TOUSHIN | Nagano | 10,750 | 2008/ 4/4~8 | 1,220 | 419 | 2.91 | SK | Kawaguchi |
| SK | Kawaguchi | 8,050 | TOUSHIN | Nagano | 10,700 | 2008/ 5/12~14 | 1,220 | 390 | 3.13 | | |
| SK | Kawaguchi | 10,000 | TOUSHIN | Nagano | 10,250 | 2008/ 8/25~27 | 1,220 | 400 | 3.05 | | |
| | | | | | | Ave | 1220 | 403 | 3.03 | | |
| | | | | | | | | | | | |
| | | | | | | | | | | | |
| | | | | | | | | | | | |
| | | | | | | | | | | | |
| | | | | | | | | | | | |
| | | | | | | | | | | | |

conditions
- loadage : +—500kg
- Utilization of the highway : 5～10%
- Tank cleaning
- Driver
- using the power of loading and unloading
- direct delivery from fuelmakers

Figure 35 cont.
[Table 40 - continuation]

comparison in the fuel amounts & the fuel consumption

From 13 April to 31 October

| | | | |
|---|---|---|---|
| No. | Fukui-800-Ka-357 | | |
| Type | NISSAN P-CD45NC rev | | |
| Engine | PE6 | Registration | 1989 |
| Total weight | 19,870kg | | |

<injecting 0.99～1 volume % of eco-substance>
2009/4/13 ～

| | from | | Load (kg) | Dates | Running distance(km) | fuel consumption amounts (l) | fuel consumption (km/l) | Reduction rate from normal (%) | Notes | average of reduction rate from normal (%) |
|---|---|---|---|---|---|---|---|---|---|---|
| 8,700 | TOUSHIN | Nagano | 10,600 | 2009/ 9/29-10/1 | 1,220 | 338 | 3.61 | -17% | | -12% |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |

Figure 36
[Table 41]

destination data

| | | | |
|---|---|---|---|
| to | loading point : | Amagasaki-shi, Hyogo |
| | unloading point : | Kawaguchi-shi, Saitama |
| from | loading point : | Ueda-shi, Nagano |
| | unloading point : | Amagasaki-shi, Hyogo |

| <Normal> ~ 2009/4/13 | | | | | | | | | | | |
|---|---|---|---|---|---|---|---|---|---|---|---|
| to | | | from | | | Dates | Running distance(km) | fuel consumption amount(l) | fuel consumption (km/l) | to | |
| | | Load (kg) | | | Load (kg) | | | | | | |
| SK | Kawaguchi | 6,200 | TOUSHIN | Nagano | 11,000 | 2008/ 5/20-22 | 1,310 | 445 | 2.94 | SK | Kawaguchi |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |

conditions
- ·loadage : +−500kg
- ·Utilization of the highway : 5~10%
- ·Tank cleaning
- ·Driver
- ·using the power of loading and unloading
- ·direct delivery from fuelmakers

Figure 36 cont.
[Table 41 - continuation]

comparison in the fuel amounts & the fuel consumption

From 13 April to 31 October

| | | | |
|---|---|---|---|
| No. | Fukui-800-Ka-358 | | |
| Type | NISSAN P-CD45NC rev. | | |
| Engine | PE6 | Registration | 1989 |
| Total weight | 19,870kg | | |

<injecting 0.99~1 volume % of eco-substance)>
2009/4/13 ~

| | from | | Load (kg) | Dates | Running distance(km) | fuel consumption amounts(l) | fuel consumption (km/l) | Reduction rate from normal (%) | Notes | average of reduction rate from normal (%) |
|---|---|---|---|---|---|---|---|---|---|---|
| 9,200 | TOUSHIN | Nagano | 10,800 | 2009/ 5/18-20 | 1,270 | 370 | 3.43 | -14% | | -12% |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |

Figure 37
[Table 42]

| | | | |
|---|---|---|---|
| No | Kobe 88 Ku 4814 | | |
| Type | MITSUBISHI P-FU419N rev | | |
| Engine | 8DC9 | Registration | 1988 |
| Total weight | 20000kg | | |

destination data loading point : Wajima, Ishikawa
unloading point : Amagasaki-shi, Hyogo comparison in the fuel amounts & the fuel consumption
From 13 April to 31 October

| <Normal> ~ 2009/4/13 | | | | | | | | | |
|---|---|---|---|---|---|---|---|---|---|
| to | | | from | | | Dates | Running distance(km) | fuel consumption amounts(l) | fuel consumption (km/l) |
| | | Load (kg) | | | Load (kg) | | | | |
| YONESHO | Ishikawa | 10,400 | empty | -- | -- | 2009/ 2/4~5 | 670 | 230 | 2.91 |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |

conditions
・loadage : + ~500kg
・Utilization of the highway : 5~10%
・Tank cleaning ・Driver
・using the power of loading and unloading
・direct delivery from fuelmakers

Figure 37 cont.
[Table 42 - continuation]

| <injecting 0.99~1 volume % of eco-substance)> 2009/4/13 ~ | | | | | | | | | | | | |
|---|---|---|---|---|---|---|---|---|---|---|---|---|
| to | | | from | | Load (kg) | Dates | Running distance(km) | fuel consumption amount(l) | fuel consumption (km/l) | Reduction rate from normal (%) | Notes | average of reduction rate from normal (%) |
| YONESHO | Ishikawa | 10,600 | empty | – | – | 2009/5/14~15 | 675 | 205 | 3.29 | -12% | | -13% |
| YONESHO | Ishikawa | 10,700 | empty | – | – | 2009/5/28~29 | 667 | 205 | 3.25 | -10% | | |
| | | | | | | Ave | 671 | 205 | 3.27 | -11% | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |

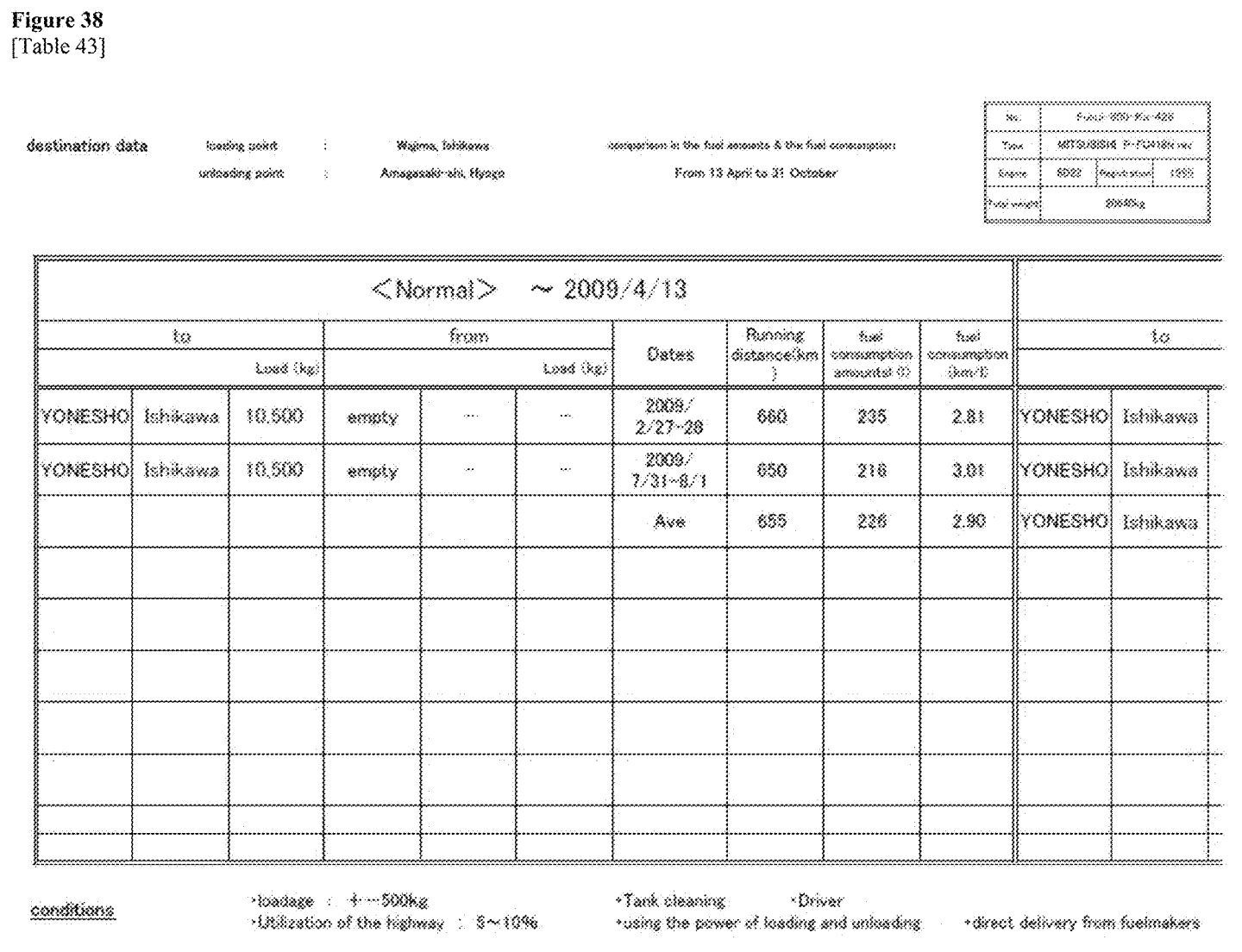

Figure 38
[Table 43]

destination data    loading point : Wajima, Ishikawa    comparison in the fuel amounts & the fuel consumption
unloading point : Amagasaki-shi, Hyogo    From 13 April to 31 October

| | | | |
|---|---|---|---|
| No. | [illegible] | | |
| Type | MITSUBISHI P-FU418K [illegible] | | |
| Engine | 6D22 | Registration | [illegible] |
| Fuel weight | [illegible] | | |

| <Normal> ~ 2009/4/13 | | | | | | | | | | | | |
|---|---|---|---|---|---|---|---|---|---|---|---|---|
| to | | | from | | | Dates | Running distance(km) | fuel consumption amounts(l) | fuel consumption (km/l) | to | |
| | | Load (kg) | | | Load (kg) | | | | | | |
| YONESHO | Ishikawa | 10,500 | empty | -- | -- | 2009/ 2/27~28 | 660 | 235 | 2.81 | YONESHO | Ishikawa |
| YONESHO | Ishikawa | 10,500 | empty | -- | -- | 2009/ 7/31~8/1 | 650 | 216 | 3.01 | YONESHO | Ishikawa |
| | | | | | | Ave | 655 | 226 | 2.90 | YONESHO | Ishikawa |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |

conditions
·loadage : +—500kg    ·Tank cleaning    ·Driver
·Utilization of the highway : 5~10%    ·using the power of loading and unloading    ·direct delivery from fuelmakers

Figure 38 cont.

[Table 43 - continuation]

<injecting 0.99~1 volume % of eco-substance)>
2009/4/13 ~

| | from | | Load (kg) | Dates | Running distance(km) | fuel consumption amount (l) | fuel consumption (km/l) | Reduction rate from normal (%) | Notes | average of reduction rate from normal (%) |
|---|---|---|---|---|---|---|---|---|---|---|
| 10,800 | empty | --- | --- | 2009/ 4/17~20 | 660 | 200 | 3.30 | −12% | | -13% |
| 10,600 | empty | --- | --- | 2009/ 6/4~5 | 650 | 181 | 3.59 | −19% | | |
| 10,500 | empty | --- | --- | 2009/ 9/11~12 | 661 | 200 | 3.31 | −12% | | |
| | | | | Ave | 657 | 194 | 3.39 | −14% | | |
| | | | | | | | | | | |
| | | | | | | | | | | |
| | | | | | | | | | | |
| | | | | | | | | | | |
| | | | | | | | | | | |
| | | | | | | | | | | |

Figure 39
[Table 44]

destination data loading point : Nakanikawa-gun, Toyama
unloading point : Takasago-shi, Hyogo comparison in the fuel amounts & the fuel consumption
From 13 April to 31 October

| | | | |
|---|---|---|---|
| No. | Kobe-88-Ka-4814 | | |
| Type | MITSUBISHI P-FU419N | | |
| Engine | 6DC9 | Registration | 1998 |
| Total weight | 20000kg | | |

| <Normal> ~ 2009/4/13 | | | | | | | | | | to | |
|---|---|---|---|---|---|---|---|---|---|---|---|
| to | | | from | | | Dates | Running distance(km) | fuel consumption amounts (l) | fuel consumption (km/l) | | |
| | | Load (kg) | | | Load (kg) | | | | | | |
| TATEYAMA ~KANEKA | Toyama | 10,200 | empty | -- | -- | 2009/ 2/26~27 | 898 | 267 | 3.36 | TATEYAMA ~KANEKA | Toyama |
| TATEYAMA ~KANEKA | Toyama | 10,400 | empty | -- | -- | 2009/ 12/11~12 | 898 | 308 | 2.92 | TATEYAMA ~KANEKA | Toyama |
| | | | | | | Ave | 898 | 288 | 3.12 | TATEYAMA ~KANEKA | Toyama |
| | | | | | | | | | | TATEYAMA ~KANEKA | Toyama |
| | | | | | | | | | | | |
| | | | | | | | | | | | |
| | | | | | | | | | | | |
| | | | | | | | | | | | |
| | | | | | | | | | | | |
| | | | | | | | | | | | |

<u>conditions</u>

- ·loadage : + ~ 500kg
- ·Utilization of the highway : 5~10%
- ·Tank cleaning
- ·Driver
- ·using the power of loading and unloading
- ·direct delivery from fuelmakers

Figure 39 cont.

[Table 44 - continuation]

| <injecting 0.99～1 volume % of eco-substance)> 2009/4/13 ～ | | | | | | | | | | |
|---|---|---|---|---|---|---|---|---|---|---|
| | from | | Load (kg) | Dates | Running distance(km) | fuel consumption amounts (l) | fuel consumption (km/l) | Reduction rate from normal (%) | Notes | average of reduction rate from normal (%) |
| 10,400 | empty | – | – | 2009/ 5/28–29 | 899 | 251 | 3.58 | -13% | | -12% |
| 10,400 | empty | – | – | 2009/ 6/1–2 | 890 | 270 | 3.30 | -5% | | |
| 10,500 | empty | – | – | 2009/ 6/3–4 | 901 | 260 | 3.47 | -10% | | |
| 10,400 | empty | – | – | 2009/ 7/1–2 | 895 | 272 | 3.29 | -5% | | |
| | | | | Ave | 896 | 263 | 3.40 | -8% | | |
| | | | | | | | | | | |
| | | | | | | | | | | |
| | | | | | | | | | | |
| | | | | | | | | | | |
| | | | | | | | | | | |

Figure 40
[Table 45]

| | |
|---|---|
| No. | [illegible] |
| Type | MITSUBISHI P-FU418N [illegible] |
| Engine | 6D22 / Registration 1995 |
| Total weight | [illegible] |

destination data loading point : Nakaniikawa-gun, Toyama
unloading point : Takasago-shi, Hyogo comparison in the fuel amounts & the fuel consumption
From 13 April to 31 October

| <Normal> ~ 2009/4/13 | | | | | | | | | | | | |
|---|---|---|---|---|---|---|---|---|---|---|---|---|
| to | | | from | | | Dates | Running distance(km) | fuel consumption amounts (l) | fuel consumption (km/l) | to | |
| | | Load (kg) | | | Load (kg) | | | | | | |
| TATEYAMA ~KANEKA | Toyama | 10,100 | empty | ... | ... | 2008/ 11/4~5 | 914 | 277 | 3.30 | TATEYAMA ~KANEKA | Toyama |
| TATEYAMA ~KANEKA | Toyama | 10,300 | empty | ... | ... | 2009/ 1/7~8 | 888 | 250 | 3.55 | TATEYAMA ~KANEKA | Toyama |
| | | | | | | Ave | 901 | 264 | 3.42 | TATEYAMA ~KANEKA | Toyama |
| | | | | | | | | | | TATEYAMA ~KANEKA | Toyama |
| | | | | | | | | | | | |
| | | | | | | | | | | | |
| | | | | | | | | | | | |
| | | | | | | | | | | | |
| | | | | | | | | | | | |
| | | | | | | | | | | | |

conditions
・loadage : + ~500kg
・Utilization of the highway : 5~10%
・Tank cleaning ・Driver
・using the power of loading and unloading
・direct delivery from fuelmakers

Figure 40 cont.
[Table 45 - continuation]

| <injecting 0.99~1 volume % of eco-substance)> 2009/4/13 ~ | from | | Load (kg) | Dates | Running distance(km) | fuel consumption amounts (l) | fuel consumption (km/l) | Reduction rate from normal (%) | Notes | average of reduction rate from normal (%) |
|---|---|---|---|---|---|---|---|---|---|---|
| 10,100 | empty | ~ | ~ | 2009/ 6/10~11 | 878 | 250 | 3.51 | ~3% | | |
| 10,200 | empty | (including Operation to Tatsumi) | | 2009/ 6/17~18 | 939 | 230 | 4.08 | ~16% | | |
| 10,300 | empty | ~ | ~ | 2009/ 7/13~14 | 910 | 258 | 3.53 | ~3% | | |
| 10,250 | empty | ~ | ~ | 2009/ 8/27~28 | 880 | 240 | 3.67 | ~7% | | |
| | | | | Ave | 902 | 245 | 3.69 | ~7% | | -12% |
| | | | | | | | | | | |
| | | | | | | | | | | |
| | | | | | | | | | | |
| | | | | | | | | | | |
| | | | | | | | | | | |

Figure 41
[Table 46]

| | | | |
|---|---|---|---|
| No. | [illegible] | | |
| Type | NISSAN U-CD4[illegible] | | |
| Engine | PE6 | Registration | [illegible] |
| Total weight | [illegible]kg | | |

destination data    loading point : Nakaniikawa-gun, Toyama    comparison in the fuel amounts & the fuel consumption
unloading point : Takasago-shi, Hyogo    From 13 April to 31 October

| <Normal> ~ 2009/4/13 | | | | | | | | | | |
|---|---|---|---|---|---|---|---|---|---|---|
| to | | | from | | | Dates | Running distance(km) | fuel consumption amounts (l) | fuel consumption (km/l) | |
| | | Load (kg) | | | Load (kg) | | | | | |
| TATEYAMA ~KANEKA | Toyama | 10,110 | empty | – | – | 2009/ 2/11-12 | 1,016 | 318 | 3.19 | TATEYAMA ~KANEKA |
| TATEYAMA ~KANEKA | Toyama | 10,390 | empty | – | – | 2009/ 3/12-13 | 990 | 383 | 2.58 | |
| | | | | | | Ave | 1,003 | 351 | 2.86 | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |

conditions    ·loadage : 4~800kg    ·Tank cleaning    ·Driver
·Utilization of the highway : 5~10%    ·using the power of loading and unloading    ·direct delivery from fuelmakers

Figure 41 cont.
[Table 46 - continuation]

| <injecting 0.99~1 volume % of eco-substance)> 2009/4/13 ~ | | | | | | | | | Reduction rate from normal (%) | Notes | average of reduction rate from normal (%) |
|---|---|---|---|---|---|---|---|---|---|---|---|
| to | | from | | | Dates | Running distance(km) | fuel consumption amount (l) | fuel consumption (km/l) | | | |
| | | | | Load (kg) | | | | | | | |
| Toyama | 10,110 | empty | ~ | ~ | 2009/ 10/14~15 | 990 | 274 | 3.61 | -20% | | -12% |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |

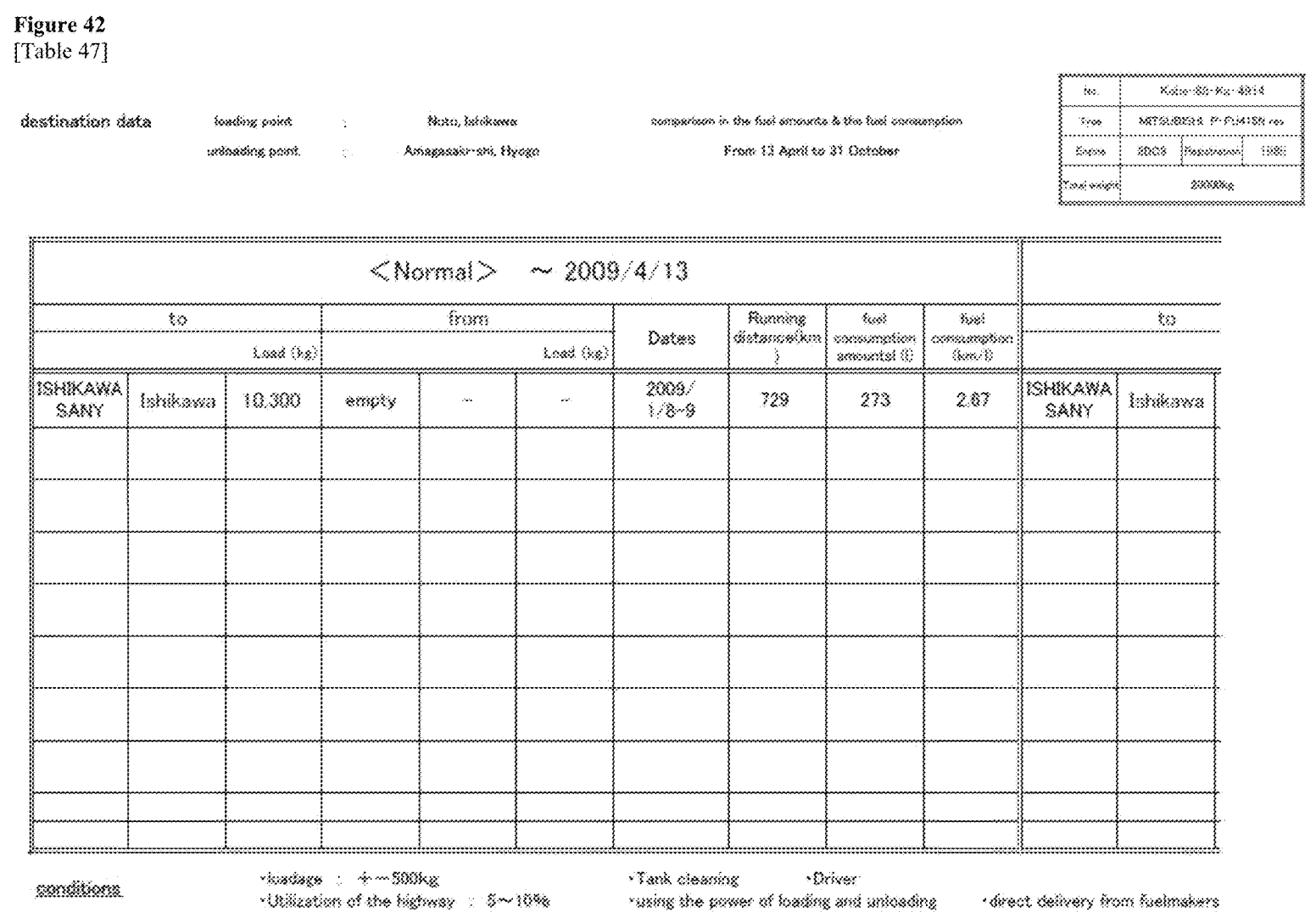

Figure 42
[Table 47]

| | | | |
|---|---|---|---|
| No. | Kobe-88-Ka-4914 | | |
| Type | MITSUBISHI P-FU415N [illegible] | | |
| Engine | [illegible] | Registered | [illegible] |
| Total weight | [illegible]kg | | |

destination data loading point : Noto, Ishikawa — comparison in the fuel amounts & the fuel consumption
unloading point : Amagasaki-shi, Hyogo — From 13 April to 31 October

| <Normal> ~ 2009/4/13 | | | | | | | | | | to | |
|---|---|---|---|---|---|---|---|---|---|---|---|
| to | | | from | | | Dates | Running distance(km) | fuel consumption amounts(l) | fuel consumption (km/l) | | |
| | | Load (kg) | | | Load (kg) | | | | | | |
| ISHIKAWA SANY | Ishikawa | 10,300 | empty | - | - | 2009/ 1/8~9 | 729 | 273 | 2.67 | ISHIKAWA SANY | Ishikawa |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |

conditions
- loadage : ± ~500kg
- Utilization of the highway : 5~10%
- Tank cleaning
- Driver
- using the power of loading and unloading
- direct delivery from fuelmakers

Figure 42 cont.
[Table 47 - continuation]

| <injecting 0.99~1 volume % of eco-substance)> 2009/4/13 ~ | | | | | | | | | | |
|---|---|---|---|---|---|---|---|---|---|---|
| | from | | | Dates | Running distance(km) | fuel consumption amounts(l) | fuel consumption (km/l) | Reduction rate from normal (%) | Notes | average of reduction rate from normal (%) |
| | | | Load (kg) | | | | | | | |
| | empty | ... | ... | 2009/ 6/19~22 | 730 | 216 | 3.38 | -20% | | -14% |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |

Figure 43
[Table 48]

| | | | |
|---|---|---|---|
| No. | Fukui-800-Ha-428 | | |
| Type | MITSUBISHI P-FU419N rev | | |
| Engine | 6D22 | Registration | [illegible] |
| Total weight | [illegible] | | |

destination data loading point : Noto, Ishikawa unloading point : Amagasaki-shi, Hyogo comparison in the fuel amounts & the fuel consumption From 13 April to 31 October

| <Normal> ~ 2009/4/13 | | | | | | | | | | | | |
|---|---|---|---|---|---|---|---|---|---|---|---|---|
| to | | | from | | | Dates | Running distance(km) | fuel consumption amounts (l) | fuel consumption (km/l) | to | |
| | | Load (kg) | | | Load (kg) | | | | | | |
| ISHIKAWA SANY | Ishikawa | 10,000 | empty | - | - | 2008/ 8/12-13 | 720 | 215 | 3.35 | ISHIKAWA SANY | Ishikawa |
| ISHIKAWA SANY | Ishikawa | 7,800 | empty | - | - | 2009/ 3/16-17 | 688 | 200 | 3.44 | ISHIKAWA SANY | Ishikawa |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |

conditions

・loadage : + ~ 500kg
・Utilization of the highway : 5~10%
・Tank cleaning ・Driver
・using the power of loading and unloading
・direct delivery from fuelmakers

Figure 43 cont.
[Table 48 - continuation]

| <injecting 0.99~1 volume % of eco-substance)> 2009/4/13 ~ | | | | | | | | | Reduction rate from normal (%) | Notes | average of reduction rate from normal (%) |
|---|---|---|---|---|---|---|---|---|---|---|---|
| | from | | | Load (kg) | Dates | Running distance(km) | fuel consumption amount(l) | fuel consumption (km/l) | | | |
| 10,000 | empty | ~ | ~ | | 2009/ 4/22~23 | 720 | 190 | 3.79 | ~12% | | -14% |
| 8,000 | empty | ~ | ~ | | 2009/ 5/26~27 | 689 | 182 | 3.79 | ~9% | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |

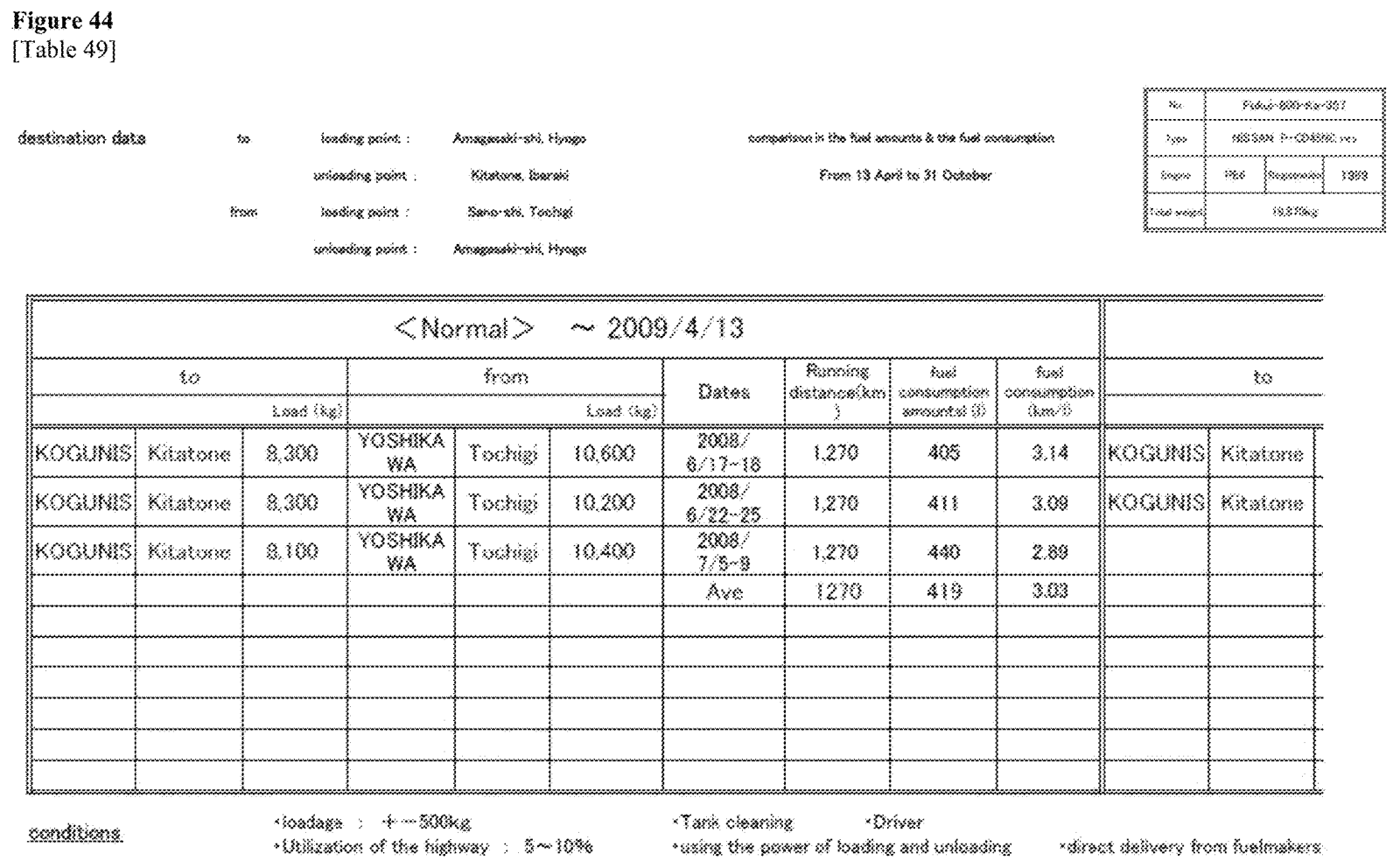

Figure 44
[Table 49]

| | |
|---|---|
| No. | Fukui-800-Ka-[illegible] |
| Type | NISSAN P-[illegible] |
| Engine | PE6 / [illegible] / 1993 |
| Total weight | [illegible]kg |

destination data to — loading point : Amagasaki-shi, Hyogo
unloading point : Kitatone, Ibaraki
from — loading point : Sano-shi, Tochigi
unloading point : Amagasaki-shi, Hyogo comparison in the fuel amounts & the fuel consumption From 13 April to 31 October

| <Normal> ~ 2009/4/13 | | | | | | | | | | | |
|---|---|---|---|---|---|---|---|---|---|---|---|
| to | | | from | | | Dates | Running distance(km) | fuel consumption amount(l) | fuel consumption (km/l) | to | |
| | | Load (kg) | | | Load (kg) | | | | | | |
| KOGUNIS | Kitatone | 8,300 | YOSHIKAWA | Tochigi | 10,600 | 2008/6/17~18 | 1,270 | 405 | 3.14 | KOGUNIS | Kitatone |
| KOGUNIS | Kitatone | 8,300 | YOSHIKAWA | Tochigi | 10,200 | 2008/6/22~25 | 1,270 | 411 | 3.09 | KOGUNIS | Kitatone |
| KOGUNIS | Kitatone | 8,100 | YOSHIKAWA | Tochigi | 10,400 | 2008/7/5~9 | 1,270 | 440 | 2.89 | | |
| | | | | | | Ave | 1270 | 419 | 3.03 | | |
| | | | | | | | | | | | |
| | | | | | | | | | | | |
| | | | | | | | | | | | |
| | | | | | | | | | | | |
| | | | | | | | | | | | |
| | | | | | | | | | | | |

conditions

- loadage : + − 500kg
- Utilization of the highway : 5~10%
- Tank cleaning
- Driver
- using the power of loading and unloading
- direct delivery from fuelmakers

Figure 44 cont.
[Table 49 - continuation]

| <injecting 0.99～1 volume % of eco-substance)> 2009/4/13 ～ | | | | | | | | Reduction rate from normal (%) | Notes | average of reduction rate from normal (%) |
|---|---|---|---|---|---|---|---|---|---|---|
| | from | | | Dates | Running distance(km) | fuel consumption amounts (l) | fuel consumption (km/l) | | | |
| | | | Load (kg) | | | | | | | |
| 8,300 | YOSHIKAWA | Tochigi | 10,600 | 2009/ 8/12~17 | 1,270 | 400 | 3.18 | −5% | | -9% |
| 8,300 | YOSHIKAWA | Tochigi | 10,400 | 2009/ 9/22~24 | 1,270 | 404 | 3.14 | −4% | | |
| | | | | Ave | 1,270 | 402 | 3.16 | −4% | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |

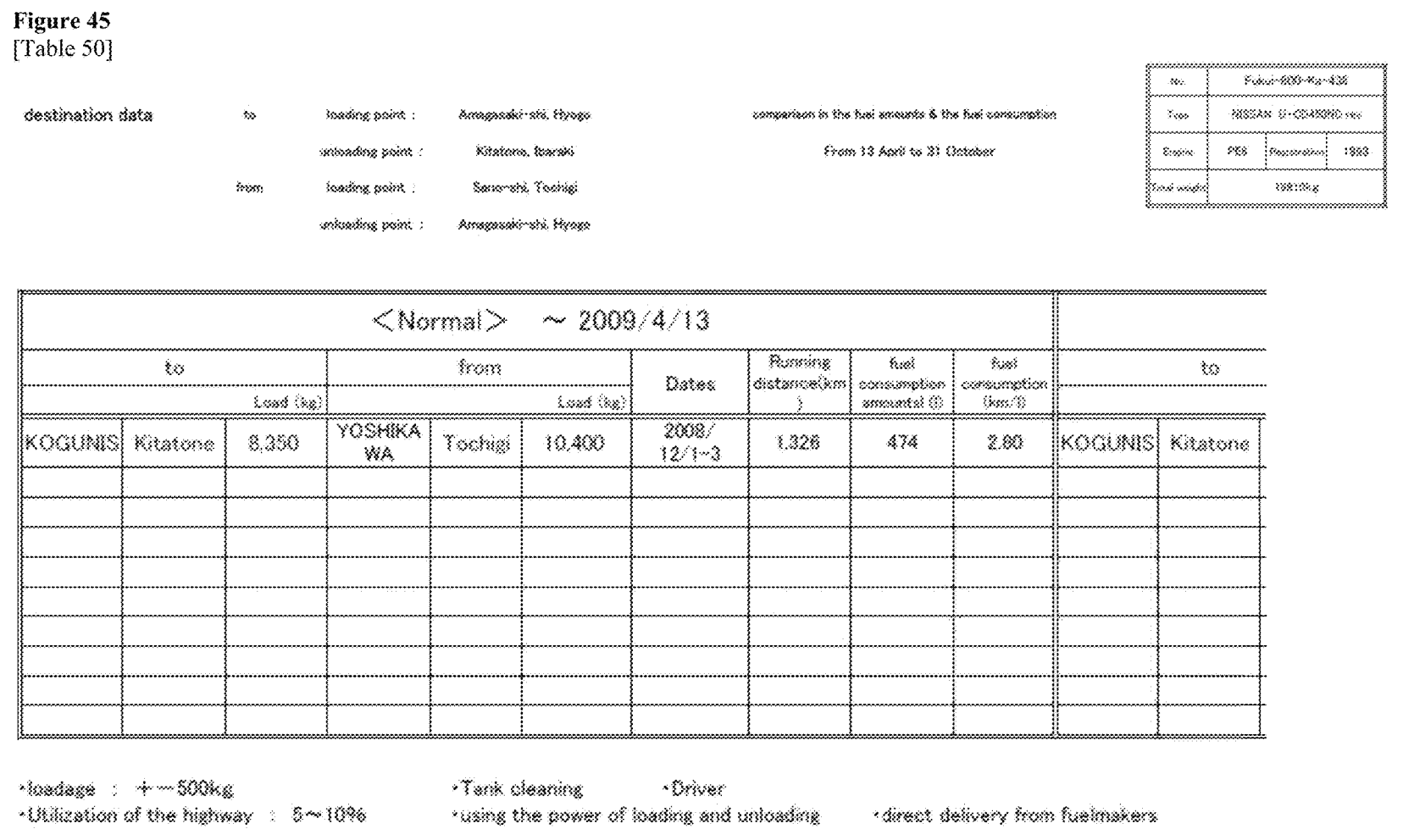

Figure 45
[Table 50]

| | | | |
|---|---|---|---|
| No. | Fukui-800-Ka-438 | | |
| Type | NISSAN U-CD450RD [illegible] | | |
| Engine | PE6 | Registration | 1993 |
| Total weight | 19815kg | | |

destination data to loading point : Amagasaki-shi, Hyogo unloading point : Kitatone, Ibaraki from loading point : Sano-shi, Tochigi unloading point : Amagasaki-shi, Hyogo comparison in the fuel amounts & the fuel consumption From 13 April to 31 October

| <Normal> ~ 2009/4/13 | | | | | | | | | | | | | |
|---|---|---|---|---|---|---|---|---|---|---|---|---|---|
| to | | | from | | | Dates | Running distance(km) | fuel consumption amount(l) | fuel consumption (km/l) | | to | | |
| | | Load (kg) | | | Load (kg) | | | | | | | |
| KOGUNIS | Kitatone | 8,350 | YOSHIKAWA | Tochigi | 10,400 | 2008/ 12/1~3 | 1,326 | 474 | 2.80 | KOGUNIS | Kitatone |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |

・loadage : +-500kg ・Tank cleaning ・Driver
・Utilization of the highway : 5~10% ・using the power of loading and unloading ・direct delivery from fuelmakers

Figure 45 cont.
[Table 50 - continuation]

| <injecting 0.99～1 volume % of eco-substance)> 2009/4/13 ～ | | | | | | | | | | |
|---|---|---|---|---|---|---|---|---|---|---|
| | from | | | Dates | Running distance(km) | fuel consumption amounts (l) | fuel consumption (km/l) | Reduction rate from normal (%) | Notes | average of reduction rate from normal (%) |
| | | | Load (kg) | | | | | | | |
| ★7500 | YOSHIKAWA | Tochigi | 10,800 | 2009/ 8/4~8 | 1,326 | 407 | 3.26 | -14% | | -9% |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |

Figure 46
[Table 51]

| | |
|---|---|
| No. | Fukui 800 Ka 351 |
| Type | ISUZU P-CXZ23M [illegible] |
| Engine | 6SD1 |
| Registration | 1990 |
| Total weight | [illegible]kg |

destination data

| | | | |
|---|---|---|---|
| to | loading point : | Izumisano-shi, Osaka | comparison in the fuel amounts & the fuel consumption |
| | unloading point : | Echizen-shi, Fukui | From 13 April to 31 October |
| from | loading point : | Nakaniikawa-gun, Toyama | |
| | unloading point : | Takasago-shi, Hyogo | |

<Normal> ~ 2009/4/13

| to | | | from | | | Dates | Running distance(km) | fuel consumption amounts(ℓ) | fuel consumption (km/ℓ) |
|---|---|---|---|---|---|---|---|---|---|
| | | Load (kg) | | | Load (kg) | | | | |
| FUJI~KAWAKEN | Fukui | 10,000 | TATEYAMA~KANEKA | Toyama | 10,300 | 2009/1/27~29 | 1,003 | 275 | 3.65 |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |

conditions

- loadage : ＋~500kg
- Utilization of the highway : 5~10%
- Tank cleaning
- Driver
- using the power of loading and unloading
- direct delivery from fuelmakers

Figure 46 cont.
[Table 51 - continuation]

| <injecting 0.99~1 volume % of eco-substance)> 2009/4/13 ~ | | | | | | | | | | | | |
|---|---|---|---|---|---|---|---|---|---|---|---|---|
| to | | | from | | | Dates | Running distance(km) | fuel consumption amount(l) | fuel consumption (km/l) | Reduction rate from normal (%) | Notes | average of reduction rate from normal (%) |
| | | | | | Load (kg) | | | | | | | |
| FUJI~KAWAKEN | Fukui | 10,300 | TATEYAMA~KANEKA | Toyama | 10,000 | 2009/5/27~29 | 1,064 | 282 | 3.77 | -3% | | -8% |

Figure 47
[Table 52]

| | |
|---|---|
| No. | Fukui-800-Ka-428 |
| Type | MITSUBISHI P-FU419N [illegible] |
| Engine | 8DC[illegible] / Registration 1985 |
| Total weight | 20480kg |

destination data to — loading point : Izumisano-shi, Osaka
unloading point : Echizen-shi, Fukui from — loading point : Nakaniikawa-gun, Toyama
unloading point : Takasago-shi, Hyogo comparison in the fuel amounts & the fuel consumption
From 13 April to 31 October

| <Normal> ~ 2009/4/13 | | | | | | | | | | | |
|---|---|---|---|---|---|---|---|---|---|---|---|
| to | | | from | | | Dates | Running distance(km) | fuel consumption amounts (l) | fuel consumption (km/l) | to | |
| | | Load (kg) | | | Load (kg) | | | | | | |
| FUJI~KAWAKEN | Fukui | 10,000 | TATEYAMA ~KANEKA | Toyama | 10,100 | 2009/ 1/26-28 | 973 | 314 | 3.10 | FUJI~KAWAKEN | Fukui |
| | | | | | | | | | | FUJI~KAWAKEN | Fukui |
| | | | | | | | | | | FUJI~KAWAKEN | Fukui |
| | | | | | | | | | | FUJI~KAWAKEN | Fukui |
| | | | | | | | | | | | |
| | | | | | | | | | | | |
| | | | | | | | | | | | |
| | | | | | | | | | | | |
| | | | | | | | | | | | |
| | | | | | | | | | | | |

・loadage : +~500kg
・Utilization of the highway : 5~10%
・Tank cleaning
・using the power of loading and unloading
・Driver
・direct delivery from fuelmakers

Figure 47 cont.

[Table 52 - continuation]

<injecting 0.99～1 volume % of eco-substance)>
2009/4/13 ～

| | from | | Load (kg) | Dates | Running distance(km) | fuel consumption amounts(l) | fuel consumption (km/l) | Reduction rate from normal (%) | Notes | average of reduction rate from normal (%) |
|---|---|---|---|---|---|---|---|---|---|---|
| 10,000 | TATEYAMA ～KANEKA | Toyama | 10,200 | 2009/ 5/11~13 | 979 | 292 | 3.35 | -8% | | -8% |
| 10,000 | TATEYAMA ～KANEKA | Toyama | 10,100 | 2009/ 6/1~3 | 975 | 280 | 3.48 | -11% | | |
| 10,000 | TATEYAMA ～KANEKA | Toyama | 10,200 | 2009/ 8/18~20 | 977 | 250 | 3.91 | -20% | | |
| 10,000 | TATEYAMA ～KANEKA | Toyama | 10,200 | 2009/ 9/15~16 | 1,024 | 300 | 3.41 | -10% | | |
| | | | | Ave | 989 | 281 | 3.52 | -12% | | |
| | | | | | | | | | | |
| | | | | | | | | | | |
| | | | | | | | | | | |
| | | | | | | | | | | |
| | | | | | | | | | | |

Figure 48
[Table 53]

<Trailer>

| | | | |
|---|---|---|---|
| No. | Kobe-130-A-8082 | | |
| Type | VOLVO Tractor | | |
| Engine | D12 | Registration | 2002 |
| Total weight | [illegible] | | |

destination data — loading point : Amagasaki-shi, Hyogo — unloading point : Yokkaichi-shi, Aichi comparison in the fuel amounts & the fuel consumption
From 13 April to 31 October

| <Normal> ~ 2009/4/13 | | | | | | | | | | | |
|---|---|---|---|---|---|---|---|---|---|---|---|
| to | | | from | | | Dates | Running distance(km) | fuel consumption amounts (l) | fuel consumption (km/l) | to | |
| | | Load (kg) | | | Load (kg) | | | | | | |
| JSR | Yokkaichi | 15,100 | empty | -- | -- | 2009/ 1/6~7 | 307 | 150 | 2.05 | JSR | Yokkaichi |
| JSR | Yokkaichi | 15,100 | empty | -- | -- | 2009/ 1/8~12 | 310 | 157 | 1.97 | JSR | Yokkaichi |
| JSR | Yokkaichi | 15,100 | empty | -- | -- | 2009/ 2/27~3/2 | 294 | 155 | 1.90 | JSR | Yokkaichi |
| | | | | | | Ave | 304 | 154 | 1.97 | | |
| | | | | | | | | | | | |
| | | | | | | | | | | | |
| | | | | | | | | | | | |
| | | | | | | | | | | | |
| | | | | | | | | | | | |
| | | | | | | | | | | | |

<u>conditions</u>

·loadage : + ~ 500kg
·Utilization of the highway : 5~10%
·Tank cleaning ·Driver
·using the power of loading and unloading
·direct delivery from fuelmakers

Figure 48 cont.
[Table 53 - continuation]

<injecting 0.99~1 volume % of eco-substance)>
2009/4/13 ~

| | from | | Load (kg) | Dates | Running distance(km) | fuel consumption amounts(l) | fuel consumption (km/l) | Reduction rate from normal (%) | Notes | average of reduction rate from normal (%) |
|---|---|---|---|---|---|---|---|---|---|---|
| 15,100 | empty | ~ | ~ | 2009/ 4/17~20 | 310 | 144 | 2.15 | -5% | Fri.~Mon. Delivery | -6% |
| 15,100 | empty | ~ | ~ | 2009/ 5/26~27 | 308 | 142 | 2.17 | -10% | Tomorrow Delivery | |
| 15,100 | empty | ~ | ~ | 2009/ 6/26~29 | 310 | 152 | 2.04 | -3% | Fri.~Mon. Delivery | |
| | | | | Ave | 309 | 146 | 2.12 | -7% | | |
| | | | | | | | | | | |
| | | | | | | | | | | |
| | | | | | | | | | | |
| | | | | | | | | | | |
| | | | | | | | | | | |
| | | | | | | | | | | |

Figure 49
[Table 54]

<Trailer>

| | | | |
|---|---|---|---|
| No. | Kobe-130-A-8000 | | |
| Type | VOLVO Tractor | | |
| Engine | D13C | Registration | 2008 |
| Total weight | 38820kg | | |

destination data loading point : Amagasaki-shi, Hyogo
unloading point : Yokkaichi-shi, Aichi comparison in the fuel amounts & the fuel consumption
From 13 April to 31 October

| <Normal> ~ 2009/4/13 | | | | | | | | | | | |
|---|---|---|---|---|---|---|---|---|---|---|---|
| to | | | from | | | Dates | Running distance(km) | fuel consumption amounts (l) | fuel consumption (km/l) | to | |
| | | Load (kg) | | | Load (kg) | | | | | | |
| JSR | Yokkaichi | 15,000 | empty | - | - | 2009/ 4/16~17 | 310 | 160 | 1.94 | JSR | Yokkaichi |
| | | | | | | | | | | JSR | Yokkaichi |
| | | | | | | | | | | JSR | Yokkaichi |
| | | | | | | | | | | JSR | Yokkaichi |
| | | | | | | | | | | JSR | Yokkaichi |
| | | | | | | | | | | JSR | Yokkaichi |
| | | | | | | | | | | JSR | Yokkaichi |
| | | | | | | | | | | JSR | Yokkaichi |
| | | | | | | | | | | | |
| | | | | | | | | | | | |

conditions
・loadage : 4~500kg
・Utilization of the highway : 5~10%
・Tank cleaning ・Driver
・using the power of loading and unloading
・direct delivery from fuelmakers

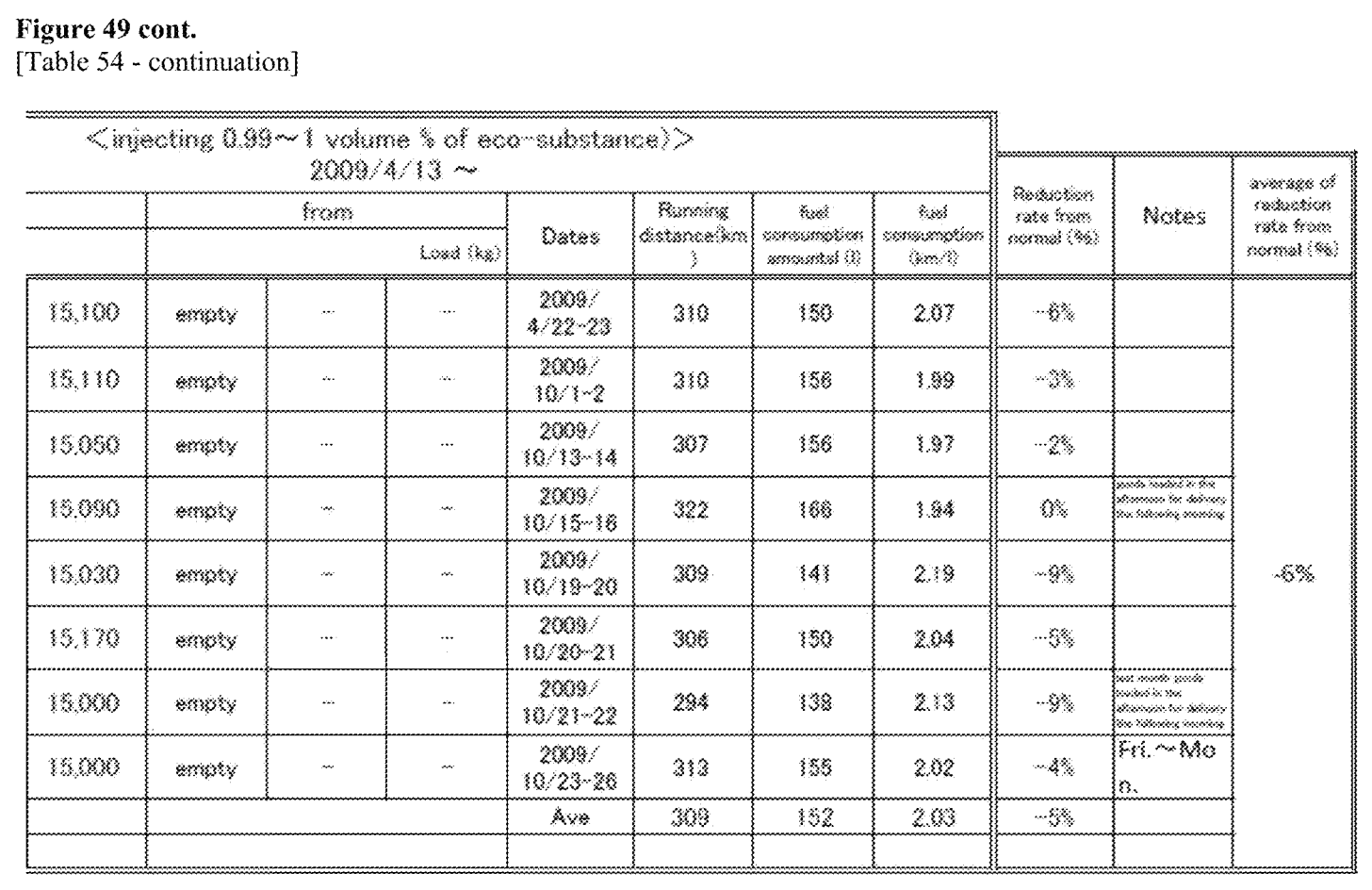

Figure 49 cont.
[Table 54 - continuation]

<injecting 0.99~1 volume % of eco-substance)>
2009/4/13 ~

| | from | | Load (kg) | Dates | Running distance(km) | fuel consumption amount(l) | fuel consumption (km/l) | Reduction rate from normal (%) | Notes | average of reduction rate from normal (%) |
|---|---|---|---|---|---|---|---|---|---|---|
| 15,100 | empty | ... | ... | 2009/ 4/22~23 | 310 | 150 | 2.07 | −6% | | -6% |
| 15,110 | empty | ... | ... | 2009/ 10/1~2 | 310 | 156 | 1.99 | −3% | | |
| 15,050 | empty | ... | ... | 2009/ 10/13~14 | 307 | 156 | 1.97 | −2% | | |
| 15,090 | empty | ... | ... | 2009/ 10/15~16 | 322 | 166 | 1.94 | 0% | [illegible] | |
| 15,030 | empty | ... | ... | 2009/ 10/19~20 | 309 | 141 | 2.19 | −9% | | |
| 15,170 | empty | ... | ... | 2009/ 10/20~21 | 306 | 150 | 2.04 | −5% | | |
| 15,000 | empty | ... | ... | 2009/ 10/21~22 | 294 | 138 | 2.13 | −9% | [illegible] | |
| 15,000 | empty | ... | ... | 2009/ 10/23~26 | 313 | 155 | 2.02 | −4% | Fri.~Mon. | |
| | | | | Ave | 309 | 152 | 2.03 | −5% | | |
| | | | | | | | | | | |

Figure 50
[Table 55]

| | |
|---|---|
| No. | Kobe-88-Ka-3714 |
| Type | ISUZU P-CXM19P rev. |
| Engine | 10PC1 / Registration 1984 |
| Total weight | 19990kg |

destination data — loading point : Yokkaichi-shi, Aichi — unloading point : Amagasaki-shi, Hyogo comparison in the fuel amounts & the fuel consumption
From 13 April to 31 October

| <Normal> ~ 2009/4/13 | | | | | | | | | | | |
|---|---|---|---|---|---|---|---|---|---|---|---|
| to | | | from | | | Dates | Running distance(km) | fuel consumption amounts(l) | fuel consumption (km/l) | to | |
| | | Load (kg) | | | Load (kg) | | | | | | |
| LION YOKKAICHI | Yokkaichi | 8,100 | empty | - | - | 4/3/2009 | 340 | 115 | 2.96 | LION YOKKAICHI | Yokkaichi |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |

conditions
・loadage : 4~500kg ・Tank cleaning ・Driver
・Utilization of the highway : 5~10% ・using the power of loading and unloading ・direct delivery from fuelmakers

Figure 50 cont.
[Table 55 - continuation]

<injecting 0.99~1 volume % of eco-substance)>
2009/4/13 ~

| | from | | Load (kg) | Dates | Running distance(km) | fuel consumption amount(l) | fuel consumption (km/l) | Reduction rate from normal (%) | Notes | average of reduction rate from normal (%) |
|---|---|---|---|---|---|---|---|---|---|---|
| 9,040 | empty | ~ | ~ | 4/12/2009 | 340 | 100 | 3.40 | −13% | | -17% |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |

Figure 51
[Table 56]

| | |
|---|---|
| No. | Kobe-88-Ka-3800 |
| Type | ISUZU P-CXM19P rev. |
| Engine | 10PC1 / Registration 1994 |
| Total weight | [illegible]kg |

destination data
loading point : Yokkaichi-shi, Aichi
unloading point : Amagasaki-shi, Hyogo comparison in the fuel amounts & the fuel consumption
From 13 April to 31 October

| <Normal> ~ 2009/4/13 | | | | | | | | | | | |
|---|---|---|---|---|---|---|---|---|---|---|---|
| to | | | from | | | Dates | Running distance(km) | fuel consumption amounts(l) | fuel consumption (km/l) | to | |
| | | Load (kg) | | | Load (kg) | | | | | | |
| LION YOKKAICHI | Yokkaichi | 8,000 | empty | ~ | ~ | 10/20/2008 | 342 | 112 | 3.05 | LION YOKKAICHI | Yokkaichi |
| | | | | | | | | | | LION YOKKAICHI | Yokkaichi |
| | | | | | | | | | | LION YOKKAICHI | Yokkaichi |
| | | | | | | | | | | LION YOKKAICHI | Yokkaichi |
| | | | | | | | | | | | |
| | | | | | | | | | | | |
| | | | | | | | | | | | |
| | | | | | | | | | | | |
| | | | | | | | | | | | |
| | | | | | | | | | | | |

conditions
·loadage : + ~ 500kg
·Utilization of the highway : 5~10%
·Tank cleaning ·Driver
·using the power of loading and unloading
·direct delivery from fuelmakers

Figure 51 cont.
[Table 56 - continuation]

<injecting 0.99 ~ 1 volume % of eco-substance)>
2009/4/13 ~

| | from | | | Dates | Running distance(km) | fuel consumption amounts(l) | fuel consumption (km/l) | Reduction rate from normal (%) | Notes | average of reduction rate from normal (%) |
|---|---|---|---|---|---|---|---|---|---|---|
| | | | Load (kg) | | | | | | | |
| 8,100 | empty | – | – | 4/15/2009 | 362 | | | | for two days in a row | -17% |
| 8,000 | empty | – | – | 4/16/2009 | 363 | 207 | 3.50 | −13% | | |
| 8,000 | empty | – | – | 5/26/2009 | 362 | 100 | 3.62 | −16% | | |
| 8,100 | empty | – | – | 8/27/2009 | 362 | 106 | 3.42 | −11% | | |
| | | | | Ave | 362 | 103 | 3.51 | −15% | | |
| | | | | | | | | | | |
| | | | | | | | | | | |
| | | | | | | | | | | |
| | | | | | | | | | | |
| | | | | | | | | | | |

Figure 52
[Table 57]

| | |
|---|---|
| No. | Kobe-88-Ko-4112 |
| Type | ISUZU P-CXM19P ver. |
| [illegible] | MPC1 | Registration | 1998 |
| Total weight | 19880kg |

destination data — loading point : Yokkaichi-shi, Aichi; unloading point : Amagasaki-shi, Hyogo comparison in the fuel amounts & the fuel consumption
From 13 April to 31 October <Normal> ~ 2009/4/13

| to | | | from | | | Dates | Running distance(km) | fuel consumption amount(l) | fuel consumption (km/l) | to | |
|---|---|---|---|---|---|---|---|---|---|---|---|
| | | Load (kg) | | | Load (kg) | | | | | | |
| LION YOKKAICHI | Yokkaichi | 8,000 | empty | — | — | 12/3/2008 | | | | LION YOKKAICHI | Yokkaichi |
| LION YOKKAICHI | Yokkaichi | 8,000 | empty | ~ | ~ | 12/4/2008 | 671 | 272 | 2.47 | LION YOKKAICHI | Yokkaichi |
| | | | | | | Ave | 336 | 136 | 2.47 | LION YOKKAICHI | Yokkaichi |
| | | | | | | | | | | LION YOKKAICHI | Yokkaichi |
| | | | | | | | | | | | |
| | | | | | | | | | | | |
| | | | | | | | | | | | |
| | | | | | | | | | | | |
| | | | | | | | | | | | |
| | | | | | | | | | | | |

conditions

- loadage : 4~500kg
- Utilization of the highway : 5~10%
- Tank clearing
- Driver
- using the power of loading and unloading
- direct delivery from fuelmakers

Figure 52 cont.
[Table 57 - continuation]

| <injecting 0.99~1 volume % of eco-substance)> 2009/4/13 ~ | | | | | | | | | | | |
|---|---|---|---|---|---|---|---|---|---|---|---|
| | from | | | Dates | Running distance(km) | fuel consumption amount (l) | fuel consumption (km/l) | Reduction rate from normal (%) | Notes | average of reduction rate from normal (%) |
| | Load (kg) | | | | | | | | | |
| 8,100 | empty | ~ | ~ | 5/11/2009 | 337 | | | | for two days in a row | -17% |
| 8,000 | empty | ~ | ~ | 5/13/2009 | 346 | 235 | 2.90 | -15% | | |
| 8,000 | empty | ~ | ~ | 5/19/2009 | | | | | for two days in a row | |
| 8,100 | empty | ~ | ~ | 5/20/2009 | 685 | 216 | 3.17 | -22% | | |
| | | | | Ave | 342 | 113 | 3.03 | -18% | | |
| | | | | | | | | | | |
| | | | | | | | | | | |
| | | | | | | | | | | |
| | | | | | | | | | | |
| | | | | | | | | | | |

Figure 53
[Table 58]

comparison in the fuel consumption <new eco-friendly lubrication oil (including 0.3 volume % of eco-substance)>

September

| September | | <Normal> ~ 2009/4/13 | | | | | | | | | |
|---|---|---|---|---|---|---|---|---|---|---|---|
| The vehicle information | | to | | Load (kg) | from | | Load (kg) | Dates | Running distance(km) | fuel consumption amounts(l) | fuel consumption (km/l) |
| No | Kobe-130-A-8003 | Lion | Yokkaichi | 15,140 | empty | ~ | ~ | 1/25/2008 | 316 | 154 | 2.05 |
| Type | VOLVO Tractor | Lion | Yokkaichi | 17,110 | empty | ~ | ~ | 4/9/2008 | | 150 | 0.00 |
| Engine | D12C Registration 2003 | Lion | Yokkaichi | 12,990 | empty | ~ | ~ | 5/15/2008 | 320 | 141 | 2.27 |
| Total weight | 39920kg | Lion | Yokkaichi | 15,000 | empty | ~ | ~ | 5/26/2008 | 327 | 143 | 2.29 |
| | | | Ave | 15,060 | | | | Ave | 321 | 147 | 2.18 |
| | | | | | | | | | | | |

<u>conditions</u>

- ·loadage : +−500kg
- ·Tank cleaning
- ·Driver
- ·Utilization of the highway : 5~10%
- ·using the power of loading and unloading
- ·direct delivery from fuelmakers

Figure 53 cont.
[Table 58 - continuation]

| <New eco-friendly lubrication oil (including 1.0 volume % of eco-substance)> 2009/4/13 ~ 2010/3/30 | | | | | | | |
|---|---|---|---|---|---|---|---|
| to | | from | | Dates | Running distance(km) | fuel consumption amount(l) | fuel consumption (km/l) |
| | | | Load (kg) | | | | |
| Lion | 15,000 | empty | ~ | 10/5/2009 | 319 | 142 | 2.25 |
| Lion | 15,000 | empty | ~ | 10/6/2009 | 320 | 145 | 2.21 |
| | | | | Ave | 320 | 144 | 2.23 |
| | | | | | | | |
| | | | | | | | |
| | | | | | | | |

Figure 53 cont.
[Table 58 - continuation]

| <[eco-fuel (including 0.5 volume % of eco-substance)] + [New eco-friendly lubrication oil (including 0.3 volume % of eco-substance)]> 2010/4/1 ~ | | | | | | | | | |
|---|---|---|---|---|---|---|---|---|---|
| to | | from | | Dates | Running distance(km) | fuel consumption amounts(l) | fuel consumption (km/l) | Reduction rate from normal (%) | Reduction rate from only eco fuel (%) |
| | | | Load (kg) | | | | | | |
| Lion | 16,770 | empty | ~ | 9/6/2010 | 318 | 140 | 2.27 | ~4% | ~2% |
| Lion | 11,330 | empty | ~ | 9/9/2010 | 320 | 138 | 2.32 | ~6% | ~4% |
| | | | | Ave | 319 | 139 | 2.29 | ~5% | ~3% |
| | | | | | | | | | |
| | | | | | | | | | |
| | | | | | | | | ~5% | ~3% |
| | | | | 10t car ; average of Reduction rate | | | | - | ~7% |
| | | | | trailer ; average of Reduction rate | | | | ~5% | ~5% |
| | | | | all vehicles ; average of Reduction rate | | | | - | ~6% |

Figure 54
[Table 59]

comparison in the fuel consumption <New eco-friendly lubrication oil (including 0.3 volume % of eco-substance)>

October

| October | | <Normal> ~ 2009. 4/13 | | | | | | | | | |
|---|---|---|---|---|---|---|---|---|---|---|---|
| The vehicle information | | to | | Load (kg) | from | | Load (kg) | Dates | Running distance(km) | fuel consumption amount (l) | fuel consumption (km/l) |
| No. | Kobe-88-Ka-3714 | SK | Kawaguchi | 8,300 | TOKUOKA | Tokyo | 10,120 | 2009/ 1/14-16 | 1,171 | 442 | 2.65 |
| Type | ISUZU P-CXM19P rev | | | | | | | | | | |
| Engine | 10PC1 / Registration / 1984 | | | | | | | | | | |
| Total weight | 18,853kg | | | | | | | | | | |
| | | | | | | | | | | | |
| No. | Kobe-88-Ka-4112 | TAIKOUYUSHI | Aichi | – | – | – | – | no date | | | |
| Type | ISUZU P-CXM19P rev | SK | Kawaguchi | 10,180 | TOUSHIN | Nagano | 10,520 | 2008/10/17-21 | 1,219 | 432 | 2.82 |
| Engine | 10PC1 / Registration / 1985 | | | | | | | | | | |
| Total weight | 19,885kg | | | | | | | | | | |
| | | | | | | | | | | | |
| No. | Kobe-88-Ka-4397 | OYATSU | Mie | – | YONESHO | Toyama | – | no date | | | |
| Type | MITSUBISHI P-FU415N rev | | | | | | | | | | |
| Engine | 8DC9 / Registration / 1986 | | | | | | | | | | |
| Total weight | 18,715kg | | | | | | | | | | |
| | | | | | | | | | | | |
| No. | Fukui-800-Ka-337 | SK | Saitama | – | MARUSHO | Sendai | – | no date | | | |
| Type | NISSAN P-CD45NG rev | | | | | | | | | | |
| Engine | PE6 / Registration / 1989 | | | | | | | | | | |
| Total weight | 19,870kg | | | | | | | | | | |
| | | | | | | | | | | | |
| No. | Fukui-800-Ka-338 | SK | Kawaguchi | – | NAOTOMI | Nagano | – | no date | | | |
| Type | NISSAN P-CD45NG rev | | | | | | | | | | |
| Engine | PE6 / Registration / 1989 | | | | | | | | | | |
| Total weight | 19,870kg | | | | | | | | | | |
| | | | | | | | | | | | |
| No. | Kobe-130-A-8002 | MIZUSAWAKAGAKU | Yamagata | – | NIIGATAKASEI | Niigata | – | no date | | | |
| Type | VOLVO Tractor | | | | | | | | | | |
| Engine | D12 / Registration / 2002 | | | | | | | | | | |
| Total weight | 38920kg | | | | | | | | | | |
| | | | | | | | | | | | |
| | | SANYOKASEI | Nagoya | – | – | – | – | no date | | | |
| | | | | | | | | | | | |
| | | | | | | | | | | | |

conditions

·loadage : 4~30t/kg
·Utilization of the highway : 5~10%
·Tank cleaning
·using the power of loading and unloading
·Driver
·direct delivery from fuelmakers

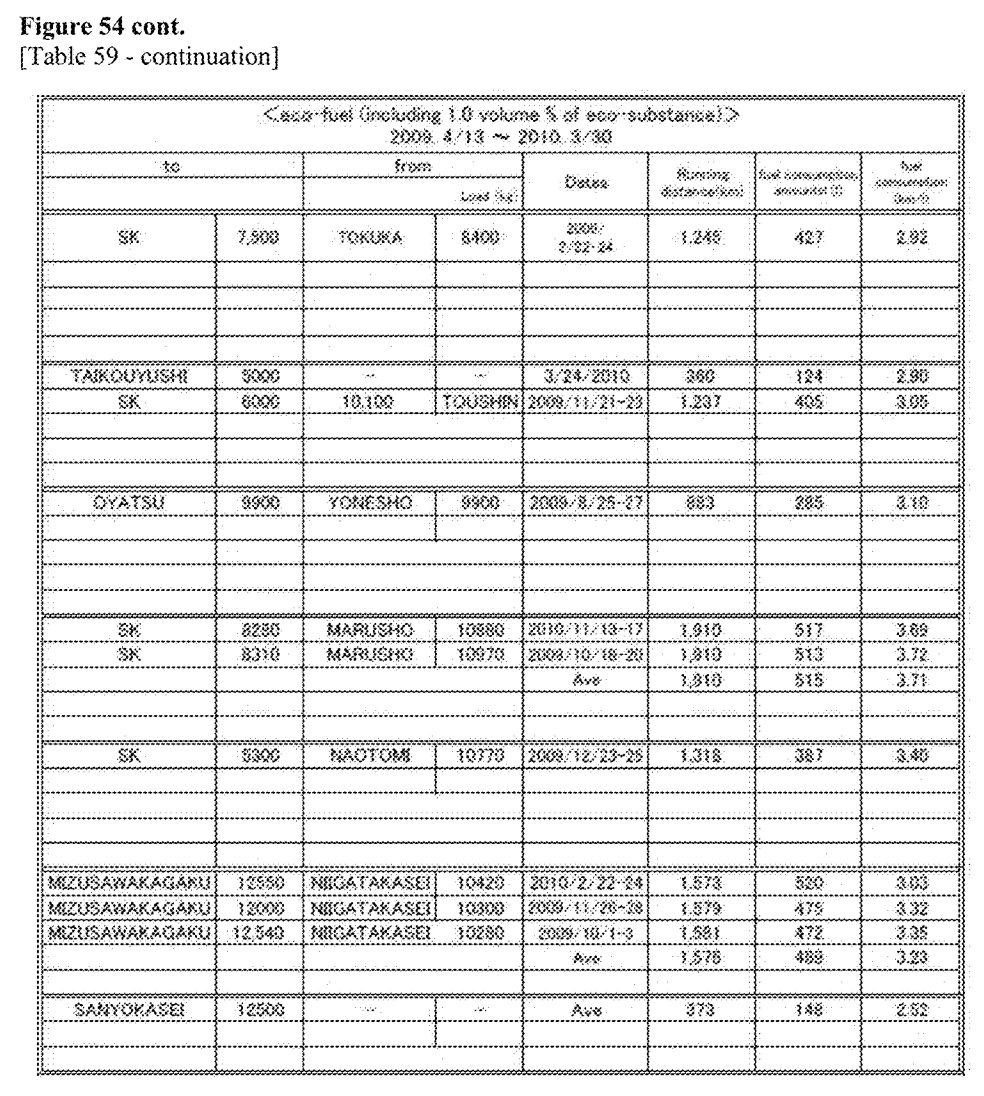

Figure 54 cont.
[Table 59 - continuation]

<eco-fuel (including 1.0 volume % of eco-substance)>
2009. 4/13 ~ 2010. 3/30

| to | | from | Load (kg) | Dates | Running distance(km) | fuel consumption amount (l) | fuel consumption (km/l) |
|---|---|---|---|---|---|---|---|
| SK | 7,900 | TOKUKA | 8400 | 2009/ 2/22-24 | 1,249 | 427 | 2.92 |
| TAIKOUYUSHI | 9000 | – | – | 3/24/2010 | 360 | 124 | 2.90 |
| SK | 6000 | 10,100 | TOUSHIN | 2009/11/21~23 | 1,237 | 405 | 3.05 |
| OYATSU | 9900 | YONESHO | 9900 | 2009/8/25~27 | 883 | 285 | 3.10 |
| SK | 8290 | MARUSHO | 10880 | 2010/11/13~17 | 1,910 | 517 | 3.69 |
| SK | 8310 | MARUSHO | 10970 | 2009/10/18~20 | 1,910 | 513 | 3.72 |
| | | | | Ave | 1,910 | 515 | 3.71 |
| SK | 9300 | NAOTOMI | 10770 | 2009/12/23~25 | 1,318 | 387 | 3.40 |
| MIZUSAWAKAGAKU | 12550 | NIIGATAKASEI | 10420 | 2010/2/22~24 | 1,573 | 520 | 3.03 |
| MIZUSAWAKAGAKU | 12000 | NIIGATAKASEI | 10300 | 2009/11/26~28 | 1,579 | 475 | 3.32 |
| MIZUSAWAKAGAKU | 12,340 | NIIGATAKASEI | 10280 | 2009/10/1~3 | 1,581 | 472 | 3.35 |
| | | | | Ave | 1,578 | 489 | 3.23 |
| SANYOKASEI | 12500 | – | – | Ave | 373 | 148 | 2.52 |

Figure 54 cont.
[Table 59 - continuation]

| <[eco fuel (including 0.3 volume % of eco-substance)] + [New eco-friendly lubrication oil (including 0.3 volume % of eco-substance)]> 2010. 4/1 ~ | | | | | | | | | |
|---|---|---|---|---|---|---|---|---|---|
| to | | from | Load (kg) | Dates | Running distance (km) | Fuel consumption amount (l) | Fuel consumption (km/l) | Reduction rate from normal (%) | Reduction rate from only eco fuel (%) |
| SK | 7,000 | TOKUOKA | 10170 | 2010/10/12-14 | 1,175 | 360 | 3.26 | -19% | -10% |
| | | | | | | | | | |
| | | | | | | | | | |
| | | | | | | | | | |
| | | | | | | | Ave | -19% | -10% |
| TAIKOUYUSHI | 9850 | – | – | 10/4/2010 | 352 | 129 | 2.86 | – | -2% |
| SK | 8410 | 10,300 | TOUSHIN | 2010/10/11-13 | 1,184 | 350 | 3.38 | -16% | -10% |
| | | | | | | | | | |
| | | | | | | | | | |
| | | | | | | | Ave | -18% | -6% |
| OYATSU | 9900 | YONESHO | 10260 | 2008/8/25-27 | 888 | 262 | 3.39 | – | -7% |
| | | | | | | | | | |
| | | | | | | | | | |
| | | | | | | | | | |
| | | | | | | | Ave | – | -7% |
| SK | 7610 | MARUSHO | 10780 | 2010/10/15-18 | 1,930 | 510 | 3.78 | – | -2% |
| | | | | | | | | | |
| | | | | | | | | | |
| | | | | | | | | | |
| | | | | | | | Ave | – | -2% |
| SK | 8870 | NAOTOME | 10770 | 2010/10/1-5 | 1,330 | 380 | 3.50 | – | -3% |
| | | | | | | | | | |
| | | | | | | | | | |
| | | | | | | | | | |
| | | | | | | | Ave | – | -3% |
| MIZUSAWAKAGAKU | 12610 | NIIGATAKASEI | 9180 | 2010/10/14-18 | 1,553 | 439 | 3.54 | – | -5% |
| | | | | | | | | | |
| | | | | | | | | | |
| | | | | | | | | | |
| | | | | | | | | | |
| SANYOKASEI | 12570 | – | – | 2010/10/3-6 | 388 | 148 | 2.60 | – | -3% |
| | | | | | | | | | |
| | | | | | | | Ave | – | -6% |
| | | | | Average of all vehicles | | | | -18% | -6% |

Figure 55
[Table 60]

running test using new eco-friendly lubrication oil in regular gasoline car test vehicle : BMW 1600 test date : 2010/10/11 weather : fine

Departure → Suma → Nishinomiya → Amagasaki

Departure → Hitokura dam → Amagasaki

Departure → Takarazuka → Arima → Amagasaki

| <normal oil> | <eco-fuel (including 1% of eco-substance)> | <eco-fuel (including 1% of eco-substance) + New eco-friendly lubrication oil (including 0.1% of eco-substance)> | |
|---|---|---|---|
| 2009/9/19,27 | 2010/9/21.27 | 3/13/2010 | 3/20/2010 |
| Distance: 186.16km | Distance: 186.16km | Distance: 186.16km | Distance: 186.16km |
| Fuel: 19.42l | Fuel: 15.82l | Fuel: 13.72l | Fuel: 13.07l |
| Fuel consumption: 9.586km/l | Fuel consumption: 11.767km/l | Fuel consumption: 13.569km/l | Fuel consumption: 14.243km |
| | | (Ave 13.906km/l) | |

we put steel bars inside Clack valves and release air,
in order to take an accurate measurement of fuel consumption amount.

| | |
|---|---|
| Reduction rate of eco-fuel (%) : | -24% |
| Reduction rate of eco-fuel + New eco-friendly lubrication oil | -10% |

LUBRICATION OIL AND INTERNAL-COMBUSTION ENGINE FUEL

CROSS-REFERENCE TO RELATED APPLICATION

The present application is a continuation of Ser. No. 13/505,782, filed May 3, 2012, which claims the benefit of priority of International Patent Application No. PCT/JP2011/002545, filed May 6, 2011, which application claims priority of Japanese Patent Application No. 2010-248814, filed Nov. 5, 2010. The entire text of the priority applications are incorporated herein by reference in its entirety.

FIELD OF THE INVENTION

The present invention relates to lubrication oil. In particular, the present invention relates to internal-combustion engine lubrication oil and internal-combustion engine fuel.

BACKGROUND ART

Generally, it has been known that the global warming is influenced by the carbon dioxide caused by the combustion of petroleum oil fuel used in an internal-combustion engine.

In the current economic situation, exchanging or improving various pieces of equipment such as a vehicle, a heavy machine, or a boiler is difficult but the reduction of carbon dioxide has been strongly required.

In a machine such as an internal-combustion engine or a driving system, lubrication oil is used in order to reduce the friction caused during the operation of a gear or a piston. When lubrication oil is used in an internal-combustion engine or a driving system, the friction can be reduced to provide a smooth rotation of a gear or a piston for example, thus reducing the consumption amount of fuel (e.g., light oil, gasoline) and the emission amounts of carbon dioxide and other exhaust gas components caused in the combustion.

On the other hand, lubrication oil is oxidized and deteriorated when subjected to the use for a long period of time. The oxidized lubrication oil causes acid substance, varnish, or sludge for example, thus promoting deterioration such as an increased acid number or an increased viscosity. There are various disadvantages where such an acid substance for example causes the worn parts of an internal-combustion engine or the wear or lubrication oil having an increased viscosity causes an increased power loss, which hinders the operation of the internal-combustion engine.

The mechanical parts of the internal-combustion engine rust due to various causing factors such as water ingression by rain and wind for example. The rust causes an increased power loss, thus hindering the operation of the internal-combustion engine.

By the way, lubrication oil is added with (a) copolymer having a number average molecular weight in the range higher than 6300 and lower than 1200 of octadecene 1 and maleic anhydride and (b) dispersant/VI improver additive agent including a succinimide reaction product prepared from polyamine and acyclic hydrocarbyl-substituted succinic acylating agents. As a result, resolving agent disperses the varnish and sludge components in the entire oil to thereby prevent the accumulation thereof, according to the disclosed invention (see Patent Publication 1 for example).

Regarding petroleum oil fuel itself, it has been previously suggested to add, in a diesel engine, fuel additive substance to the petroleum oil fuel to provide a favorable combustion efficiency to thereby improve the fuel consumption (see Patent Publication 2 for example).

RELATED-ART PUBLICATION PATENT PUBLICATION

Patent Publication 1: Japanese Unexamined Patent Application Publication No. H09-176673

Patent Publication 2: Japanese Unexamined Patent Application Publication No. 2005-290254

SUMMARY OF THE INVENTION

Problem to be Solved by the Invention

However, the invention according to Patent Publication 1 uses the resolving agent to disperse sludge for example to suppress the oxidation and deterioration of lubrication oil. However, the dispersibility cannot be maintained for a long time, the suppression of the oxidation and deterioration of the lubrication oil is not so high, and the effect of reducing carbon dioxide is insufficient. Furthermore, the rust prevention effect for mechanical parts is not achieved.

In the case of the technique as disclosed in Patent Publication 2 to include additive substance in petroleum oil fuel, to attach a fuel reduction apparatus, or to attach an exhaust gas reduction apparatus, carbon dioxide cannot be reduced. The complete combustion causes increased carbon dioxide and a fine-tuned engine causes increased carbon dioxide.

On the other hand, the inventor has carried out the eco-drive education for saving fuel consumption for over ten years. However, the fuel consumption can be saved by about 1% to 2% only. Even when a digital tachograph is attached to manage the driver, there is no remarkable difference in fuel consumption between a vehicle attached with the digital tachograph and a vehicle driven by a highly-experienced driver performing eco-driving.

In view of the above, the inventor has been researching how to reduce the carbon dioxide generation by using internal-combustion engine lubrication oil for a long time. Finally, the inventor has found an effect that eco-substance (dimethylalkyl tertiary amine) injected to lubrication oil can reduce the friction among the parts of the internal-combustion engine, prevent the oxidation and deterioration of the lubrication oil, and can reduce the wear to provide a longer life to various engines.

The inventor also found that various engines can have a rust prevention effect, thus contributing to various engines having a longer life. Thus, the inventor was convinced that the reduction of carbon dioxide and the reduction of exhaust gas components (CO, HC, NOx gas) and the fuel consumption can be achieved, thus reaching the present invention.

The inventor also found that, through a keen research for realizing internal-combustion engine fuel causing less carbon dioxide, eco-substance (dimethylalkyl tertiary amine) injected to petroleum oil fuel can effectively reduce carbon dioxide, other exhaust gas components, and fuel consumption.

In other words, the fuel consumption in light oil, kerosene, gasoline, and Bunker A can be reduced, the amount of carbon dioxide in the exhaust gas can be reduced, and CO, HC, and NOx gas also can be reduced.

It is an objective of this invention to provide internal-combustion engine lubrication oil that has reduced deterioration, a friction reduction effect, and a rust prevention effect as well as internal-combustion engine fuel that can reduce carbon dioxide, a fuel consumption amount, and all exhaust gas.

Means for Solving the Problem

In order to solve the above disadvantage, lubrication oil according to the present invention is injected with impregnating agent composed of dimethylalkyl tertiary amine in the range from 0.01 to 1 volume %. The dimethylalkyl tertiary amine may be, for example, dimethyllaurylamin, dimethylmyristylamine, or dimethylcocoamine for example.

According to this configuration, the impregnating agent (dimethylalkyl tertiary amine) is adsorbed to the metal surfaces of the respective parts of the internal-combustion engine or the driving system for example to reduce friction. Thus, rotating parts such as a gear or a bearing for example can have a reduced friction resistance, thus providing a smooth operation. Thus, an internal-combustion engine for example using this lubrication oil can have a reduced amount of fuel consumption and reduced carbon dioxide and other exhaust gas components (e.g., CO, HC, NOx, SOx, PM). The internal-combustion engine for example using this lubrication oil also can have suppressed wear of the gear or bearing for example, thus providing a longer life of various engines. Furthermore, since the lubrication oil impregnating agent can provide rust prevention acid neutralization, the oxidation and deterioration of the lubrication oil can be suppressed. Thus, the above-described fuel reduction effect or the effect of reducing carbon dioxide for example can be realized for a long time.

The lubrication oil according to claim 2 may have the dimethylalkyl tertiary amine represented by the general expression (1).

[Chemical formula 1]

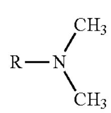

(R represents an alkyl group.)

In the lubrication oil according to claim 3, the dimethylalkyl tertiary amine is desirably formed by oils of plants and animals for environmental friendliness.

In the lubrication oil according to claim 4, the impregnating agent is preferably injected in an amount of 0.1 to 0.5 volume % from the viewpoints of performance and cost.

In the lubrication oil according to claim 5, the lubrication oil may be internal-combustion engine lubrication oil. The internal-combustion engine lubrication oil means engine oil for example. By using lubrication oil as engine oil, a reduced load can be applied to an engine, a main shaft, a clutch, a mission, a propeller shaft, a joint bearing, a differential gear, a rear shaft, a wheel bearing, a battery, or a starter for example. Thus, the respective parts can have reduced friction and can have remarkably-reduced fuel consumption, thus achieving the corresponding reduction of carbon dioxide and other types of exhaust gas. The lubrication oil also may be used, in addition to engine oil, for power steering oil, turbine oil, or gear oil for example.

The lubrication oil according to claim 6 may be used in internal-combustion engine together with internal-combustion engine fuel injected with the lubrication oil impregnating agent in the range from 0.1 to 1 volume %. According to this configuration, the internal-combustion engine fuel (e.g., gasoline) injected with the impregnating agent can provide, when being used together with the lubrication oil of the present invention, not only the effect by the lubrication oil but also a reduced fuel consumption by the internal-combustion engine fuel mixed with the impregnating agent, thus additionally achieving the effect of reducing carbon dioxide and other exhaust gas components. Even at a part to which the lubrication oil cannot reach (e.g., a top part of a con rod), an oil film is formed by jetted internal-combustion engine fuel. This oil film provides the same function as that of the lubrication oil to provide a smooth operation of various engines (see FIG. 1). This oil film also can prevent the seizure around a piston head for example.

In the lubrication oil according to claim 7, impregnating agent composed of dimethylalkyl tertiary amine is injected in the range from 1 to 5 volume % and thickener is injected so that the resultant oil is jellylike. The jellylike lubrication oil means the one such as grease that is used by being coated on a bearing or a shaft for example. The thickener is injected in order to cause the lubrication oil to be semisolid and may be, for example, calcium, sodium, lithium, or aluminum for example. According to this configuration, the respective parts can have reduced friction thereamong, smooth operation can be obtained, reduced fuel consumption can be achieved, and the reduction of carbon dioxide and other exhaust gas components can be reduced. A rust prevention effect also can be obtained, thus providing a longer life to the machine. While the lubrication oil of claims 1 to 6 is mainly used in an internal-combustion engine (e.g., engine oil), the jellylike lubrication oil is mainly used for a bearing or a tire shaft for example. Thus, the impregnating agent can be used in a relatively-high amount.

In the invention according to claim 8, petroleum oil fuel is injected with fuel oil impregnating agent composed of dimethylalkyl tertiary amine in the range from 0.5 to 1 volume %. The dimethylalkyl tertiary amine may be amine DM12D, amine DM14D, or amine DM16D (product names used by LION AKZO Co., Ltd.).

According to the invention of claim 8, when the fuel is used in an internal-combustion engine, a fuel consumption amount is reduced, carbon dioxide and other exhaust gas components are reduced, and stability is achieved for a long period.

When the fuel of claim 8 is used as vehicle fuel, the engine noise is improved at the speed of about 20 km and the exhaust gas temperature of 70 to 100 degrees C., showing a highly-efficient combustion. Since the fuel combusts at a low temperature, $CO_2$ is absorbed and the combustion reaction is promoted.

In addition, the fuel oil impregnating agent (dimethylalkyl tertiary amine) can be adsorbed to a metal surface to provide friction reduction and rust prevention. Thus, the lubrication performance is improved qualitatively, a smooth engine rotation is provided, and the rust prevention acid neutralization is realized, thus preventing the oxidation and deterioration of engine oil. This effect is significant when the engine oil is oxidized and deteriorated.

Furthermore, air pollutant such as sulfur oxide (SOx), black smoke, or particulate matter (PM) is reduced and CO, HC, or NOx is also reduced.

As described in claim 9, the petroleum oil fuel composed of light oil, kerosene, gasoline, or Bunker A is effectively used.

As described in claim 10, from the viewpoint of cost in particular, the fuel oil impregnating agent is desirably injected in an amount of 0.99 to 1 volume %.

Effect of the Invention

As described above, according to the present invention, lubrication oil is injected with impregnating agent composed of dimethylalkyl tertiary amine in the range of 0.01 to 1 volume %. Thus, when the lubrication oil is used in an internal-combustion engine such as an automobile engine, various engines can have reduced friction resistance, the fuel consumption amount is reduced, and the carbon dioxide and other exhaust gas components are also reduced. The lubrication oil also provides a rust prevention effect, suppresses the oxidation and deterioration of the lubrication oil, suppresses the wear of the respective parts, and can provide the internal-combustion engine with a longer life.

Petroleum oil fuel injected with fuel oil impregnating agent composed of dimethylalkyl tertiary amine in the range from 0.5 to 1 volume % allows, when the petroleum oil fuel is used in an internal-combustion engine such as an automobile engine, the fuel consumption amount to be stably reduced for a long period and also allows carbon dioxide and other exhaust gas components to be reduced.

BRIEF DESCRIPTION OF THE DRAWINGS

FIG. 1 illustrates the flow of the lubrication oil in a piston and a con rod of an internal-combustion engine and the flow of fuel (injection).

FIG. 2 illustrates the result of the vehicle number 438 of the black smoke test using normal lubrication oil (conventional lubrication oil).

FIG. 3 illustrates the result of the vehicle number 438 of a black smoke test using new eco-friendly lubrication oil (the lubrication oil of the present invention).

FIG. 4 illustrates the result of the vehicle number 8003 of the black smoke test using normal lubrication oil.

FIG. 5 illustrates the result of the vehicle number 8003 of the black smoke test using the new eco-friendly lubrication oil.

FIG. 7 illustrates the result of the running test for confirming the effect in a high-octane gasoline vehicle injected with eco-substance.

FIG. 8 illustrates the result of the running test for confirming the effect in a regular gasoline vehicle injected with the eco-substance.

FIG. 11 illustrates the comparison in fuel consumption between a case where no eco-substance is injected and a case where the eco-substance is injected.

FIG. 12 illustrates, in a rust prevention experiment, the comparison regarding the rust occurrence between a case where normal lubrication oil is coated and a case where new eco-friendly lubrication oil is coated (as of Sep. 16, 2010 at which the experiment was started).

FIG. 13 illustrates, in the rust prevention experiment, the comparison regarding the rust occurrence between a case where the normal lubrication oil is coated and a case where the new eco-friendly lubrication oil is coated (as of Sep. 27, 2010).

FIG. 14 illustrates, in the rust prevention experiment, the comparison regarding the rust occurrence between a case where the normal lubrication oil is coated and a case where the new eco-friendly lubrication oil is coated (as of Oct. 11, 2010).

FIG. 15 illustrates, in the rust prevention experiment, the comparison regarding the rust occurrence between a case where the normal lubrication oil is coated and a case where the new eco-friendly lubrication oil is coated (as of Oct. 18, 2010).

FIG. 16 is a schematic drawing of the arrangement for measuring fuel consumption in Table 60.

FIG. 17 is a table, Table 1, of a running test for the comparison in the fuel consumption for the respective diesel trucks using light oil as fuel between a case where the conventional engine oil was used and a case where the new eco-friendly lubrication oil was used.

FIG. 18 is a table, Table 2, of a running test for the comparison in the fuel consumption for the respective diesel trucks using light oil as fuel between a case where the conventional engine oil was used and a case where the new eco-friendly lubrication oil was used.

FIG. 19 is a table, Table 3, with regard to the respective vehicles using regular gasoline as fuel, the result of the running test for the comparison of the fuel consumption between a case where the conventional engine oil was used and a case where the new eco-friendly lubrication oil was used.

FIG. 20 is a table, Table 4, with regard to the respective vehicles using high octane gasoline as fuel, the result of the running test for the comparison of the fuel consumption between a case where the conventional engine oil was used and a case where the new eco-friendly lubrication oil was used.

FIG. 21 is a table, Table 6, showing the result of the running test for the comparison in the fuel consumption for the respective diesel trucks (10 t vehicles) using light oil as fuel between a case where the conventional engine oil was used and a case where the new eco-friendly lubrication oil was used.

FIG. 22 is a table, Table 7, showing the result of the running test for the comparison in the fuel consumption for the respective diesel trucks (10 t vehicles) using light oil as fuel between a case where the conventional engine oil was used and a case where the new eco-friendly lubrication oil was used.

FIG. 23 is a table, Table 8, showing the data for the running test regarding the diesel truck (10 t vehicle) having the vehicle number 353.

FIG. 24 is a table, Table 9, showing the test result when the new eco-friendly lubrication oil including 0.3 volume % of the eco-substance was used in the diesel trucks (4 t vehicle) using light oil as fuel.

FIG. 25 is a table, Table 10, showing the test result for the diesel passenger vehicle using light oil as fuel.

FIG. 26 is a table, Table 11, showing the result of the running test for the comparison in the fuel consumption for the respective vehicles using gasoline (regular and high-octane) as fuel between a case where the conventional engine oil was used and a case where the new eco-friendly lubrication oil was used.

FIG. 27 is a table, Table 12, showing the result of the running test for the comparison in the fuel consumption for the respective vehicles using gasoline (regular and high-octane) as fuel between a case where the conventional engine oil was used and a case where the new eco-friendly lubrication oil was used.

FIG. 28 is a table, Table 13, showing the result of the running tests using the eco-friendly lubrication oil including 0.5 volume % of the eco-substance regarding the gasoline vehicle using high-octane gasoline.

FIG. 29 is a table, Table 14, showing the result of the running tests using the eco-friendly lubrication oil including 0.5 volume % of the eco-substance regarding the gasoline vehicle using regular gasoline.

FIG. 30 is a table, Table 17, showing the comments by the drivers of the respective vehicles regarding the behavior and horsepower of the engine, the fuel consumption, and exhaust gas smoke for example.

FIG. 31 is a table, Table 18, showing the comments by the drivers of the respective vehicles regarding the behavior and horsepower of the engine, the fuel consumption, and exhaust gas smoke for example.

FIG. 32 is a table, Table 19, showing the comments by the drivers of the respective vehicles regarding the behavior and horsepower of the engine, the fuel consumption, and exhaust gas smoke for example.

FIG. 33 is a table, Table 38, showing that an average reduction rate of −5% is achieved in 8 running tests for which the loading place is Kohe-shi of Hyogo ken and the unloading place is Iizuka-shi of Fukuoka ken.

FIG. 34 is a table, Table 39, showing that an average reduction rate of −12% is achieved in 4 running tests for the outward path and the return path.

FIG. 35 is a table, Table 40, showing that an average reduction rate of −12% is achieved in 4 running tests for the outward path and the return path.

FIG. 36 is a table, Table 41, showing that an average reduction rate of −12% is achieved in 4 running tests for the outward path and the return path.

FIG. 37 is a table, Table 42, showing that an average reduction rate of −13% is achieved in 5 running tests for which the loading place is Wajima of Ishikawa ken and the unloading place is Amagasaki-shi of Hyogo ken.

FIG. 38 is a table, Table 43, showing that an average reduction rate of −13% is achieved in 5 running tests for which the loading place is Wajima of Ishikawa ken and the unloading place is Amagasaki-shi of Hyogo ken.

FIG. 39 is a table, Table 44, showing that an average reduction rate of −12% is achieved in 9 running tests for which the loading place is Nakaniikawa-gun of Toyama ken and the unloading place is Takasago-shi of Hyogo ken.

FIG. 40 is a table, Table 45, showing that an average reduction rate of −12% is achieved in 9 running tests for which the loading place is Nakaniikawa-gun of Toyama ken and the unloading place is Takasago-shi of Hyogo ken.

FIG. 41 is a table, Table 46, showing that an average reduction rate of −12% is achieved in 9 running tests for which the loading place is Nakaniikawa-gun of Toyama ken and the unloading place is Takasago-shi of Hyogo ken.

FIG. 42 is a table, Table 47, showing that an average reduction rate of −14% is achieved in 3 running tests for which the loading place is Noto of Isikawa ken and the unloading place is Amagasaki-shi of Hyogo ken.

FIG. 43 is a table, Table 48, showing that an average reduction rate of −14% is achieved in 3 running tests for which the loading place is Noto of Isikawa ken and the unloading place is Amagasaki-shi of Hyogo ken.

FIG. 44 is a table, Table 49, showing that an average reduction rate of −9% is achieved in 3 running tests for the outward path (loading place: Amagasaki-shi of Hyogo ken, unloading place: Kitatone of Ibaragi ken) and the return path (loading place: Sano-shi of Tochigi ken, unloading place: Amagasaki-shi of Hyogo ken).

FIG. 45 is a table, Table 50, showing that an average reduction rate of −9% is achieved in 3 running tests for the outward path (loading place: Amagasaki-shi of Hyogo ken, unloading place: Kitatone of Ibaragi ken) and the return path (loading place: Sano-shi of Tochigi ken, unloading place: Amagasaki-shi of Hyogo ken).

FIG. 46 is a table, Table 51, showing that an average reduction rate of −8% is achieved in 5 running tests for the outward path (loading place: Izumisano-shi of Osaka-fu, unloading place: Echizen-shi of Fukui ken) and the return path (loading place: Nakaniikawa-gun of Toyama ken, unloading place: Takasago-shi of Hyogo ken).

FIG. 47 is a table, Table 52, showing that an average reduction rate of −8% is achieved in 5 running tests for the outward path (loading place: Izumisano-shi of Osaka-fu, unloading place: Echizen-shi of Fukui ken) and the return path (loading place: Nakaniikawa-gun of Toyama ken, unloading place: Takasago-shi of Hyogo ken).

FIG. 48 is a table, Table 53, showing that an average reduction rate of −6% is achieved in 11 running tests for which the loading place is Amagasaki-shi of Hyogo ken and unloading place is Noto of Isikawa ken.

FIG. 49 is a table, Table 54, showing that an average reduction rate of −6% is achieved in 11 running tests for which the loading place is Amagasaki-shi of Hyogo ken and unloading place is Noto of Isikawa ken.

FIG. 50 is a table, Table 55, showing that an average reduction rate of −17% is achieved in 9 running tests for which the loading place is Yokkaichi-shi of Aichi ken and unloading place is Amagasaki-shi of Hyogo ken.

FIG. 51 is a table, Table 56, showing that an average reduction rate of −17% is achieved in 9 running tests for which the loading place is Yokkaichi-shi of Aichi ken and unloading place is Amagasaki-shi of Hyogo ken.

FIG. 52 is a table, Table 57, showing that an average reduction rate of −17% is achieved in 9 running tests for which the loading place is Yokkaichi-shi of Aichi ken and unloading place is Amagasaki-shi of Hyogo ken.

FIG. 53 is a table, Table 58, showing, with regard to a diesel truck using light oil, the result when the normal fuel and the normal lubrication oil were used, the result when the eco fuel and the normal lubrication oil were used, and the result when the eco fuel and the new eco-friendly lubrication oil were used.

FIG. 54 is a table, Table 59, showing with regard to a diesel truck using light oil, the result when the normal fuel and the normal lubrication oil were used, the result when the eco fuel and the normal lubrication oil were used, and the result when the eco fuel and the new eco-friendly lubrication oil were used.

FIG. 55 is a table, Table 60, showing the results for a passenger vehicle using regular gasoline.

MODE FOR CARRYING OUT THE INVENTION

Figure 6A:
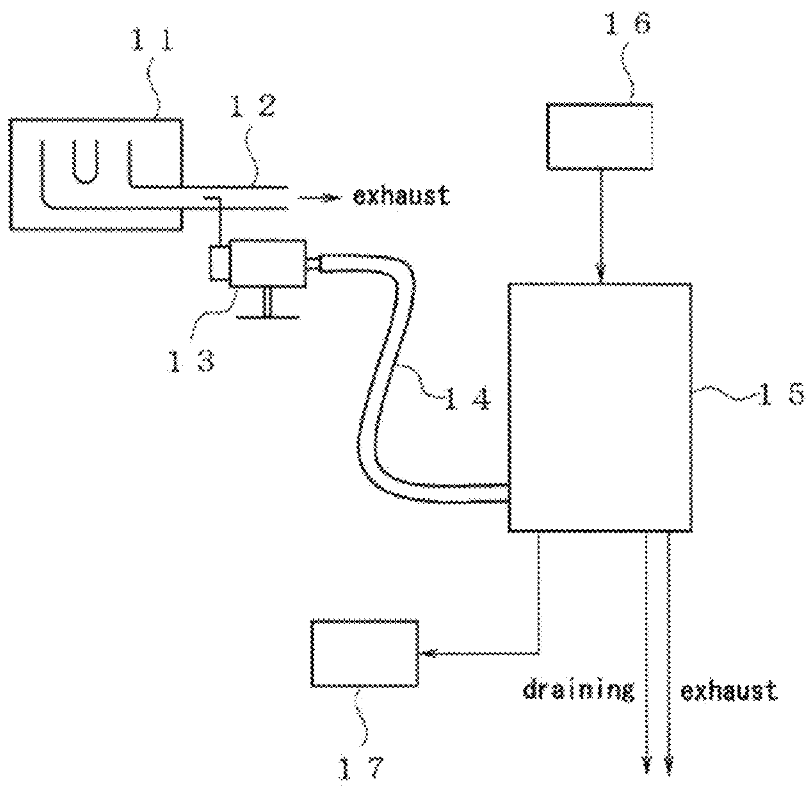
FIG. 6A schematically illustrates the configuration of a test apparatus.

The following section will describe an embodiment of the present invention with reference to the drawings and tables. The lubrication oil according to the present invention is obtained by injecting lubrication oil impregnating agent composed of dimethylalkyl tertiary amine (hereinafter referred to as eco-substance) to conventional lubrication oil. The eco-substance is injected in the range from 0.01 to 1 volume % and desirably in the range from 0.1 to 0.5 volume %. The reason is that the injection amount lower than 0.1 volume % prevents a sufficient effect from being provided and that the lubrication oil used in a machine such as an internal-combustion engine with the injection amount exceeding 0.5 volume % causes an insufficient effect not enough for a high price. It is confirmed that the lubrication oil injected with the impregnating agent within the above range can be used as general lubrication oil, according to a component analysis.

It is also confirmed that the lubrication oil injected with the eco-substance can provide a desired effect as described later.

The eco-substance may be, for example, dimethyllaurylamine, dimethylmyristylamine, dimethylcocoamine, dimethylpalmitinamine, dimethylbehenylamine, dimethylcocoaminc, dimethyl palm stearin amine, or dimethyldesineamine. These eco-substances have different melting points, respectively, and are selectively used based on the application or the point of use of the lubrication oil for example. In this embodiment, the eco-substance is dimethyllaurylamine.

First, lubrication oil is injected with the eco-substance (dimethyllaurylamine) at 0.1 volume %, 0.3 volume %, and 0.5 volume % to thereby manufacture the new eco-friendly lubrication oil having the respective concentrations. The new eco-friendly lubrication oil including the eco-substance at the respective concentrations (volume %) is manufactured, for example, by injecting into a tank including lubrication oil of 100 liters the eco-substance of 0.1 liter for the concentration of 0.1 volume %, the eco-substance of 0.3 liter for the concentration of 0.3 volume %, and the eco-substance of 0.5 liter for the concentration of 0.5 volume % to stir and mix the lubrication oil with the eco-substance.

Next, the manufactured new eco-friendly lubrication oil was used to perform a running test and a black smoke test. These tests were performed in order to compare conventional lubrication oil with the new eco-friendly lubrication oil. In these tests, the lubrication oil was engine oil and the new eco-friendly lubrication oil was conventional engine oil injected with the above predetermined eco-substance.

1. [Running Test]

The vehicles (automobiles) used in the running test were: a diesel truck (a 4 t vehicle, a 10 t vehicle (gross weight of 20 t), and a tractor (gross weight of 40 t) for example), a diesel passenger vehicle ("SAFARI" (registered trademark)), a regular gasoline passenger vehicle ("BMW" (registered trademark) of 1600 cc), and a high-octane gasoline passenger vehicle ("MERCEDES-BENZ" (registered trademark) of 6000 cc). In these vehicles, light oil was used in the diesel truck and passenger vehicle and regular gasoline or high-octane gasoline was used in the gasoline vehicles. In order to provide uniform running conditions (e.g., a running speed, a running distance) as much as possible, the respective vehicles were driven by the same driver to run on the same route. In order to prevent an error, the consumption fuel was measured correctly and the running distance was measured correctly by a running distance meter. Then, the resultant fuel consumptions were compared.

(1) New Eco-Friendly Lubrication Oil Including 0.1 Volume % of Eco-Substance

Table 1 to Table 5 in FIGS. 17 to 21, respectively, show the result of the running tests using the new eco-friendly lubrication oil including 0.1 volume % of the eco-substance. Table 1 and Table 2 in FIGS. 17 and 18, respectively, are tables showing the result of the running test for the comparison in the fuel consumption for the respective diesel trucks using light oil as fuel between a case where the conventional engine oil was used and a case where the new eco-friendly lubrication oil was used. The tables show, from the left side, the vehicle information, the destination, the stopover point, the running distance, and the consumption fuel for example when the conventional engine oil (normal lubrication oil) was used, and the destination, the stopover point, the running distance, and the consumption fuel for example when the new eco-friendly lubrication oil was used. The rightmost section shows how much fuel consumption was reduced and how much average fuel consumption was reduced for the respective vehicles by the use of the new eco-friendly lubrication oil from the fuel consumption amount of the normal lubrication oil. The lowermost section shows how much average fuel consumption was reduced for all of the vehicles.

As can be seen from these results, the fuel consumption performance is improved by the use of new eco-friendly lubrication oil when compared with a case where the normal lubrication oil is used. The improved fuel consumption provides the reduction of emitted carbon dioxide and other exhaust gas components.

Table 3 and Table 4 in FIGS. 19 and 20, respectively, are tables showing, with regard to the respective vehicles using gasoline (regular or high-octane) as fuel, the result of the running test for the comparison of the fuel consumption between a case where the conventional engine oil was used and a case where the new eco-friendly lubrication oil was used. These tables show the destinations of the respective routes, the stopover points, the respective distances, the total running distances, the fuel consumption amounts, the fuel consumption, and how much fuel consumption was reduced by the use of the new eco-friendly lubrication oil from the fuel consumption amount of the normal lubrication oil. The lowermost section shows how much average fuel consumption was reduced for all of the routes. In the table, the term "new eco-friendly oil" means the new eco-friendly lubrication oil.

As can be seen from these results, the fuel consumption performance is improved, also in the gasoline vehicle, by the use of new eco-friendly lubrication oil when compared with a case where the normal lubrication oil is used.

From the above description, it is understood that the fuel consumption performance is improved, both in the diesel trucks and the gasoline vehicles, by the use of new eco-friendly lubrication oil including 0.1 volume % of the eco-substance.

Table 5 shows the comments by the driver regarding the change from the normal lubrication oil to the new eco-friendly lubrication oil. The comments at least did not include any answer showing bad fuel consumption or vehicle.

TABLE 5 running test using new eco-friendly lubrication oil in high-octane gasoline car

| car No. | engine type | displacement | date of mixing oil | eco-substance | running distance | running distance after changing | amount of oil | eco-substance | comment of driver | | | date of changing oil |
|---|---|---|---|---|---|---|---|---|---|---|---|---|
| 357 | PE-6 | 11670 cc | Jan. 20, 2010 | 0.10% | 1,652,976 km | 3,000 km | 27 L | 27 cc | fuel consumption: GOOD | conditions: GOOD | power: GOOD | Mar. 18, 2010 |

TABLE 5-continued

| running test using new eco-friendly lubrication oil in high-octane gasoline car | | | | | | | | | | | | |
|---|---|---|---|---|---|---|---|---|---|---|---|---|
| 4914 | 8DC9 | | Feb. 1, 2010 | 0.10% | 549,739 km | 20,000 km | 28 L | 28 cc | fuel consumption: GOOD | conditions: GOOD | power: GOOD | |
| 3887 | 10PC1 | 15010 cc | Feb. 6, 2010 | 0.10% | 1,505,301 km | 3,000 km | 30 L | 30 cc | fuel consumption: GOOD | conditions: GOOD | power: GOOD | Feb. 6, 2010 |
| 5211 | TD42 | 4160 cc | Mar. 1, 2010 | 0.10% | 101,734 km | 700 km | 9 L | 9 cc | fuel consumption: GOOD | conditions: GOOD | power: GOOD | Mar. 1, 2010 |

| car No. | engine type | displacement | date of mixing oil | eco-substance | running distance | running distance after changing | amount of oil | eco-substance | comment of driver | | | something wrong |
|---|---|---|---|---|---|---|---|---|---|---|---|---|
| 4397 | 8DC9 | 16030 cc | Feb. 14, 2010 | 0.10% | 1,236,666 km | 14,566 km | 28 L | 28 cc | fuel consumption: GOOD | conditions: GOOD | power: GOOD | nothing |
| 428 | 6D22 | 11140 cc | Feb. 14, 2010 | 0.10% | 1,052,103 km | 2,103 km | 26 L | 26 cc | fuel consumption: GOOD | conditions: GOOD | power: GOOD | nothing |
| 4112 | 10PC1 | 15010 cc | Feb. 14, 2010 | 0.10% | 1,693,635 km | 6,365 km | 30 L | 30 cc | fuel consumption: unknwon | conditions: unknown | power: unknown | nothing |
| 4914 | 8DC9 | 16030 cc | Feb. 22, 2010 | 0.10% | 549,739 km | 0 | 28 L | 28 cc | fuel consumption: GOOD | conditions: GOOD | power: GOOD | nothing |

(2) New Eco-Friendly Lubrication Oil Including 0.3 Volume % of Eco-Substance

Table 6 to Table 12 in FIGS. 21 to 27, respectively show the result of the running tests using the eco-friendly lubrication oil including 0.3 volume % of the eco-substance. Table 6 and Table 7 (FIGS. 21 and 22, respectively) show, as in Table 1 and Table 2 (FIGS. 17 and 18, respectively), the result of the running test for the comparison in the fuel consumption for the respective diesel trucks (10 t vehicles) using light oil as fuel between a case where the conventional engine oil was used and a case where the new eco-friendly lubrication oil was used. Table 8 in FIG. 23 shows the data for the running test regarding the diesel truck (10 t vehicle) having the vehicle number 353. The 353 vehicle was caused to run on generally the same route for many times.

As can be seen from these results, the fuel consumption performance is improved, in the diesel trucks using light oil, by the use of new eco-friendly lubrication oil including 0.3 volume % of eco-substance when compared with a case where the normal lubrication oil is used.

Table 9 in FIG. 24 shows the test result when the new eco-friendly lubrication oil including 0.3 volume % of the eco-substance was used in the diesel trucks (4 t vehicle) using light oil as fuel. Table 10 in FIG. 25 shows the test result for the diesel passenger vehicle using light oil as fuel.

As can be seen from these results, the fuel consumption performance is improved, also in the diesel truck (4 t vehicle) and the diesel passenger vehicle using light oil, by the use of the new eco-friendly lubrication oil including 0.3 volume % of the eco-substance when compared with a case where the normal lubrication oil is used.

Table 11 and Table 12 in FIGS. 26 and 27, respectively, show, as in Table 3 and Table 4 (FIGS. 19 and 20, respective), the result of the running test for the comparison in the fuel consumption for the respective vehicles using gasoline (regular and high-octane) as fuel between a case where the conventional engine oil was used and a case where the new eco-friendly lubrication oil was used.

As can be seen from these results, the fuel consumption performance is improved, also in the gasoline vehicles, by the use of the new eco-friendly lubrication oil including 0.3 volume % of the eco-substance when compared with a case where the normal lubrication oil is used.

As can be seen from the above, the fuel consumption performance is improved, also in any of the diesel truck and the passenger vehicle using light oil as fuel and the gasoline vehicle, by the use of the new eco-friendly lubrication oil including 0.3 volume % of the eco-substance.

(3) New Eco-Friendly Lubrication Oil Including 0.5 Volume % of Eco-Substance

Table 13 to Table 15 (Tables 13 and 14 being in FIGS. 28 and 29, respectively), show the result of the running tests using the eco-friendly lubrication oil including 0.5 volume % of the eco-substance regarding the gasoline vehicle using high-octane gasoline, the gasoline vehicle using regular gasoline, and the diesel passenger vehicle using light oil as fuel. Table 13 (FIG. 28) shows the test result for high-octane gasoline. Table 14 (FIG. 29) shows the test result for regular gasoline. Table 15 shows the test result for light oil as fuel.

TABLE 15

| running test using new eco-friendly lubrication oil (conditions: load +− 30 kg, same vehicle, same driver, fuel tolerance 100 cc) | | | | test vehicle: NISSAN SAFARI new eco-friendly lubrication oil (0.5 volume % eco-substance) |
|---|---|---|---|---|
| | Normal oil | | | |
| month | January | February | March | October |
| working days | 18 days | 24 days | 25 days | 24days |
| running distance per month | 101734 km | 102090 km | 102445 km | 106267 km |
| main destination & running distance | Nishinomiya 12 km<br>Ishimichi 48 km<br>Hitokura 61 km<br>Nada 36 km | Hitokura dam 61 km<br>Hitokura dam 61 km<br>Nada 36 km | Nishinomiya 12 km<br>Ishimichi 48 km<br>Nada 36 km | Hitokura 61 km<br>Hitokura 61 km<br>Nada 36 km |
| total running distance | 157 km | 158 km | 96 km | 158 km |
| comuting (2 km), less than 10 km per | 199 km | 197 km | 237 km | 237 km |
| running distance | 356 km | 355 km | 333 km | 395 km |
| amount used fuel | 67.8 l | 64.23 l | 61.92 l | 59.09 l |
| fuel consumption | 5.251 km/l | 5.527 km/l | 5.378 km/l | 6.685 km/l |
| average of fuel consumption (normal oil, 3 months) | | | 5.385 | |
| Reduction rate from normal (%) | | | | −19% |

As can be seen from these results, the fuel consumption performance is improved, at least in the passenger vehicle using gasoline and light oil as fuel, by the use of new eco-friendly lubrication oil including 0.5 volume % of eco-substance when compared with a case where the normal lubrication oil is used.

2. [Black Smoke Test]

The respective vehicles were black smoke test in order to compare the new eco-friendly lubrication oil including 0.3 volume % of the eco-substance with the normal lubrication oil regarding the black smoke concentration.

In the black smoke test, a probe (a exhaust gas extraction sheet of a black smoke measuring instrument) was inserted to an exhaust pipe by about 20 cm to allow the exhaust gas to pass through the probe. Then, the probe on which impurities were attached was placed in the black smoke measuring instrument to measure the black smoke concentration. The blacker the probe is, the more impurities are attached thereto, thus resulting in a higher black smoke concentration.

(i) In the black smoke test, the vehicle was stopped and the change gear was at a neutral position.

(ii) A motor was operated under no load. Then, an accelerator pedal was pushed down rapidly until the highest rotation number was reached. Then, the accelerator pedal was released until the no-load running is reached. The above operation was repeated 2 or 3 times.

(iii) Next, the no-load running was performed for about 5 seconds and the accelerator pedal was pushed down rapidly to retain this state for about 4 seconds. Thereafter, the accelerator pedal was released and this state was retained for about 11 seconds. The above operation was repeated 2 or 3 times (iv) The extraction of black smoke was started when the accelerator pedal was pushed down in (iii). The probe was purged (to scavenge any remaining black smoke) just before the extraction of black smoke.

(v) The above steps of (i) to (iv) were repeated 3 times. Then, the resultant average value was determined as a black smoke concentration.

Table 16 shows the list of the results of the black smoke test for the respective vehicles. The left side shows the result for the normal lubrication oil. The right side shows the result for the new eco-friendly lubrication oil including 0.3 volume % of the eco-substance. FIG. 2 to FIG. 5 are an example showing the result of the actually-performed black smoke test (regarding the vehicle numbers 438 and 8003).

TABLE 16

Black Smoke Test
Comparison of normal oil and new eco-friendly lubrication oil including 0.3 volume % eco-substance

| normal oil (RIMULA SUPER) | | | | | | | new eco-friendly lubrication oil including 0.3 volume % eco-substance (RIMULA SUPER) | | | | | | comparison result | | |
|---|---|---|---|---|---|---|---|---|---|---|---|---|---|---|---|
| car No. | running distance (km) | test-day | 1st (%) | 2nd (%) | 3rd (%) | average (%) | running distance (km) | test-day | 1st (%) | 2nd (%) | 3rd (%) | average (%) | reduction value of black smoke | reduction rate of black smoke | notes |
| 438 | 399,433 | Jul. 24, 2010 | 18 | 18 | 16 | 17.3 | 411,922 | Oct. 5, 2010 | 14 | 18 | 18 | 16.7 | −0.67 | −3.80% | |
| 358 | 1,838,971 | Aug. 31, 2010 | 18 | 30 | 34 | 27.3 | 1,845,835 | Oct. 7, 2010 | 20 | 30 | 24 | 24.7 | −2.67 | −9.80% | |
| 428 | 1,091,454 | Aug. 31, 2010 | 22 | 24 | 24 | 23.3 | 1,097,929 | Oct. 7, 2010 | 24 | 22 | 26 | 24 | 0.67 | 2.90% | |
| 8003 | 502,888 | Aug. 31, 2010 | 2 | 2 | 2 | 2 | 506,248 | Oct. 6, 2010 | 1 | 1 | 1 | 1 | −1 | −50.00% | |
| 4397 | 1,272,953 | Sep. 6, 2010 | 26 | 28 | 30 | 28 | 1,279,810 | Oct. 8, 2010 | 18 | 20 | 20 | 21.3 | −6.67 | −23.80% | |
| 4112 | 1,729,429 | Sep. 6, 2010 | 34 | 20 | 14 | 22.7 | 1,735,222 | Oct. 7, 2010 | 22 | 26 | 26 | 23.3 | 0.67 | 2.90% | |

As can be seen from the above, the use of the new eco-friendly lubrication oil including 0.3 volume % of the eco-substance can reduce black smoke, thus improving the performance. Furthermore, less emitted black smoke also achieves environmental friendliness.

Table 17 to Table 19 in FIGS. 30 to 32, respectively, show the comments by the drivers of the respective vehicles regarding the behavior and horsepower of the engine, the fuel consumption, and exhaust gas smoke for example.

As can be seen from these comments, according to the comments by the drivers, the use of the new eco-friendly lubrication oil provides, when compared with the use of the conventional lubrication oil, at least equal or improved engine behavior, fuel consumption, and exhaust gas smoke amount.

3. [Internal-Combustion Engine Fuel]

Next, the following section will describe an embodiment of the internal-combustion engine fuel injected with eco-substance with reference to the drawings.

The internal-combustion engine fuel according to the present invention is obtained by injecting (or adding) fuel oil impregnating agent composed of dimethylalkyl tertiary amine (hereinafter referred to as eco-substance) to petroleum oil fuel. The eco-substance is injected in the range from 0.5 to 1 volume % and desirably in the range from 0.99 to 1 volume %. The reason is that the injection amount lower than 0.5 volume % prevents a sufficient effect from being provided and that the injection amount exceeding 1 volume % causes an insufficient effect not enough for a high price. It is confirmed that light oil, kerosene, gasoline, or Bunker A injected with the fuel oil impregnating agent within the above range is handled as light oil, kerosene, gasoline, or Bunker A, according to a component analysis.

The petroleum oil fuel is light oil, kerosene, gasoline, or Bunker A and can provide, by being injected with the eco-substance, a desired effect as described later.

The eco-substance may be amine DM12D, amine DM14D, or amine DM16D (product name used by LION AKZO Co., Ltd.).

Figure 6B:
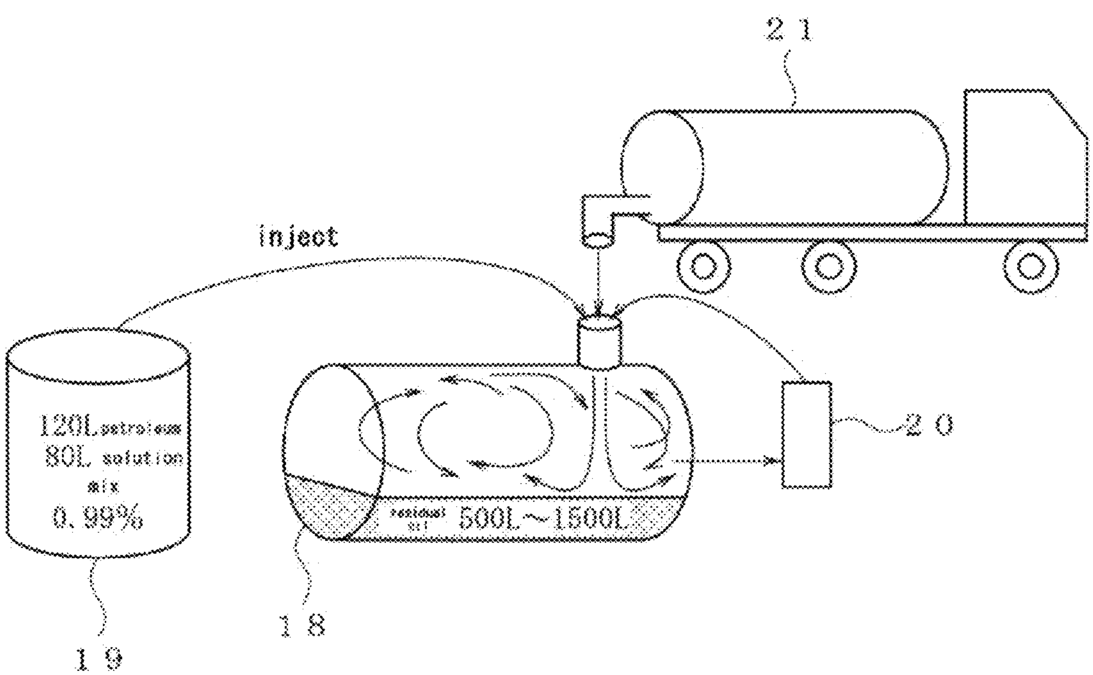
FIG. 6B illustrates one example of an eco-substance injection method.
Figure 9:
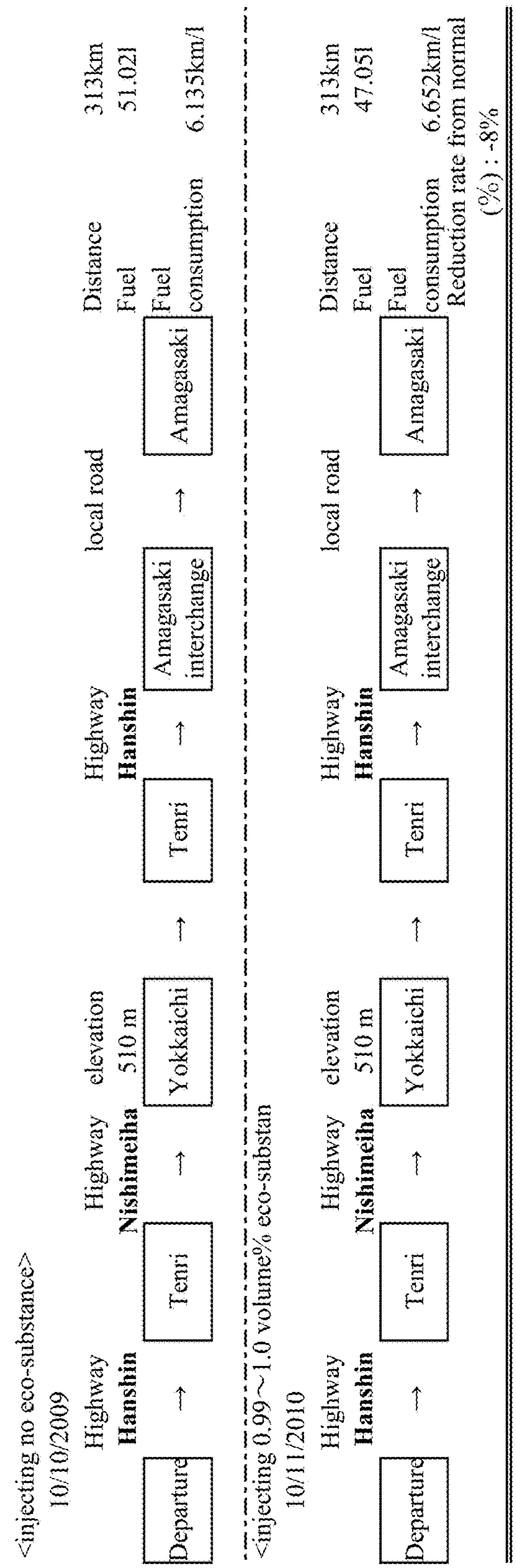
FIG. 9 illustrates the result of the running test for confirming the effect in a HINO 4 t vehicle (kerosene) injected with the eco-substance.
Figure 10:
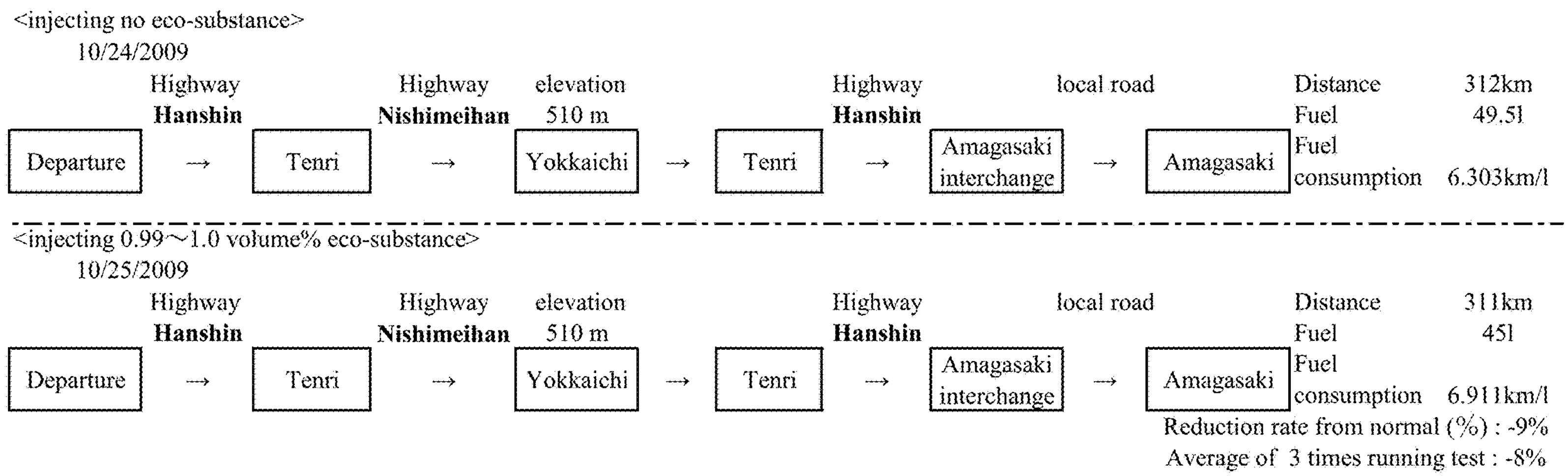
FIG. 10 illustrates the result of the running test for confirming the effect in a HINO 4 t vehicle (clean heavy oil) injected with the eco-substance.

Next, as shown in FIG. 6(*a*), the heat-resistant hose 14 was used to send the exhaust gas from the exhaust pipe 12 of the automobile engine 11 via the hot filter 13 into the general-purpose engine exhaust gas measurement apparatus 15 (EXSA-1500 HORIBA Ltd). Then, the increase-decrease rate of the concentration of an exhaust gas component (e.g., $CO_2$) was measured with a different engine rotation number for light oil, regular gasoline, kerosene, and Bunker A for a case where the eco-substance was not injected and a case where the eco-substance of 1% was injected, the result of which is shown in Tables 20 to 23. The reference numeral 16 denotes an input apparatus for setting test conditions (e.g., a personal computer). The reference numeral 17 denotes an output apparatus for outputting the test result (e.g., a pen recorder).

In this test, as shown in FIG. 6(*b*), the round tank 18 including 500 to 1500 liters of the remaining oil injected with the eco-substance was injected with such solution from the storage tank 19 that is obtained by injecting 80 liters of the eco-substance to 120 liters of petroleum oil. Then, the resultant mixture in the lower part of the tank was stirred and mixed by the pump 20. Thereafter, in order so that the concentration of the entirety is 1% for example, fuel not injected with the eco-substance was inputted to the tanker lorry 21, thereby preparing internal-combustion engine fuel as a sample.

In Table 20 to Table 36, DLMA is the amine DM12D and DMMA is the amine DM16D.

TABLE 20

[car A/diesel fuel - air temperature 9 degrees/humidity 50% at the time of measurement]

| DMLA-adding amount | engine speed | density of exhaust constituent (ppm) idling | 1000 rpm | 1500 rpm | 2000 rpm |
|---|---|---|---|---|---|
| 0% | CO | 168 | 230 | 234 | 262 |
| | CO2 | 12,775 | 13,725 | 16,550 | 20,400 |
| 1% | CO | 136 | 197 | 188 | 244 |
| | (rate of change) | (−19%) | (−14%) | (−20%) | (−7.0%) |
| 1% | CO2 | 11,375 | 13,125 | 15,175 | 20,050 |
| | (rate of change) | (−11%) | (−4.4%) | (−8.3%) | (−1.7%) |
| 2% | CO | 124 | 169 | 189 | 227 |
| | (rate of change) | (−26%) | (−27%) | (−19%) | (−13%) |
| | CO2 | 10,525 | 12,500 | 15,850 | 18,725 |
| | (rate of change) | (−18%) | (−8.9%) | (−4.2%) | (−8.2%) |
| 4% | CO | 115 | 158 | 178 | 228 |
| | (rate of change) | (−32%) | (−31%) | (−24%) | (−23%) |
| | CO2 | 11,075 | 12,975 | 16,150 | 19,900 |
| | (rate of change) | (−13%) | (−5.5%) | (−2.4%) | (−2.5%) |

TABLE 21

[car A/diesel fuel - air temperature 9 degrees/humidity 50% at the time of measurement]

| DMMA-adding amount | engine speed | density of exhaust constituent (ppm) idling | 1000 rpm | 1500 rpm | 2000 rpm |
|---|---|---|---|---|---|
| 0% | CO | 168 | 230 | 234 | 262 |
| | CO2 | 12,775 | 13,725 | 16,550 | 20,400 |
| 1% | CO | 111 | 158 | 188 | 235 |
| | (rate of change) | (−34%) | (−31%) | (−20%) | (−10%) |
| | CO2 | 10,500 | 12,825 | 15,150 | 18,625 |
| | (rate of change) | (−18%) | (−6.6%) | (−8.5%) | (−8.7%) |
| 2% | CO | 122 | 168 | 200 | 239 |
| | (rate of change) | (−27%) | (−27%) | (−15%) | (−8.8%) |
| | CO2 | 10,875 | 12,175 | 14,550 | 18,250 |
| | (rate of change) | (−15%) | (−11%) | (−12%) | (−11%) |
| 4% | CO | 122 | 171 | 199 | 256 |
| | (rate of change) | (−27%) | (−26%) | (−15%) | (−3.3%) |
| | CO2 | 10,900 | 12,225 | 14,575 | 18,450 |
| | (rate of change) | (−15%) | (−11%) | (−12%) | (−9.6%) |

TABLE 22

[car B/diesel fuel - air temperature 17 degrees/humidity 45% at the time of measurement]

| DMLA-adding amount | engine speed | density of exhaust constituent (ppm) idling | 1000 rpm | 1500 rpm | 2000 rpm |
|---|---|---|---|---|---|
| 0% | CO | 134 | 147 | 171 | 213 |
| | CO2 | 11,400 | 13,725 | 18,300 | 23,100 |
| | HC | 262 | 272 | 302 | 326 |
| 1% | CO | 121 | 137 | 160 | 200 |
| | (rate of change) | (−10%) | (−6.8%) | (−6.4%) | (−6.1%) |
| | CO2 | 11,250 | 13,800 | 16,700 | 21,200 |
| | (rate of change) | (−1.3%) | (+0.5%) | (−8.7%) | (−8.2%) |
| | HC | 226 | 236 | 264 | 310 |
| | (rate of change) | (−14%) | (−13%) | (−13%) | (−4.9%) |
| 2% | CO | 139 | 138 | 166 | 201 |
| | (rate of change) | (+3.7%) | (−6.1%) | (−2.9%) | (−6.6%) |
| | CO2 | 11,375 | 13,575 | 17,625 | 21,425 |
| | (rate of change) | (−0.2%) | (−1.1%) | (−3.7%) | (−7.3%) |
| | HC | 206 | 216 | 240 | 255 |
| | (rate of change) | (−21%) | (−21%) | (−21%) | (−22%) |

TABLE 22-continued

[car B/diesel fuel - air temperature 17 degrees/humidity 45% at the time of measurement]

| DMLA-adding amount | engine speed | density of exhaust constituent (ppm) idling | 1000 rpm | 1500 rpm | 2000 rpm |
|---|---|---|---|---|---|
| 4% | CO | 128 | 134 | 159 | 193 |
| | (rate of change) | (−4.5%) | (−8.8%) | (−7.0%) | (−9.4%) |
| | CO2 | 11,350 | 13,450 | 17,100 | 21,375 |
| | (rate of change) | (−0.4%) | (−2.2%) | (−6.6%) | (−7.5%) |
| | HC | 203 | 213 | 235 | 244 |
| | (rate of change) | (−23%) | (−22%) | (−22%) | (−25%) |

TABLE 23

[car C/diesel fuel - air temperature 25 degrees/humidity 60% at the time of measurement]

| DMLA-adding amount | engine speed | density of exhaust constituent (ppm) idling | 1000 rpm | 1500 rpm | 2000 rpm |
|---|---|---|---|---|---|
| 0% | CO | 90 | 117 | 167 | 224 |
| | CO2 | 13,500 | 14,350 | 16,600 | 22,350 |
| | HC | 74 | 92 | 139 | 218 |

TABLE 23-continued

[car C/diesel fuel - air temperature 25 degrees/humidity 60% at the time of measurement]

| DMLA-adding amount | engine speed | density of exhaust constituent (ppm) idling | 1000 rpm | 1500 rpm | 2000 rpm |
|---|---|---|---|---|---|
| 2% | CO | 23 | 32 | 16 | 138 |
| | (rate of change) | (−74%) | (−73%) | (−54%) | (−40%) |
| | CO2 | 13,200 | 14,200 | 15,875 | 18,475 |
| | (rate of change) | (−2.2%) | (−1.0%) | (−4.4%) | (−17%) |
| | HC | 59 | 74 | 120 | 172 |
| | (rate of change) | (−20%) | (−20%) | (−14%) | (−21%) |
| 4% | CO | 29 | 23 | 70 | 124 |
| | (rate of change) | (−68%) | (−80%) | (−58%) | (−45%) |
| | CO2 | 13,125 | 14,150 | 16,000 | 18,600 |
| | (rate of change) | (−2.8%) | (−1.4%) | (−3.6%) | (−17%) |
| | HC | 63 | 74 | 118 | 168 |
| | (rate of change) | (−15%) | (−20%) | (−15%) | (−23%) |
| 7.5% | CO | 20 | 17 | 50 | 106 |
| | (rate of change) | (−78%) | (−85%) | (−70%) | (−53%) |
| | CO2 | 13,050 | 13,725 | 15,725 | 18,525 |
| | (rate of change) | (−3.3%) | (−4.4%) | (−5.3%) | (−17%) |
| | HC | 55 | 65 | 101 | 148 |
| | (rate of change) | (−26%) | (−29%) | (−27%) | (−32%) |
| 10% | CO | 10 | 13 | 39 | 91 |
| | (rate of change) | (−89%) | (−89%) | (−77%) | (−59%) |
| | CO2 | 13,500 | 13,950 | 15,075 | 18,075 |
| | (rate of change) | (−0%) | (−2.8%) | (−9.2%) | (−19%) |
| | HC | 45 | 64 | 94 | 137 |
| | (rate of change) | (−39%) | (−30%) | (−32%) | (−37%) |

TABLE 24

[car D/diesel fuel - air temperature 22 degrees/humidity 50% at the time of measurement]

| DMLA - adding amount | | density of exhaust constituent (ppm) engine speed idling | 1000 rpm | 1500 rpm | 2000 rpm | 2500 rpm |
|---|---|---|---|---|---|---|
| 0% | CO | 158 | 164 | 174 | 236 | 302 |
| | CO2 | 16,800 | 17,200 | 18,750 | 23,300 | 28,250 |
| | NOX | 157 | 134 | 125 | 189 | 369 |
| 2% | CO | 28 | 49 | 96 | 152 | 212 |
| | (rate of change) | (−82%) | (−70%) | (−45%) | (−36%) | (−30%) |
| | CO2 | 16,425 | 16,975 | 17,275 | 22,600 | 27,350 |
| | (rate of change) | (−2.2%) | (−1.3%) | (−7.9%) | (−3.0%) | (−3.2%) |
| | NOX | 142 | 107 | 95 | 148 | 292 |
| | (rate of change) | (−10%) | (−20%) | (−24%) | (−22%) | (−21%) |

TABLE 25

[car D/diesel fuel - air temperature 25 degrees/humidity 75% at the time of measurement]

| DMLA - adding amount | | density of exhaust constituent (ppm) engine speed idling | 1000 rpm | 1500 rpm | 2000 rpm | 2500 rpm |
|---|---|---|---|---|---|---|
| 0% | CO | 167 | 172 | 200 | 262 | 338 |
| | CO2 | 22,150 | 20,250 | 24,100 | 28,050 | 34,850 |
| | NOX | 109 | 116 | 103 | 153 | 316 |

TABLE 25-continued

[car D/diesel fuel - air temperature 25 degrees/humidity 75% at the time of measurement]

| DMLA - adding amount | | density of exhaust constituent (ppm) engine speed idling | 1000 rpm | 1500 rpm | 2000 rpm | 2500 rpm |
|---|---|---|---|---|---|---|
| 2% | CO | 102 | 97 | 152 | 218 | 255 |
| | (rate of change) | (−39%) | (−44%) | (−24%) | (−17%) | (−25%) |
| | CO2 | 19,475 | 19,750 | 22,400 | 26,750 | 32,850 |
| | (rate of change) | (−12%) | (−2.5%) | (−7.1%) | (−4.6%) | (−5.7%) |
| | NOX | 121 | 101 | 73 | 114 | 234 |
| | (rate of change) | (+11%) | (-13%) | (−29%) | (−25%) | (−26%) |

TABLE 26

[car D/diesel fuel - air temperature 23 degrees/humidity 48% at the time of measurement]

| DMMA - adding amount | | density of exhaust constituent (ppm) engine speed idling | 1000 rpm | 2000 rpm | 2500 rpm | accelerator MAX |
|---|---|---|---|---|---|---|
| 0% | CO | 124 | 143 | 213 | 278 | 195 |
| | CO2 | 17,600 | 17,450 | 22,600 | 28,600 | 27,100 |
| | NOX | 167 | 124 | 152 | 284 | 144 |
| 2% | CO | 59 | 68 | 177 | 240 | 161 |
| | (rate of change) | (−52%) | (−52%) | (−17%) | (−14%) | (−17%) |
| | CO2 | 17,075 | 16,525 | 21,150 | 27,025 | 24,275 |
| | (rate of change) | (−3.0%) | (−5.3%) | (−6.4%) | (−5.5%) | (−10%) |
| | NOX | 137 | 104 | 126 | 256 | 126 |
| | (rate of change) | (−18%) | (−16%) | (−17%) | (−10%) | (−12%) |

TABLE 27

[car D/diesel fuel - air temperature 30 degrees/humidity 50% at the time of measurement]

| DMMA - adding amount | | density of exhaust constituent (ppm) engine speed idling | 1000 rpm | 2000 rpm | 2500 rpm | accelerator MAX |
|---|---|---|---|---|---|---|
| 0% | CO | 133 | 150 | 209 | 251 | 184 |
| | CO2 | 18,200 | 18,650 | 24,450 | 31,500 | 27,850 |
| | NOX | 154 | 115 | 153 | 339 | 153 |
| 2% | CO | 102 | 129 | 196 | 239 | 153 |
| | (rate of change) | (−23%) | (−14%) | (−6.2%) | (−4.8%) | (−17%) |
| | CO2 | 17,850 | 18,050 | 22,550 | 28,200 | 26,200 |
| | (rate of change) | (−2.0%) | (−3.2%) | (−7.8%) | (−10%) | (−5.9%) |
| | NOX | 123 | 118 | 127 | 253 | 152 |
| | (rate of change) | (−20%) | (+2.6%) | (−17%) | (−25%) | (−0.7%) |

TABLE 28

[car D/diesel fuel - air temperature 30 degrees/humidity 50% at the time of measurement]

| DMLA - adding amount | | density of exhaust constituent (ppm) engine speed idling | 1000 rpm | 1500 rpm | 2000 rpm | 2500 rpm |
|---|---|---|---|---|---|---|
| 0% | CO | 133 | 150 | 160 | 209 | 251 |
| | CO2 | 18,200 | 18,650 | 19,900 | 24,450 | 31,500 |
| | NOX | 154 | 115 | 108 | 153 | 339 |
| 7.5% | CO | 107 | 116 | 141 | 170 | 208 |
| | (rate of change) | (−20%) | (−23%) | (−12%) | (−19%) | (−17%) |
| | CO2 | 17,800 | 17,300 | 19,400 | 22,300 | 27,700 |
| | (rate of change) | (−2.2%) | (−7.2%) | (−2.5%) | (−8.8%) | (−12%) |
| | NOX | 133 | 106 | 85 | 130 | 266 |
| | (rate of change) | (−14%) | (−8.6%) | (−21%) | (−15%) | (−2.2%) |
| 10% | CO | 54 | 48 | 108 | 158 | 188 |
| | (rate of change) | (−59%) | (−68%) | (−33%) | (−24%) | (−25%) |
| | CO2 | 18,300 | 16,900 | 18,250 | 21,300 | 26,000 |
| | (rate of change) | (+0.5%) | (−9.4%) | (−8.3%) | (−13%) | (−17%) |
| | NOX | 163 | 112 | 89 | 123 | 272 |
| | (rate of change) | (+5.8%) | (−2.6%) | (−18%) | (−20%) | (−20%) |

TABLE 29

[car E/diesel fuel - air temperature 17 degrees/humidity 60% at the time of measurement]

| DMMA - adding amount | | density of exhaust constituent (ppm) engine speed idling | 1000 rpm | 1500 rpm | 2000 rpm | 2500 rpm |
|---|---|---|---|---|---|---|
| 0% | CO | 98 | 83 | 139 | 228 | 299 |
| | CO2 | 24,125 | 21,850 | 22,250 | 24,850 | 27,875 |
| 1% | CO | 89 | 72 | 106 | 162 | 188 |
| | (rate of change) | (−9.2%) | (−13%) | (−24%) | (−29%) | (−37%) |
| | CO2 | 23,350 | 20,850 | 20,800 | 22,450 | 26,850 |
| | (rate of change) | (−3.2%) | (−4.6%) | (−6.5%) | (−9.7%) | (−3.7%) |
| 2% | CO | 106 | 74 | 95 | 164 | 206 |
| | (rate of change) | (+8.2%) | (−11%) | (−32%) | (−28%) | (−31%) |
| | CO2 | 24,075 | 21,425 | 21,800 | 23,225 | 26,800 |
| | (rate of change) | (−0.2%) | (−1.9%) | (−2.0%) | (−6.5%) | (−3.9%) |

TABLE 30

[car F/diesel fuel - air temperature 9 degrees/humidity 60% at the time of measurement]

| DMMA - adding amount | | density of exhaust constituent (ppm) engine speed idling | 1000 rpm | 1500 rpm | 2000 rpm | 2200 rpm |
|---|---|---|---|---|---|---|
| 0% | CO | 170 | 192 | 207 | 246 | 348 |
| | CO2 | 12,000 | 12,800 | 15,450 | 18,100 | 24,950 |
| | CO | 138 | 178 | 229 | 229 | 337 |
| | (rate of change) | (−19%) | (−7.3%) | (+11%) | (−7.0%) | (−3.2%) |

TABLE 30-continued

[car F/diesel fuel - air temperature 9 degrees/humidity 60% at the time of measurement]

| DMMA - adding amount | | density of exhaust constituent (ppm) engine speed idling | 1000 rpm | 1500 rpm | 2000 rpm | 2200 rpm |
|---|---|---|---|---|---|---|
| 1% | CO2 (rate of change) | 11,675 (−2.7%) | 12,625 (−1.4%) | 14,775 (−4.4%) | 17,625 (−2.6%) | 22,525 (−9.7%) |
| 2% | CO (rate of change) | 122 (−28%) | 157 (−18%) | 205 (−1.0%) | 231 (−6.1%) | 325 (−6.6%) |
| | CO2 (rate of change) | 11,300 (−5.8%) | 12,400 (−3.1%) | 13,850 (−10%) | 16,250 (−10%) | 21,200 (−15%) |
| 4% | CO (rate of change) | 107 (−37%) | 161 (−16%) | 200 (−4.4%) | 225 (−8.5%) | 325 (−6.6%) |
| | CO2 (rate of change) | 11,125 (−7.7%) | 12,028 (−6.1%) | 14,500 (−6.1%) | 16,500 (−8.8%) | 22,125 (−11%) |

TABLE 31

[car A/fuel oil A - air temperature 9 degrees/humidity 60% at the time of measurement]

| DMLA - adding amount | | density of exhaust constituent (ppm) engine speed idling | 1000 rpm | 1500 rpm | 2000 rpm | 2500 rpm |
|---|---|---|---|---|---|---|
| 0% | CO2 | 11,400 | 12,850 | 16,200 | 18,375 | 24,150 |
| 2% | CO2 (rate of change) | 11,300 (−0.9%) | 12,750 (−0.8%) | 15,600 (−3.7%) | 17,900 (−2.6%) | 23,100 (−4.3%) |
| 4% | CO2 (rate of change) | 11,150 (−2.2%) | 12,250 (−4.7%) | 14,100 (−13%) | 17,950 (−2.2%) | 23,100 (−4.3%) |

TABLE 32

[car E/fuel oil A - air temperature 17 degrees/humidity 60% at the time of measurement]

| DMLA-adding amount | engine speed | density of exhaust constituent (ppm) idling | 1000 rpm | 1500 rpm | 2000 rpm |
|---|---|---|---|---|---|
| 0% | CO2 | 25,500 | 23,050 | 23,400 | 25,255 |
| 1% | CO2 (rate of change) | 24,800 (−2.7%) | 22,600 (−2.0%) | 22,625 (−3.3%) | 25,175 (−0.3%) |
| 2% | CO2 (rate of change) | 24,525 (−3.8%) | 23,050 0% | 22,425 (−4.2%) | 24,250 (−4.0%) |
| 4% | CO2 (rate of change) | 24,275 (−4.8%) | 22,025 (−4.4%) | 22,475 (−4.0%) | 25,125 (−0.5%) |

TABLE 33

[car B/fuel oil A - air temperature 17 degrees/humidity 45% at the time of measurement]

| DMLA - adding amount | | density of exhaust constituent (ppm) engine speed idling | 1000 rpm | 1500 rpm | 2000 rpm | 2200 rpm |
|---|---|---|---|---|---|---|
| 0% | CO | 215 | 243 | 298 | 376 | 383 |
| | CO2 | 11,725 | 13,950 | 18,050 | 22,350 | 27,350 |
| | HC | 312 | 348 | 378 | 361 | 357 |
| 1% | CO (rate of change) | 174 (−19%) | 216 (−11%) | 270 (−9.4%) | 351 (−6.6%) | 366 (−4.4%) |
| | CO2 (rate of change) | 11,350 (−3.2%) | 14,000 (+0.4%) | 17,800 (−1.4%) | 22,600 (+1.1%) | 24,500 (−10%) |
| | HC (rate of change) | 288 (−7.7%) | 309 (−11%) | 336 (−11%) | 315 (−13%) | 318 (−11%) |

TABLE 33-continued

[car B/fuel oil A - air temperature 17 degrees/humidity 45% at the time of measurement]

| DMLA - adding amount | | density of exhaust constituent (ppm) engine speed idling | 1000 rpm | 1500 rpm | 2000 rpm | 2200 rpm |
|---|---|---|---|---|---|---|
| 2% | CO | 195 | 228 | 280 | 351 | 352 |
| | (rate of change) | (−9.3%) | (−6.2%) | (−6.0%) | (−6.6%) | (−8.1%) |
| | CO2 | 11,450 | 13,400 | 18,150 | 21,050 | 24,700 |
| | (rate of change) | (−2.3%) | (−3.9%) | (+0.6%) | (−5.8%) | (−9.7%) |
| | HC | 292 | 319 | 346 | 328 | 327 |
| | (rate of change) | (−6.4%) | (−8.3%) | (−8.5%) | (−9.1%) | (−8.4%) |

TABLE 34

[car G/regular gasoline - air temperature 8 degrees/humidity 65% at the time of measurement]

| DMLA-adding amount | engine speed | density of exhaust constituent (ppm) idling | 1000 rpm | 1500 rpm | 2000 rpm |
|---|---|---|---|---|---|
| 0% | CO2 | 38,319 | 108,494 | 114,981 | 125,344 |
| 1% | CO2 | 33,900 | 96,650 | 113,950 | 123,825 |
| | (rate of change) | (−12%) | (−11%) | (−0.9%) | (−1.2%) |
| 2% | CO2 | 32,950 | 98,250 | 103,375 | 124,650 |
| | (rate of change) | (−14%) | (−9.4%) | (−10%) | (−0.6%) |

TABLE 34-continued

[car G/regular gasoline - air temperature 8 degrees/humidity 65% at the time of measurement]

| DMLA-adding amount | engine speed | density of exhaust constituent (ppm) idling | 1000 rpm | 1500 rpm | 2000 rpm |
|---|---|---|---|---|---|
| 4% | CO2 | 32,425 | 96,225 | 109,525 | 118,775 |
| | (rate of change) | (−15%) | (−11%) | (−4.7%) | (−5.2%) |

TABLE 35

[car A/kerosene - air temperature 7 degrees/humidity 60% at the time of measurement]

| DMLA - adding amount | | density of exhaust constituent (ppm) engine speed idling | 1000 rpm | 1500 rpm | 2000 rpm | 2300 rpm |
|---|---|---|---|---|---|---|
| 0% | CO | 154 | 230 | 344 | 521 | 832 |
| | CO2 | 14,810 | 15,010 | 18,050 | 22,030 | 26,430 |
| | HC | 176 | 182 | 210 | 311 | 440 |
| 1% | CO | 141 | 196 | 302 | 456 | 710 |
| | (rate of change) | (−8.4%) | (−15%) | (−12%) | (−12%) | (−15%) |
| | CO2 | 14,000 | 14,750 | 16,050 | 19,900 | 24,000 |
| | (rate of change) | (−5.5%) | (−1.7%) | (−11%) | (−9.7%) | (−9.2%) |
| | HC | 142 | 164 | 196 | 281 | 383 |
| | (rate of change) | (−19%) | (−9.9%) | (−6.7%) | (−9.6%) | (−13%) |
| 2% | CO | 137 | 197 | 323 | 475 | 668 |
| | (rate of change) | (−11%) | (−14%) | (−6.1%) | (−8.8%) | (−20%) |
| | CO2 | 14,050 | 14,800 | 16,200 | 21,200 | 24,500 |
| | (rate of change) | (−5.1%) | (−1.4%) | (−10%) | (−3.8%) | (−7.3%) |
| | HC | 139 | 161 | 202 | 289 | 374 |
| | (rate of change) | (−21%) | (−12%) | (−3.8%) | (−7.1%) | (−15%) |

TABLE 36

[car C/kerosene - air temperature 7 degrees/humidity 60% at the time of measurement]

| DMLA - adding amount | | density of exhaust constituent (ppm) engine speed idling | 1000 rpm | 1500 rpm | 2000 rpm | 2300 rpm |
|---|---|---|---|---|---|---|
| 0% | CO | 78 | 170 | 383 | 517 | 393 |
| | CO2 | 13,650 | 12,550 | 14,810 | 18,400 | 22,275 |
| | HC | 192 | 206 | 330 | 467 | 443 |
| 1% | CO (rate of change) | 33 (−58%) | 62 (−64%) | 221 (−42%) | 441 (−15%) | 313 (−20%) |
| | CO2 (rate of change) | 13,600 (−0.4%) | 12,375 (−1.4%) | 14,400 (−2.8%) | 18,400 0% | 21,700 (−3.6%) |
| | HC (rate of change) | 121 (−37%) | 167 (−19%) | 275 (−17%) | 380 (−19%) | 308 (−31%) |
| 2% | CO (rate of change) | 45 (−42%) | 103 (−39%) | 211 (−45%) | 406 (−21%) | 348 (−11%) |
| | CO2 (rate of change) | 12,850 (−5.9%) | 12,850 (+2.4%) | 14,025 (−5.3%) | 16,725 (−9.1%) | 21,775 (−2.2%) |
| | HC (rate of change) | 117 (−39%) | 166 (−19%) | 253 (−23%) | 368 (−21%) | 294 (−34%) |
| 4% | CO (rate of change) | 48 (−38%) | 110 (−35%) | 234 (−39%) | 364 (−30%) | 326 (−17%) |
| | CO2 (rate of change) | 13,650 0% | 12,550 0% | 14,550 (−1.8%) | 16,975 (−7.7%) | 21,025 (−5.6%) |
| | HC (rate of change) | 110 (−43%) | 153 (−26%) | 241 (−27%) | 339 (−27%) | 300 (−32%) |

As can be seen from the result shown in the above tables, the light oil, kerosene, gasoline, or Bunker A injected with the eco-substance can reduce CO2 when compared with fuel not injected with the eco-substance. The light oil, kerosene, gasoline, or Bunker A injected with the eco-substance also can reduce sulfur oxide (SOx), black smoke, and particulate matter (PM) as an air pollutant and can reduce CO, HC, and NOx.

Then, FIG. 7 to FIG. 10 show the result of the running test when the petroleum oil fuel is high-octane gasoline, regular gasoline, kerosene, and clean Bunker A for the comparison between a case where these types of fuel are not injected with the eco-substance and a case where these types of fuel are injected with the eco-substance. In order to provide uniform running conditions (e.g., a running speed, a running time) as much as possible, the running test was performed by the same driver. In order to prevent an error, the petroleum oil fuel and the eco-substance were measured correctly.

The result was that any of the high-octane gasoline, regular gasoline, kerosene, and clean Bunker A showed a reduced consumption fuel, resulting in the reduction rate of 5% to 21%. In particular, gasoline showed a reduction rate of 9.5% to 21% and kerosene and Bunker A showed a reduction rate of 5% to 9%. This shows that a significant reduction effect is obtained when the fuel is gasoline.

FIG. 11 and Table 37 show the comparison between the petroleum oil fuel of light oil not injected with the eco-substance and the petroleum oil fuel of light oil injected with the eco-substance by performing the running test to measure the running distance by a tachometer.

As in the high-octane gasoline, regular gasoline, kerosene, and clean Bunker A, light oil injected with the eco-substance shows a reduced consumption fuel, thus improving the fuel consumption.

Table 37 to Table 54 show the result of the test to further confirm the fuel consumption. Tables 39 to 54 are in FIGS. 34 to 49, respectively.

TABLE 37 base period: 2008.January-2009.March
confirming the fuel consumption of injecting no eco-substance into fuel
study period: 2009.Apr. 13-2009. Sep. 30
confirming the fuel consumption of injecting eco-substance into fuel

| | | running distance of all vehicles | fuel consumption amounts of all vehicles | fuel consumption of all vehicles | reduction rate (%) |
|---|---|---|---|---|---|
| 2008 | April | 102,214 | 34,778 | 2.94 | |
| | May | 99,354 | 32,725 | 3.04 | |
| | June | 85,280 | 28,312 | 3.01 | |
| | July | 102,597 | 36,288 | 2.83 | |
| | August | 70,338 | 22,661 | 3.10 | |
| | September | 101,246 | 35,744 | 2.83 | |
| | total | 561,029 | 190,508 | 2.96 | |
| 2009 | April | 70,944 | 22,720 | 3.12 | −5.9% |
| | May | 67,260 | 21,071 | 3.19 | −4.9% |
| | June | 86,370 | 27,494 | 3.14 | −4.1% |
| | July | 78,478 | 26,179 | 3.00 | −5.7% |
| | August | 70,100 | 21,645 | 3.24 | −4.2% |
| | September | 85,606 | 26,145 | 3.27 | −13.5% |
| | total | 458,758 | 145,254 | 3.16 | −6.4% |

TABLE 37-continued

| | | running distance of 10 t vehicle | fuel consumption amounts of 10 t vehicle | fuel consumption of 10 t vehicle | |
|---|---|---|---|---|---|
| 2008 | April | 94,336 | 31,224 | 3.02 | |
| | May | 90,804 | 29,182 | 3.11 | |
| | June | 78,121 | 24,772 | 3.15 | |
| | July | 93,603 | 32,299 | 2.90 | |
| | August | 63,450 | 19,726 | 3.22 | |
| | September | 92,320 | 31,856 | 2.90 | reduction |
| | total | 512,643 | 169,059 | 3.05 | rate (%) |
| 2009 | April | 67,339 | 20,823 | 3.23 | −6.6% |
| | May | 63,279 | 19,269 | 3.28 | −5.2% |
| | June | 78,406 | 24,393 | 3.21 | −1.9% |
| | July | 70,572 | 22,797 | 3.10 | −6.4% |
| | August | 62,774 | 18,305 | 3.43 | −6.2% |
| | September | 71,190 | 20,693 | 3.44 | −15.8% |
| | total | 413,560 | 126,280 | 3.28 | −7.1% |

test vehicles: 10 t car * 13 (including onboard cars) [trailer] April-June: 2 cars, July-September: 3 cars As can be seen from Table 37, all of the vehicles show an average reduction rate of −6.4% and the 10 t vehicle shows an average reduction rate of −7.1%.

Table 38 in FIG. 33 shows that an average reduction rate of −5% is achieved in 8 running tests for which the loading place is Kobe-shi of Hyogo ken and the unloading place is Iizuka-shi of Fukuoka ken.

Table 39 to Table 41 in FIGS. 34 to 36, respectively, show that an average reduction rate of −12% is achieved in 4 running tests for the outward path (loading place: Amagasaki-shi of Hyogo ken, unloading place: Kawaguchi-shi of Saitama ken) and the return path (loading place: Ueda-shi of Nagano ken, unloading place: Amagasaki-shi of Hyogo ken).

Table 42 and Table 43 in FIGS. 37 and 38, respectively, show that an average reduction rate of −13% is achieved in 5 running tests for which the loading place is Wajima of Ishikawa ken and the unloading place is Amagasaki-shi of Hyogo ken.

Table 44 to Table 46 in FIGS. 39 to 41, respectively, show that an average reduction rate of −12% is achieved in 9 running tests for which the loading place is Nakaniikawa-gun of Toyama ken and the unloading place is Takasago-shi of Hyogo ken. Table 47 and Table 48 in FIGS. 42 and 43, respectively, show that an average reduction rate of −14% is achieved in 3 running tests for which the loading place is Noto of Isikawa ken and the unloading place is Amagasaki-shi of Hyogo ken.

Table 49 and Table 50 in FIGS. 44 and 45, respectively, show that an average reduction rate of −9% is achieved in 3 running tests for the outward path (loading place: Amagasaki-shi of Hyogo ken, unloading place: Kitatone of Ibaragi ken) and the return path (loading place: Sano-shi of Tochigi ken, unloading place: Amagasaki-shi of Hyogo ken).

Table 51 and Table 52 in FIGS. 46 and 47, respectively, show that an average reduction rate of −8% is achieved in 5 running tests for the outward path (loading place: Izumisano-shi of Osaka-fu, unloading place: Echizen-shi of Fukui ken) and the return path (loading place: Nakaniikawa-gun of Toyama ken, unloading place: Takasago-shi of Hyogo ken).

Table 53 and Table 54 in FIGS. 48 and 49, respectively, show that an average reduction rate of −6% is achieved in 11 running tests for which the loading place is Amagasaki-shi of Hyogo ken and unloading place is Noto of Isikawa ken.

Table 55 to Table 57 in FIGS. 50 to 52 show that an average reduction rate of −17% is achieved in 9 running tests for which the loading place is Yokkaichi-shi of Aichi ken and unloading place is Amagasaki-shi of Hyogo ken.

As is clear from these results, the fuel consumption performance can be improved. The fuel consumption performance is improved when the injection amount of the eco-substance is about 0.5 volume %.

4. [Running Test when the Eco-Fuel is Used in Combination]

Next, the running test was performed for a case where the eco fuel obtained by injecting the eco-substance to the internal-combustion engine fuel (light oil, gasoline for example) was used with the new eco-friendly lubrication oil, the result of which is shown in Table 58 to Table 60, which are in FIGS. 53 to 55, respectively. In Table 58 and Table 59, with regard to a diesel truck using light oil, the left side shows the result when the normal fuel and the normal lubrication oil were used, the middle side shows the result when the eco fuel and the normal lubrication oil were used, and the right side shows the result when the eco fuel and the new eco-friendly lubrication oil were used. Table 60 in FIG. 55 shows the result for a passenger vehicle using regular gasoline.

As can be seen from the above, the combination of the eco fuel and the new eco-friendly lubrication oil can further improve the fuel consumption performance.

The reason why the combination of the eco fuel and the new eco-friendly lubrication oil can improve the fuel consumption performance is that the eco fuel injected with the eco-substance itself has an effect of reducing the fuel consumption and also functions like lubrication oil partially in the mechanical parts. Thus, the eco-substance included in the fuel provides the effect.

Specifically, in the piston 2 and the con rod 1 shown in FIG. 1 for example, the lubrication oil flows from the lower side to the upper side of the con rod 1. Then, since the concave section **3*d* of the piston 2 generally includes an oil ring (not shown), the lubrication oil flowed to the upper side passes through the oil hole 6 and is returned to the lower side by the oil ring of the concave section 3*d* (arrow A). The reason is that the lubrication oil at the upper side than the concave section 3*d*** causes the PM black smoke or carbon generation, thus deteriorating the engine performance.

On the other hand, the non-existence of an oil film at the upper side than the concave section **3*d* of the piston 2 undesirably causes metal attack. However, in an actual case, the fuel injected from the upper side of the piston 2 forms a thin oil film (arrow B) to suppress the metal attack at the upper side of the piston 2**, thus allowing the fuel to function like lubrication oil.

When the fuel includes the eco-substance at this stage, friction is reduced compared with the conventional case and the oxidation and deterioration of the fuel as lubrication oil can be suppressed. It is also effective to prevent the rust of the piston 2.

5. [Rust Prevention Experiment]

Next, a rust prevention experiment was performed to investigate the rust prevention effect of the new eco-friendly lubrication oil. The rust prevention experiment was performed in the manner as described below. Specifically, the respective parts coated with normal lubrication oil and the respective parts coated with the new eco-friendly lubrication oil were left outside. Then, the rust states of the respective parts after the passage of a predetermined period were visually inspected.

FIG. 12 to FIG. 15 show the rust states from Sep. 16, 2010 to Oct. 18, 2010. In FIG. 12 to FIG. 15, the upper side shows the result for the new eco-friendly lubrication oil and the lower side shows the result for the normal lubrication oil.

The parts coated with the normal lubrication oil were significantly oxidized and showed a high amount of red rust. On the other hand, the parts coated with the new eco-friendly lubrication oil showed a very small amount of red rust. This clearly shows that the new eco-friendly lubrication oil has a rust prevention effect As described above, the new eco-friendly lubrication oil injected with the eco-substance can reduce, when being used in an internal-combustion engine such as an automobile engine, the friction resistance in various engines, can reduce the fuel consumption amount, and can reduce carbon dioxide and other exhaust gas component. The new eco-friendly lubrication oil injected with the eco-substance also provides a rust prevention effect, suppresses the oxidation and deterioration of lubrication oil, suppresses the wear of the respective parts, thus providing a longer life to the internal-combustion engine.

6. [Jellylike Lubrication Oil]

The lubrication oil used for a grease application is manufactured by injecting the eco-substance (dimethyllaurylamine) of 1 to 5 volume % to conventional lubrication oil to subsequently inject thickener (e.g., calcium, sodium, lithium, aluminum, fatty acid salt) to uniformly disperse the thickener to thereby obtain a jellylike form. Then, the resultant jellylike lubrication oil can be used for a thrust bearing, an intermediate bearing, or a tire shaft for example to thereby reduce the friction resistance, to reduce the fuel consumption amount, and to reduce carbon dioxide and other exhaust gas components. Since this lubrication oil also has a rust prevention effect, this lubrication oil can suppress the oxidation and deterioration of the respective parts, thus providing a longer life to various engines. The jellylike lubrication oil also can be used not only for the above applications but also for respective parts of other various machines or equipment for example.

As described above, an embodiment of the present invention has been described with reference to the drawings and tables. However, various additions, changes, or deletions are possible within the scope not deviating from the intention of the present invention. In particular, the eco-substance is not limited to dimethyllaurylamine and also may be other dimethylalkyl tertiary amine. The eco-substance can be used as engine oil in an internal-combustion engine and also can be used as power steering oil, turbine oil, or gear oil and also can be used as lubrication oil for a driving system. Thus, such modifications are also included in the scope of the present invention.

DESCRIPTION OF THE REFERENCE NUMERALS

1 Con rod
2 Piston
3*a* to 3*d* Concave section
4 Con rod bolt
5 Con rod cap
6 Oil hole
A Lubrication oil flow
B Fuel injection flow
11 Engine
12 Exhaust pipe
13 Hot filter
14 Heat-resistant hose
15 Exhaust gas measurement apparatus
16 Input apparatus
17 Output apparatus
18 Round tank
19 Storage tank
20 Pump
21 Tanker lorry

What is claimed is:

1. A method of improving the fuel consumption of an internal combustion engine providing the step of lubricating the engine with a lubrication oil injected with an impregnating agent comprising a dimethylalkyl tertiary amine in the range from 0.01 to 1 volume %, wherein the lubrication oil is used in the internal-combustion engine together with internal-combustion engine fuel injected with the impregnating agent in the range from 0.1 to 1 volume %; and wherein the dimethylalkyl tertiary amine is formed by oils of plants and animals and is represented by the general expression (1):

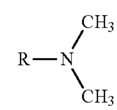

(1)

wherein R represents an alkyl group.

2. A method according to claim 1, wherein the impregnating agent is injected in an amount of 0.1 to 0.5 volume %.

3. A method according to claim 1, wherein the fuel of the said internal combustion engine is petroleum oil fuel.

4. A method according to claim 2, wherein the fuel of the said internal combustion engine is petroleum oil fuel.

5. A method according to claim 3, wherein the petroleum oil fuel is light oil, kerosene, gasoline, or Bunker A.

6. A method according to claim 1, wherein the lubrication oil impregnating agent is injected in an amount of 0.99 to 1 volume %.

7. A method according to claim 3, wherein the lubrication oil impregnating agent is injected in an amount of 0.99 to 1 volume %.

8. A method according to claim 5, wherein the lubrication oil impregnating agent is injected in an amount of 0.99 to 1 volume %.

9. A method of improving the fuel consumption of an internal combustion engine providing the step of lubricating the engine with a lubrication oil injected with an impregnating agent comprising a dimethylalkyl tertiary amine in the range from 0.01 to 1 volume %, wherein the lubrication oil is used in the internal-combustion engine together with internal-combustion engine fuel injected with a dimethylalkyl tertiary amine impregnating agent in the range from 0.1 to 1 volume %; and wherein the dimethylalkyl tertiary amine impregnating agent is represented by the general expression (1):

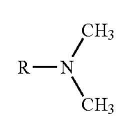

(1)

wherein R represents an alkyl group.

10. A method according to claim 9, wherein the impregnating agent is injected into both the lubricating oil and the fuel in an amount of 0.1 to 0.5 volume %.

11. A method according to claim 9, wherein the fuel of the said internal combustion engine is petroleum oil fuel.

12. A method according to claim 10, wherein the fuel of the said internal combustion engine is petroleum oil fuel.

13. A method according to claim 11, wherein the petroleum oil fuel is light oil, kerosene, gasoline, or Bunker A.

14. A method according to claim 9, wherein the impregnating agent is injected into both the lubrication oil and the fuel in an amount of 0.99 to 1 volume %.

15. A method according to claim 11, wherein the impregnating agent is injected into both the lubrication oil and the fuel in an amount of 0.99 to 1 volume %.

16. A method according to claim 12, wherein the impregnating agent is injected into both the lubrication oil and the fuel in an amount of 0.99 to 1 volume %.

17. A method according to claim 13, wherein the impregnating agent is injected into both the lubrication oil and the fuel in an amount of 0.99 to 1 volume %.

* * * * *